US012117745B2

(12) United States Patent
Itabashi et al.

(10) Patent No.: US 12,117,745 B2
(45) **Date of Patent: *Oct. 15, 2024**

(54) DEVELOPING CARTRIDGE HAVING COUPLING AND DEVELOPING ROLLER

(71) Applicant: BROTHER KOGYO KABUSHIKI KAISHA, Nagoya (JP)

(72) Inventors: Nao Itabashi, Nagoya (JP); Naoya Kamimura, Ichinomiya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,827

(22) Filed: Dec. 19, 2022

(65) Prior Publication Data

US 2023/0118550 A1 Apr. 20, 2023

Related U.S. Application Data

(63) Continuation of application No. 17/820,292, filed on Aug. 17, 2022, which is a continuation of application (Continued)

(30) Foreign Application Priority Data

Aug. 31, 2011 (JP) ................................ 2011-190035

(51) Int. Cl.
*G03G 15/08* (2006.01)
*G03G 15/06* (2006.01)
(Continued)

(52) U.S. Cl.
CPC ....... *G03G 15/0889* (2013.01); *G03G 15/065* (2013.01); *G03G 15/0865* (2013.01);
(Continued)

(58) Field of Classification Search
CPC ............ G03G 15/0889; G03G 15/065; G03G 15/0865; G03G 21/1676; G03G 21/1864; G03G 21/1896
See application file for complete search history.

(56) References Cited

U.S. PATENT DOCUMENTS 3,800,743 A * 4/1974 Egnaczak ............. G03G 17/04 118/259
5,053,816 A 10/1991 Takahashi
(Continued)

FOREIGN PATENT DOCUMENTS

CN 1828446 A 9/2006
CN 2009962188 Y 10/2007
(Continued)

OTHER PUBLICATIONS

U.S. Office Action issued in related U.S. Appl. No. 16/365,928, dated Jun. 27, 2019.
(Continued)

*Primary Examiner* — Stephanie E Bloss
*Assistant Examiner* — Michael A Harrison
(74) *Attorney, Agent, or Firm* — Merchant & Gould P.C.

(57) ABSTRACT

In a cartridge, a housing has a developer accommodating portion and includes a first side wall and a second side wall. A coupling member is disposed at a position opposite to the developer accommodating portion with respect to the first side wall. A detection body is disposed at a position opposite to the developer accommodating portion with respect to the second side wall. A first driving force transmission member is positioned at the same side with the coupling member with respect to the first side wall, and transmits driving force from the coupling member to a rotating member. A second driving force transmission member is positioned at the same side with the detection body with respect to the second side wall,
(Continued)

and transmits driving force from the rotating member to the detection body.

30 Claims, 41 Drawing Sheets

Related U.S. Application Data

No. 17/730,552, filed on Apr. 27, 2022, now Pat. No. 11,687,016, which is a continuation of application No. 17/174,500, filed on Feb. 12, 2021, now Pat. No. 11,693,334, which is a continuation of application No. 16/930,865, filed on Jul. 16, 2020, now Pat. No. 10,921,732, which is a continuation of application No. 16/723,160, filed on Dec. 20, 2019, now Pat. No. 11,022,912, which is a continuation of application No. 16/263,224, filed on Jan. 31, 2019, now Pat. No. 10,520,855, which is a continuation of application No. 15/820,203, filed on Nov. 21, 2017, now Pat. No. 10,496,011, which is a continuation of application No. 15/363,985, filed on Nov. 29, 2016, now Pat. No. 9,846,387, which is a continuation of application No. 15/061,551, filed on Mar. 4, 2016, now Pat. No. 9,529,319, which is a continuation of application No. 14/665,763, filed on Mar. 23, 2015, now Pat. No. 9,395,684, which is a continuation of application No. 13/598,708, filed on Aug. 30, 2012, now Pat. No. 8,995,866.

(51) Int. Cl.
*G03G 21/16* (2006.01)
*G03G 21/18* (2006.01)

(52) U.S. Cl.
CPC ..... *G03G 21/1676* (2013.01); *G03G 21/1864* (2013.01); *G03G 21/1896* (2013.01)

(56) References Cited

U.S. PATENT DOCUMENTS

| | | | | |
|---|---|---|---|---|
| 5,430,780 | A | 7/1995 | Takeda et al. | |
| 5,583,618 | A | 12/1996 | Takeuchi et al. | |
| 5,642,187 | A | 6/1997 | Nomura et al. | |
| 6,298,202 | B1 | 10/2001 | Fushiya et al. | |
| 6,654,583 | B2 | 11/2003 | Suzuki et al. | |
| 6,792,217 | B2 | 9/2004 | Nishino et al. | |
| 7,027,756 | B2 | 4/2006 | Hoshi et al. | |
| 7,076,179 | B2 | 7/2006 | Nakazato | |
| 7,218,869 | B2 | 5/2007 | Nakazato | |
| 7,418,214 | B2 | 8/2008 | Yoshida et al. | |
| 7,512,347 | B2 | 3/2009 | Suzuki et al. | |
| 7,574,148 | B2 | 8/2009 | Igarashi et al. | |
| 7,613,414 | B2 | 11/2009 | Kamimura | |
| 7,953,330 | B2 | 5/2011 | Ishikawa | |
| 7,965,962 | B2 | 6/2011 | Mori | |
| 7,970,293 | B2 | 6/2011 | Ishikawa et al. | |
| 7,978,997 | B2 | 7/2011 | Tokuda | |
| 8,009,996 | B2 | 8/2011 | Ishikawa | |
| 8,090,272 | B2 | 1/2012 | Ishikawa | |
| 8,185,014 | B2 | 5/2012 | Kamimura | |
| 8,457,525 | B2 | 6/2013 | Kamimura | |
| 8,463,145 | B2 | 6/2013 | Ukai et al. | |
| 8,913,903 | B2 | 12/2014 | Hamaya | |
| 8,923,709 | B2 | 12/2014 | Itabashi et al. | |
| 8,995,866 | B2 | 3/2015 | Itabashi et al. | |
| 9,110,441 | B2 | 8/2015 | Shiraki et al. | |
| 9,395,684 | B2 | 7/2016 | Itabashi et al. | |
| 9,846,387 | B2 | 12/2017 | Itabashi et al. | |
| 11,687,016 | B2 | 6/2023 | Itabashi et al. | |
| 2003/0185579 | A1 | 10/2003 | Nishino et al. | |
| 2004/0223772 | A1 | 11/2004 | Nakazato | |
| 2005/0117935 | A1 | 6/2005 | Hoshi et al. | |
| 2005/0163530 | A1 | 7/2005 | Miller | |
| 2006/0034625 | A1 | 2/2006 | Kajikawa | |
| 2006/0159487 | A1 | 7/2006 | Choi et al. | |
| 2006/0193646 | A1 | 8/2006 | Suzuki et al. | |
| 2006/0210285 | A1 | 9/2006 | Nakazato | |
| 2007/0009281 | A1 | 1/2007 | Sato et al. | |
| 2007/0059018 | A1 | 3/2007 | Tokuda | |
| 2007/0122165 | A1 | 5/2007 | Igarashi et al. | |
| 2007/0122176 | A1 | 5/2007 | Sato | |
| 2007/0140709 | A1 | 6/2007 | Yoshida et al. | |
| 2007/0140725 | A1 | 6/2007 | Kamimura | |
| 2007/0147852 | A1 | 6/2007 | Aratachi | |
| 2007/0223962 | A1 | 9/2007 | Shiraki | |
| 2008/0075506 | A1 | 3/2008 | Sato | |
| 2008/0205911 | A1 | 8/2008 | Ishikawa et al. | |
| 2008/0205928 | A1 | 8/2008 | Ishikawa | |
| 2008/0205931 | A1 | 8/2008 | Ishikawa | |
| 2008/0223173 | A1 | 9/2008 | Ishikawa | |
| 2008/0317509 | A1 | 12/2008 | Mori | |
| 2009/0052911 | A1 | 2/2009 | Richey et al. | |
| 2009/0169256 | A1 | 7/2009 | Kamimura et al. | |
| 2009/0175652 | A1 | 7/2009 | Kamimura | |
| 2010/0189466 | A1 | 7/2010 | Otani | |
| 2010/0232815 | A1 | 9/2010 | Zheng | |
| 2011/0064461 | A1 | 3/2011 | Ishii et al. | |
| 2011/0158701 | A1 | 6/2011 | Sato | |
| 2011/0206407 | A1 | 8/2011 | Mushika et al. | |
| 2011/0243578 | A1 | 10/2011 | Ukai et al. | |
| 2012/0051795 | A1 | 3/2012 | Mushika et al. | |
| 2012/0207512 | A1 | 8/2012 | Kamimura | |
| 2013/0051813 | A1 | 2/2013 | Itabashi et al. | |
| 2013/0051814 | A1 | 2/2013 | Itabashi et al. | |
| 2013/0051815 | A1 | 2/2013 | Itabashi et al. | |
| 2013/0051816 | A1 | 2/2013 | Itabashi | |
| 2013/0084081 | A1 | 4/2013 | Itabashi et al. | |
| 2013/0084082 | A1 | 4/2013 | Itabashi et al. | |
| 2013/0084083 | A1 | 4/2013 | Itabashi et al. | |
| 2013/0084084 | A1 | 4/2013 | Itabashi et al. | |
| 2013/0177326 | A1 | 7/2013 | Hamaya | |
| 2014/0086613 | A1 | 3/2014 | Itabashi et al. | |
| 2018/0181022 | A1* | 6/2018 | Itabashi | G03G 15/0806 |
| 2022/0253003 | A1 | 8/2022 | Itabashi et al. | |

FOREIGN PATENT DOCUMENTS

| | | | |
|---|---|---|---|
| CN | 101256379 | A | 9/2008 |
| CN | 101256382 | A | 9/2008 |
| CN | 101256383 | A | 9/2008 |
| CN | 201207130 | Y | 3/2009 |
| CN | 201464807 | U | 5/2010 |
| CN | 201489284 | U | 5/2010 |
| CN | 102163029 | A | 8/2011 |
| CN | 102207724 | A | 10/2011 |
| CN | 102968023 | B | 2/2015 |
| CN | 102968029 | B | 3/2015 |
| EP | 1696284 | A2 | 8/2006 |
| EP | 1950625 | A2 | 7/2008 |
| EP | 2194431 | A2 | 6/2010 |
| EP | 2290471 | A1 | 3/2011 |
| EP | 2365402 | A2 | 9/2011 |
| JP | S63-118042 | U | 7/1988 |
| JP | H02-78949 | U | 6/1990 |
| JP | H02-262168 | A | 10/1990 |
| JP | H03-212656 | A | 9/1991 |
| JP | H03-279965 | A | 12/1991 |
| JP | 4-31156 | U | 3/1992 |
| JP | H04-191773 | A | 7/1992 |
| JP | H04-112263 | U | 9/1992 |
| JP | H04-114057 | U | 10/1992 |
| JP | 06-202403 | A | 7/1994 |
| JP | H07-160173 | A | 6/1995 |
| JP | 09-171340 | A | 6/1997 |
| JP | 09-190136 | A | 7/1997 |
| JP | H11-84850 | A | 3/1999 |
| JP | 2001-222204 | A | 8/2001 |
| JP | 2002-169449 | A | 6/2002 |
| JP | 2003-271039 | A | 9/2003 |
| JP | 2004-286951 | A | 10/2004 |

(56) References Cited

FOREIGN PATENT DOCUMENTS

| | | | |
|---|---|---|---|
| JP | 2005-164751 | A | 6/2005 |
| JP | 2006-235236 | A | 9/2006 |
| JP | 2006-267994 | A | 10/2006 |
| JP | 2006-337401 | A | 12/2006 |
| JP | 2007-079284 | A | 3/2007 |
| JP | 2007-093753 | A | 4/2007 |
| JP | 2007-148285 | A | 6/2007 |
| JP | 2007-164095 | A | 6/2007 |
| JP | 2007-256663 | A | 10/2007 |
| JP | 2008-76888 | A | 4/2008 |
| JP | 2008-216391 | A | 9/2008 |
| JP | 2008-216392 | A | 9/2008 |
| JP | 2008-216393 | A | 9/2008 |
| JP | 2009-003375 | A | 1/2009 |
| JP | 2009-162912 | A | 7/2009 |
| JP | 2009-175293 | A | 8/2009 |
| JP | 2009-180984 | A | 8/2009 |
| JP | 2009-223017 | A | 10/2009 |
| JP | 2009-288549 | A | 12/2009 |
| JP | 2010-039437 | A | 2/2010 |
| JP | 2011-013323 | A | 1/2011 |
| JP | 2011-075986 | A | 4/2011 |
| JP | 2011-215374 | A | 10/2011 |

OTHER PUBLICATIONS

Jun. 20, 2019—(CN) Notification of the Second Office Action—App 201610204572.0, Eng Tran.
Jun. 20, 2019—(CN) Notification of the Second Office Action—App 201610204590.9, Eng Tran.
Jun. 20, 2019—(CN) Notification of the Second Office Action—App 201610206001.0, Eng Tran.
Jun. 3, 2019—(EP) Office Action—App 16 165 040.3.
International Search Report and Written Opinion dated Oct. 23, 2012, PCT/JP2012/071955.
Extended EP Search Report dated Mar. 5, 2013, EP Appln. 12182298.5.
Extended EP Search Report dated Apr. 17, 2013, EP Appln. 12182300.9.
JP Office Action dated Jul. 23, 2013, JP Appln. 2011-190035, English translation.
Non Final Office Action issued in corresponding U.S. Appl. No. 13/598,895, dated Dec. 20, 2013.
Ex Parte Quayle issued in U.S. Appl. No. 13/598,859 mailed Jan. 24, 2014.
CN Notification of the First Office Action dated Mar. 5, 2014, CN Appln. 201210324350.4, English translation.
CN Notification of the First Office Action dated Mar. 5, 2014, CN Appln. 201210324506.9, English translation.
Notice of Allowance issued in U.S. Appl. No. 13/598,717 dated Apr. 7, 2014.
CN Notification of the First Office Action dated Mar. 25, 2014, CN Appln. 201210324571.1, English translation.
CN Notification of the First Office Action dated Apr. 1, 2014, CN Appln. 201210324573.0, English translation.
CN Notification of the First Office Action dated Apr. 2, 2014, CN Appln. 201210324374.X, English translation.
International Preliminary Report on Patentability dated Mar. 13, 2014 (dated Mar. 4, 2014), PCT/JP2012/071955 correction).
Non-Final Office Action received in corresponding U.S. Appl. No. 13/599,157 dated Jun. 19, 2014.
Notice of Allowance issued in corresponding U.S. Appl. No. 13/598,895 dated Jul. 21, 2014.
Notice of Allowance issued in corresponding U.S. Appl. No. 13/598,859 dated Jul. 17, 2014.
Aug. 27, 2014—(EP) Extended Search Report—App. 12182301.7.
Oct. 2, 2014—(EP) Extended Search Report—App 12182299.3.
Oct. 16, 2014—U.S. Final Office Action—U.S. Appl. No. 13/599,157.
Oct. 29, 2014—U.S. Notice of Allowance—U.S. Appl. No. 13/598,859.
Oct. 27, 2014—U.S. Notice of Allowance—U.S. Appl. No. 13/598,895.
Feb. 3, 2015—(CN) Notification of the Second Office Action—App 201210324374.X, Eng Tran.
Apr. 10, 2015—U.S. Non-Final Office Action—U.S. Appl. No. 14/644,333.
Apr. 15, 2015—U.S. Notice of Allowance—U.S. Appl. No. 14/658,448.
Jul. 28, 2015—(CN) Notification of the Third Office Action—App 201210324374.X, Eng Tran.
Jan. 21, 2016—U.S. Non-Final Office Action—U.S. Appl. No. 14/933,824.
Mar. 2, 2016—U.S. Notice of Allowance—U.S. Appl. No. 14/665,763.
Apr. 22, 2016—U.S. Non-Final Office Action—U.S. Appl. No. 15/042,765.
May 20, 2016—U.S. Non-Final Office Action—U.S. Appl. No. 14/644,333.
Jun. 23, 2016—U.S. Final Office Action—U.S. Appl. No. 14/933,824.
May 30, 2017—(JP) Office Action—App 2016-134837, Eng Tran.
Jun. 26, 2017—U.S. Non-Final Office Action—U.S. Appl. No. 15/428,272.
Aug. 22, 2017—(JP) Office Action—App 2016-134837, Eng Tran.
Oct. 10, 2017—U.S. Non-Final Office Action—U.S. Appl. No. 15/668,085.
Jun. 1, 2018—U.S. Non-Final Office Action—U.S. Appl. No. 15/884,870.
Jun. 6, 2018—(CA) Office Action—App 2,846,368.
Aug. 6, 2018—U.S. Notice of Allowance—U.S. Appl. No. 15/428,272.
Jul. 20, 2018—(CN) Notification of First Office Action—App 201510048294.X, Eng Tran.
Jul. 20, 2018—(CN) Notification of First Office Action—App 201510049957.X, Eng Tran.
Aug. 3, 2018—(CN) Notification of First Office Action—App 201510024679.2, Eng Tran.
Aug. 3, 2018—(CN) Notification of First Office Action—App 201510024804.X, Eng Tran.
Aug. 28, 2018—(CN) Notification of the First Office Action—App 201510088561.6, Eng Tran.
Sep. 20, 2018—U.S. Notice of Allowance—U.S. Appl. No. 15/668,085.
Oct. 18, 2018—(EP) Office Action—App 16165040.3.
Dec. 12, 2018—U.S. Notice of Allowance—U.S. Appl. No. 15/668,085.
Office Action issued in related U.S. Appl. No. 17/820,292, dated Mar. 31, 2023.
Office Action issued in related U.S. Appl. No. 17/513,061, dated Dec. 5, 2022.
Final Office Action issued in related U.S. Appl. No. 17/513,061, dated Apr. 26, 2023.
Dec. 25, 2018—(CN) Notification of the First Office Action—App 201610204572.0, Eng Tran.
Dec. 25, 2018—(CN) Notification of the First Office Action—App 201610204590.9, Eng Tran.
Dec. 25, 2018—(CN) Notification of the First Office Action—App 201610206001.0, Eng Tran.
Feb. 8, 2019—(EP) Office Action—App 16165040.3.
Office Action issued in corresponding German patent application No. 11 2012 003 620.4, dated Mar. 12, 2021.
Extended European Search Report issued in corresponding European Patent Application No. 22155550.1, dated Apr. 25, 2022.
Office Action issued in co-pending related U.S. Appl. No. 17/332,275, dated Sep. 23, 2022.
Office Action (Notice of Reasons for Refusal) issued in corresponding Japanese Patent Application No. 2021-149178, dated Sep. 6, 2022.
Office Action issued in related U.S. Appl. No. 17/174,500, dated Dec. 23, 2022.
Office Action issued in related U.S. Appl. No. 17/513,061, dated Sep. 8, 2023.
Office Action issued in corresponding European application 22155550.1, dated Sep. 20, 2023.
Office Action issued in non-final office action issued in related U.S. Appl. No. 17/820,292, filed Feb. 26, 2024.

* cited by examiner

81

DEVELOPING CARTRIDGE HAVING COUPLING AND DEVELOPING ROLLER

CROSS REFERENCE TO RELATED APPLICATION

This application is a continuation of U.S. patent application Ser. No. 17/820,292, filed Aug. 17, 2022, which is a continuation of U.S. patent application Ser. No. 17/730,552, filed Apr. 27, 2022, now U.S. Pat. No. 11,687,016, issued Jun. 27, 2023, which is a continuation of U.S. patent application Ser. No. 17/174,500, filed Feb. 12, 2021, which is a continuation of U.S. patent application Ser. No. 16/930,865, filed Jul. 16, 2020, now U.S. Pat. No. 10,921,732, issued Feb. 16, 2021, which is a continuation of U.S. patent application Ser. No. 16/723,160 filed Dec. 20, 2019, now U.S. Pat. No. 11,022,912, issued Jun. 1, 2021, which is a continuation of U.S. patent application Ser. No. 16/263,224 filed Jan. 31, 2019, now U.S. Pat. No. 10,520,855, issued Dec. 31, 2019, which is a continuation of U.S. patent application Ser. No. 15/820,203, filed Nov. 21, 2017, now U.S. Pat. No. 10,496,011, issued Dec. 3, 2019, which is a continuation of U.S. patent application Ser. No. 15/363,985, filed Nov. 29, 2016, now U.S. Pat. No. 9,846,387, issued Dec. 19, 2017, which is a continuation of U.S. patent application Ser. No. 15/061,551, filed Mar. 4, 2016, now U.S. Pat. No. 9,529,319, issued Dec. 27, 2016, which is a continuation of U.S. patent application Ser. No. 14/665,763, filed Mar. 23, 2015, now U.S. Pat. No. 9,395,684, issued Jul. 19, 2016, which is a continuation of U.S. patent application Ser. No. 13/598,708, filed on Aug. 30, 2012, now U.S. Pat. No. 8,995,866, issued Mar. 31, 2015, which claims priority from Japanese Patent Application No. 2011-190035 filed Aug. 31, 2011. The contents of the above noted applications are incorporated herein by reference in their entirety.

TECHNICAL FIELD

The present invention relates to a cartridge for being mounted in an image forming apparatus of an electrophotographic type.

BACKGROUND

There is known, as a printer of the electrophotographic type, such a printer that includes a photosensitive body and a developing cartridge for supplying toner to the photosensitive body.

Such a type of printer includes a new-product detecting unit for judging information on a developing cartridge mounted in the printer. For example, the new-product detecting unit is for judging whether or not the cartridge is a new product that is newly mounted in the printer.

For example, there has been proposed a laser printer. The laser printer has a main casing, in which a developing cartridge is detachably mountable. The main casing is provided with an actuator and a photosensor. The developing cartridge rotatably supports a detection gear. The detection gear is provided with a protrusion that is for being in abutment contact with the actuator. When the developing cartridge is mounted in the main casing, the detection gear is driven to rotate. The protrusion causes the actuator to swing. The photosensor detects the swinging movement of the actuator. The laser printer judges information on the developing cartridge based on the detection results by the photosensor.

SUMMARY

In the laser printer described above, the detection gear is mounted on a side wall of the developing cartridge, on which an input gear is also mounted. The input gear is for receiving a driving force from the main casing.

An object of the invention is to provide an improved cartridge that can be reduced in size.

In order to attain the above and other objects, the invention provides a cartridge, including: a housing; a coupling member; a detection body; a rotating member; a first driving force transmission member; and a second driving force transmission member. The housing has a developer accommodating portion configured to accommodate developer therein and includes a first side wall and a second side wall, the first side wall and the second side wall being spaced apart from each other in a predetermined direction and opposing with each other in the predetermined direction, a from-first-to-second direction being defined along the predetermined direction as being directed from the first side wall to the second side wall. The coupling member is configured to receive driving force from outside, the coupling member is disposed at a position opposite to the developer accommodating portion with respect to the first side wall. The detection body is for being detected by an external detecting unit, the detection body is disposed at a position opposite to the developer accommodating portion with respect to the second side wall. The rotating member is configured to rotate around a rotational axis extending in the predetermined direction, at least part of the rotating member being disposed between the first and second side walls. The first driving force transmission member is configured to rotate together with the rotating member around the rotational axis, is positioned at the same side with the coupling member with respect to the first side wall, and is configured to transmit the driving force from the coupling member to the rotating member. The second driving force transmission member is configured to rotate together with the rotating member around the rotational axis, is positioned at the same side with the detection body with respect to the second side wall, and is configured to transmit the driving force from the rotating member to the detection body.

BRIEF DESCRIPTION OF THE DRAWINGS

The particular features and advantages of the invention as well as other objects will become apparent from the following description taken in connection with the accompanying drawings, in which:

FIGS. 7A-7C illustrate a new-product detection gear shown in FIG. 5, in which FIG. 7A is a perspective view of the new-product detection gear seen from an upper right side, FIG. 7B is a right side view of the new-product detection gear, and FIG. 7C is a sectional view of a detection end portion in the new-product detection gear;

FIGS. 11-13 illustrate how a swing electrode shown in FIG. 10 swings in the printer, wherein FIG. 11 shows a state where the developing cartridge is not mounted in the main casing and the swing electrode is located at a lower disconnection position, FIG. 12 shows the state where the developing cartridge is mounted in the main casing and the swing electrode is located at a connection position, and FIG. 13 shows a state where the developing cartridge is mounted in the main casing and the swing electrode is located at an upper disconnection position;

FIGS. 14-18 illustrate how a new-product detection process is executed, wherein FIG. 14 shows the state just after the developing cartridge is newly mounted in the main casing and the swing electrode is in contact with an electric-power receiving portion in the developing cartridge, FIG. 15 shows the state which follows the state of FIG. 14 and in which a warming up operation begins and the swing electrode is separated away from the electric-power receiving portion, FIG. 16 shows the state which follows the state of FIG. 15 and in which the swing electrode is again in contact with the electric-power receiving portion, FIG. 17 shows the state which follows the state of FIG. 16 and in which the swing electrode is again separated away from the electric-power receiving portion, and FIG. 18 shows the state which follows the state of FIG. 17 and in which the swing electrode is again in contact with the electric-power receiving portion;

FIGS. 20-22 illustrate how a new-product detection process is executed onto the developing cartridge of the second embodiment, wherein FIG. 20 shows the state just after the developing cartridge is newly mounted in the main casing and the swing electrode is in contact with the electric-power receiving portion, FIG. 21 shows the state which follows the state of FIG. 20 and in which a warming up operation begins and the swing electrode is separated away from the electric-power receiving portion, and FIG. 22 shows the state which follows the state of FIG. 21 and in which the swing electrode is again in contact with the electric-power receiving portion;

FIGS. 32-34 illustrate how a rotation plate shown in FIG. 31 rotates, wherein FIG. 32 shows the state just after the developing cartridge of FIG. 31 is newly mounted in the main casing of a printer of the seventh embodiment and the rotation plate is at a first position, FIG. 33 shows the state which follows the state of FIG. 32 and in which the rotation plate is at a second position, and FIG. 34 shows the state which follows the state of FIG. 33 and in which the rotation plate is at a third position;

FIGS. 36A-36C illustrate how a new-product detection process is executed according to the seventh embodiment, wherein FIG. 36A shows the state just after the developing cartridge is newly mounted in the main casing and the moving electrode is in contact with an electric-power receiving portion of the developing cartridge, FIG. 36B shows the state which follows the state of FIG. 36A and in which a warming up operation begins and the moving electrode is separated away from the electric-power receiving portion, and FIG. 36C shows the state which follows the state of FIG. 36B and in which the moving electrode is again in contact with the electric-power receiving portion;

FIGS. 38-40 illustrate how a slide plate shown in FIG. 37 slides, wherein FIG. 38 shows the state just after the developing cartridge of FIG. 37 is newly mounted in the main casing of a printer of the eighth embodiment and the slide plate is at a first position, FIG. 39 shows the state which follows the state of FIG. 38 and in which the slide plate is at a second position, and FIG. 40 shows the state which follows the state of FIG. 39 and in which the slide plate is at a third position; and FIGS. 41A-41C illustrate how a new-product detection process is executed according to the eighth embodiment, wherein FIG. 41A shows the state just after the developing cartridge is newly mounted in the main casing and the moving electrode is in contact with an electric-power receiving portion of the developing cartridge, FIG. 41B shows the state which follows the state of FIG. 41A and in which a warming up operation begins and the moving electrode is separated away from the electric-power receiving portion, and FIG. 41C shows the state which follows the state of FIG. 41B and in which the moving electrode is again in contact with the electric-power receiving portion.

DETAILED DESCRIPTION

Figure 1:
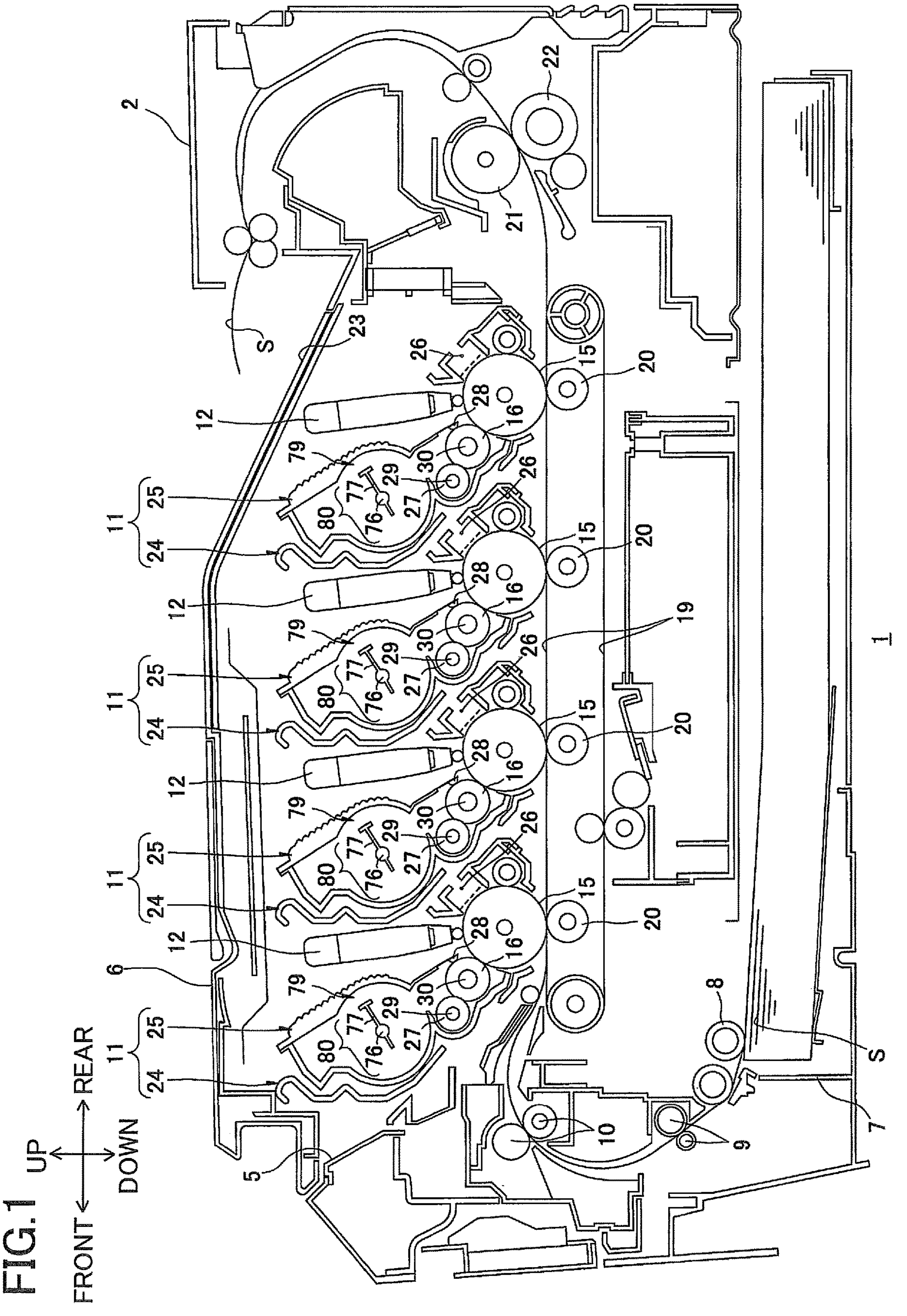
FIG. 1 is a cross-sectional view of a printer taken along a line that extends in a right-left center of the printer, developing cartridges according to a first embodiment of the invention being mounted in the printer.

A cartridge according to embodiments of the invention will be described while referring to the accompanying drawings wherein like parts and components are designated by the same reference numerals to avoid duplicating description.

A cartridge according to a first embodiment of the present invention will be described below with reference to FIGS. 1-18.

1. Overall Configuration of Printer

As shown in FIG. 1, a printer 1 is a color printer of a horizontal, direct tandem type.

In the following description, at the time of referring to directions, with respect to the situation where the printer 1 is placed horizontally for being used by a user, the left side on paper surface of FIG. 1 is referred to as front side, and the right side on paper surface of FIG. 1 as rear side. The criteria of left and right are set when the front side of the printer 1 is seen. That is, the near side on paper surface of FIG. 1 is referred to as right side, and the back side on paper surface as left side.

The printer 1 is provided with a main casing 2 that is substantially in a box shape. A top cover 6 is swingably provided on a top end of the main casing 2, with a rear end of the top cover 6 serving as a fulcrum. The top cover 6 is for opening and closing a main-casing opening 5. The printer 1 is detachably mounted with four process cartridges 11 corresponding to each color.

The process cartridges 11 are each mountable in and detachable from the main casing 2. When being mounted in the main casing 2, the process cartridges 11 are spaced out from each other along the front-back direction and are arranged in parallel above a paper feeding portion 3. The process cartridges 11 each include a drum cartridge 24 and a developing cartridge 25 according to the first embodiment. The developing cartridge 25 is detachably mountable on the drum cartridge 24.

The drum cartridge 24 is provided with a photosensitive drum 15.

The photosensitive drum 15 is formed in a cylindrical shape that is elongated in the left-right direction, and is rotatably mounted in the drum cartridge 24.

The developing cartridge 25 is provided with a developing roller 16.

The developing roller 16 has a developing roller shaft 30. The developing roller shaft 30 is formed of metal and extends in the left-right direction. The developing roller 16 is mounted in the rear end portion of the developing cartridge 25 so that the rear side of the developing roller 16 is exposed to the outside of the developing cartridge 25 and is in contact with the front upper side of the photosensitive drum 15. The developing roller 16 rotates about a central axis A1 of the developing roller shaft 30 (see FIG. 4).

The developing cartridge 25 is further provided with a supply roller 27 and a layer thickness regulating blade 28. The supply roller 27 is for supplying toner to the developing roller 16. The layer thickness regulating blade 28 is for regulating the thickness of toner supplied on the developing roller 16. The developing cartridge 25 has a toner accommodating portion 79 above the supply roller 27 and the layer thickness regulating blade 28. Toner is accommodated in the toner accommodating portion 79. An agitator 80 is provided in the toner accommodating portion 79. The agitator 80 is for stirring toner accommodated in the toner accommodating portion 79.

The supply roller 27 has a supply roller shaft 29. The supply roller shaft 29 is formed of metal and extends in the left-right direction. The supply roller 27 is in contact with the front upper side of the developing roller 16.

The layer thickness regulating blade 28 is in contact with the rear upper side of the developing roller 16.

The agitator 80 has an agitator shaft 76 and an agitating blade 77. The agitator shaft 76 extends in the left-right direction. The agitating blade 77 extends radially outwardly from the agitator shaft 76. The agitator 80 rotates around a central axis A2 of the agitator shaft 76 (see FIG. 4).

Toner supplied from the toner accommodating portion 79 is triboelectrically charged to positive polarity between the supply roller 27 and the developing roller 16, and is borne on the surface of the developing roller 16 as a thin layer of a constant thickness.

A surface of each photosensitive drum 15 is uniformly charged by a Scorotron-type charger 26, and is then exposed to light that is irradiated by an LED unit 12 on the basis of predetermined image data. As a result, an electrostatic latent image is formed on the basis of the image data. Then, toner supported on the developing roller 16 is supplied to the electrostatic latent image on the surface of the photosensitive drum 15. As a result, a toner image (developer image) is borne on the surface of the photosensitive drum 15.

Sheets of paper S are stored in a paper feed tray 7 provided in a bottom portion of the main casing 2. Sheets of paper S are fed by a pickup roller 8, paper feeding rollers 9 and a pair of registration rollers 10, and are conveyed through a U-turn path to the rear upper side of the main casing 2. One paper sheet is fed at a time to between a photosensitive drum 15 and a conveyance belt 19 at a predetermined timing, and is conveyed by the conveyance belt 19 from the front to the rear between each photosensitive drum 15 and each transfer roller 20. At this time, the toner image of each color is sequentially transferred to the paper sheet S, and a color image is formed as a result.

Then, the paper sheet S is heated and pressed while passing between a heating roller 21 and a pressure roller 22. At this time, the color image is thermally fixed onto the paper sheet S.

Then, the paper sheet S is conveyed through a U-turn path to the front upper side of the main casing 2 and is finally discharged onto a paper discharge tray 23 provided on the top cover 6.

2. Details of Developing Cartridge

Figure 2:
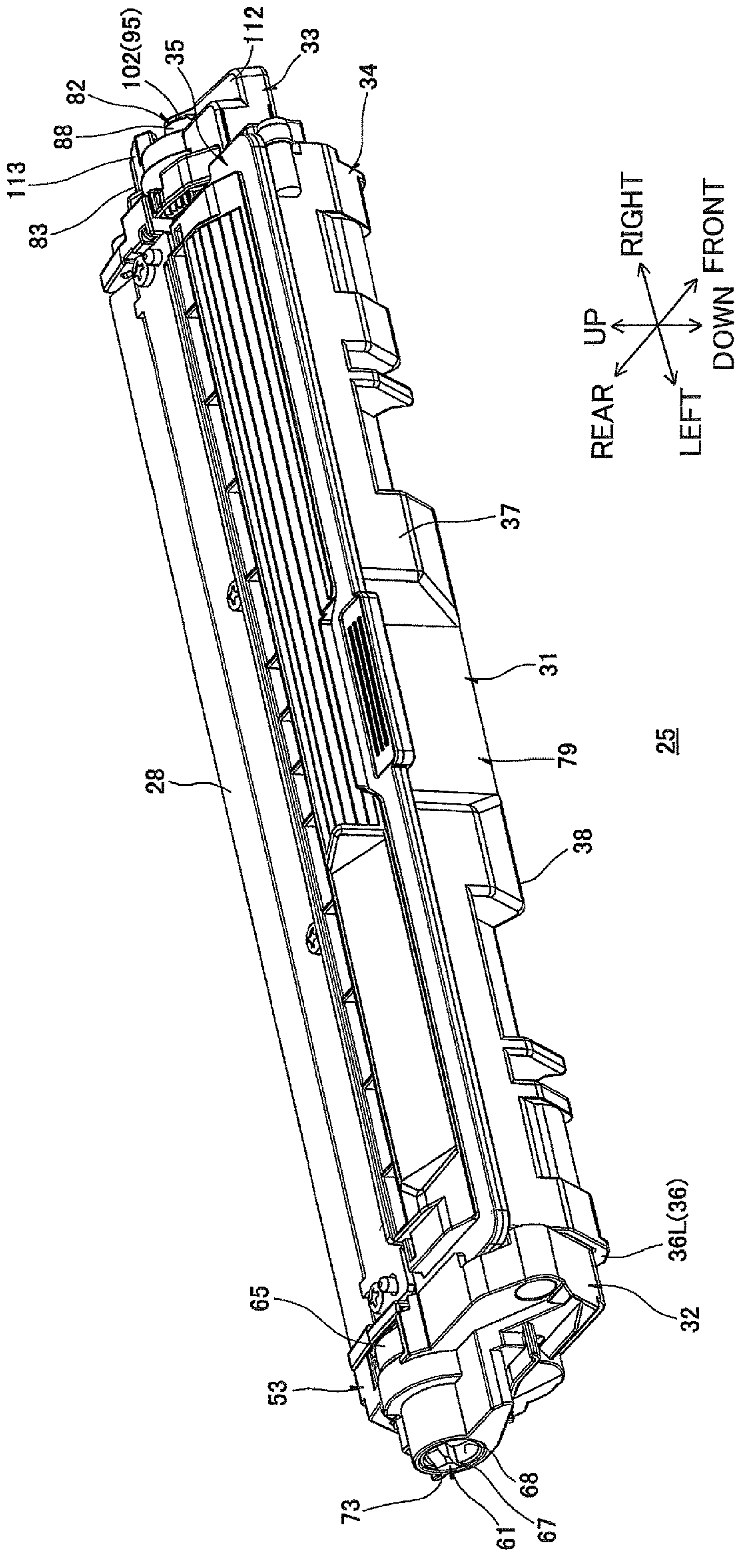
FIG. 2 is a perspective view of the developing cartridge shown in FIG. 1, the developing cartridge being seen from its upper left side.
Figure 3:
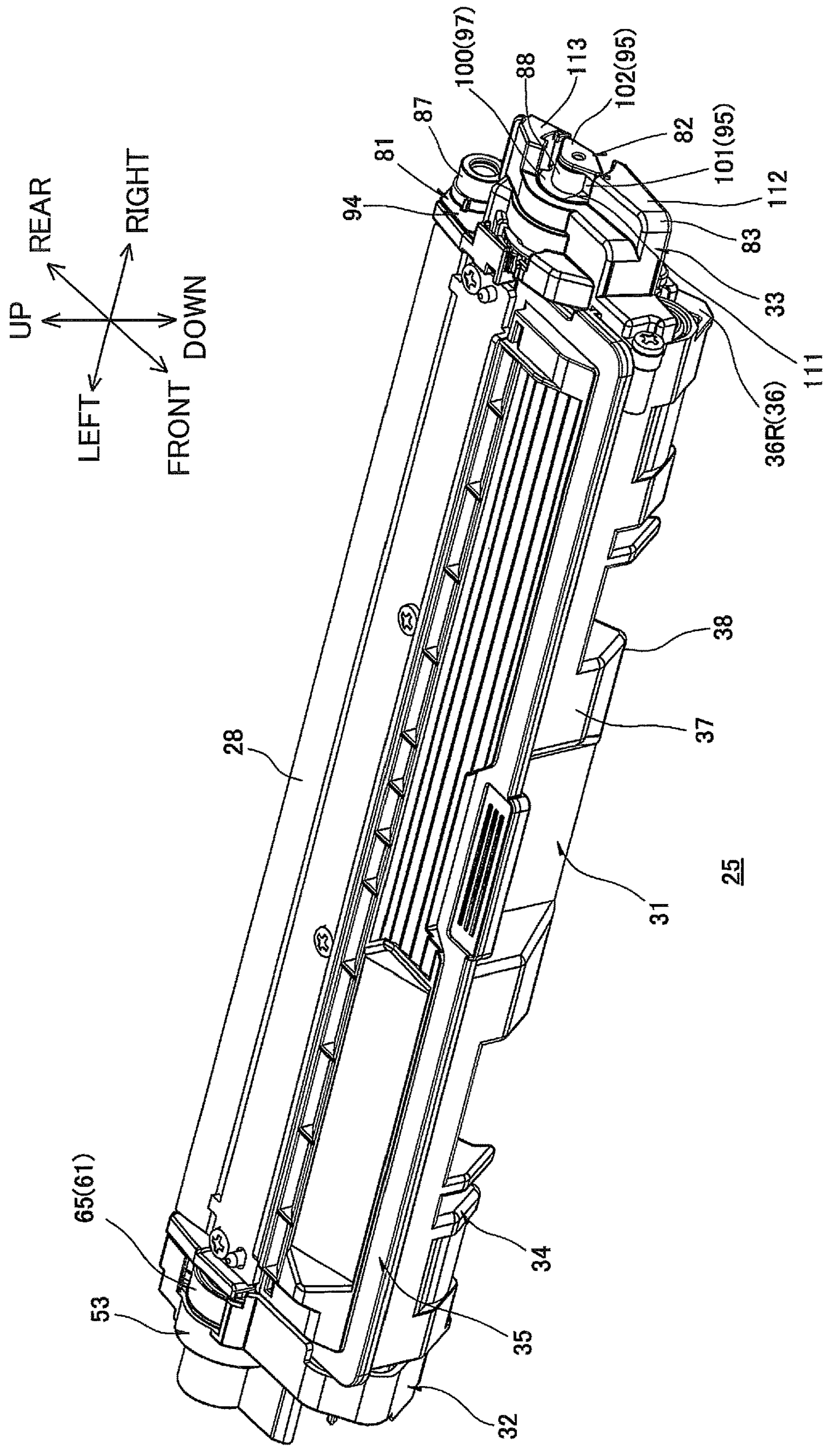
FIG. 3 is a perspective view of the developing cartridge seen from its upper right side.

As shown in FIGS. 2 and 3, the developing cartridge 25 is provided with a cartridge frame 31, a driving unit 32, and an electric-power supplying unit 33. The driving unit 32 is disposed on the left side of the cartridge frame 31, while the electric-power supplying unit 33 is disposed on the right side of the cartridge frame 31.

Incidentally, at the time of describing the developing cartridge 25 and referring to directions, a side on which the developing roller 16 is disposed is referred to as the rear side of the developing cartridge 25, and a side on which the layer thickness regulating blade 28 is disposed is referred to as upper side. That is, the up-down and front-back directions associated with the developing cartridge 25 are different from the up-down and front-back directions associated with the printer 1. The developing cartridge 25 is mounted in the drum cartridge 24 and the printer 1 in such an orientation that the rear side of the developing cartridge 25 corresponds to a rear lower side of the printer 1, and the front side of the developing cartridge 25 corresponds to a front upper side of the printer 1.

(1) Cartridge Frame

The cartridge frame 31 is formed substantially in a box shape extending in the left-right direction. The cartridge frame 31 has a first frame 34 and a second frame 35. The first frame 34 makes up a lower side of the cartridge frame 31, and the second frame 35 makes up an upper side of the cartridge frame 31.

(1-1) First Frame

Figure 4:
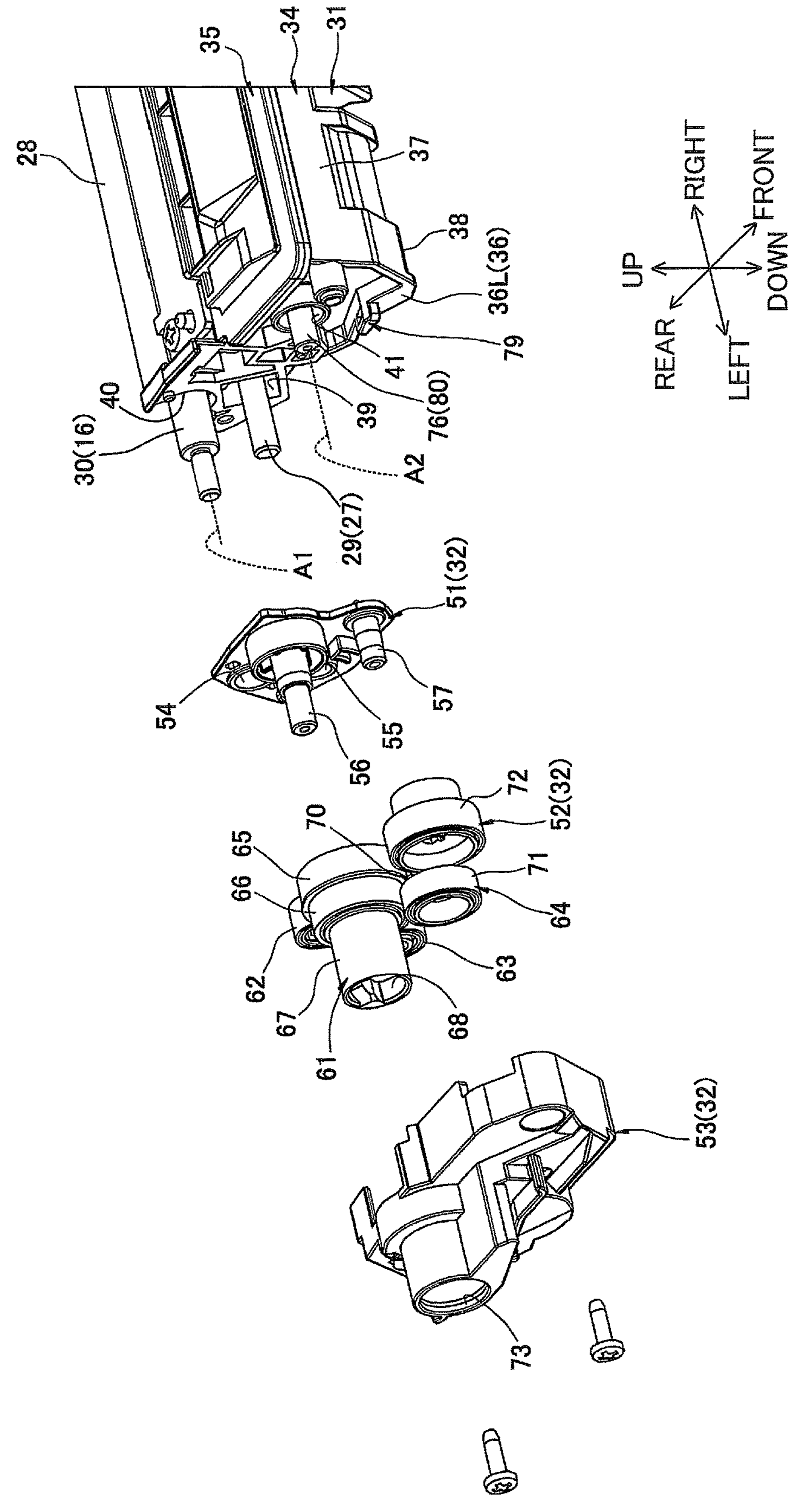
FIG. 4 is an exploded perspective view of a driving unit shown in FIG. 2, the driving unit being seen from its upper left side.
Figure 5:
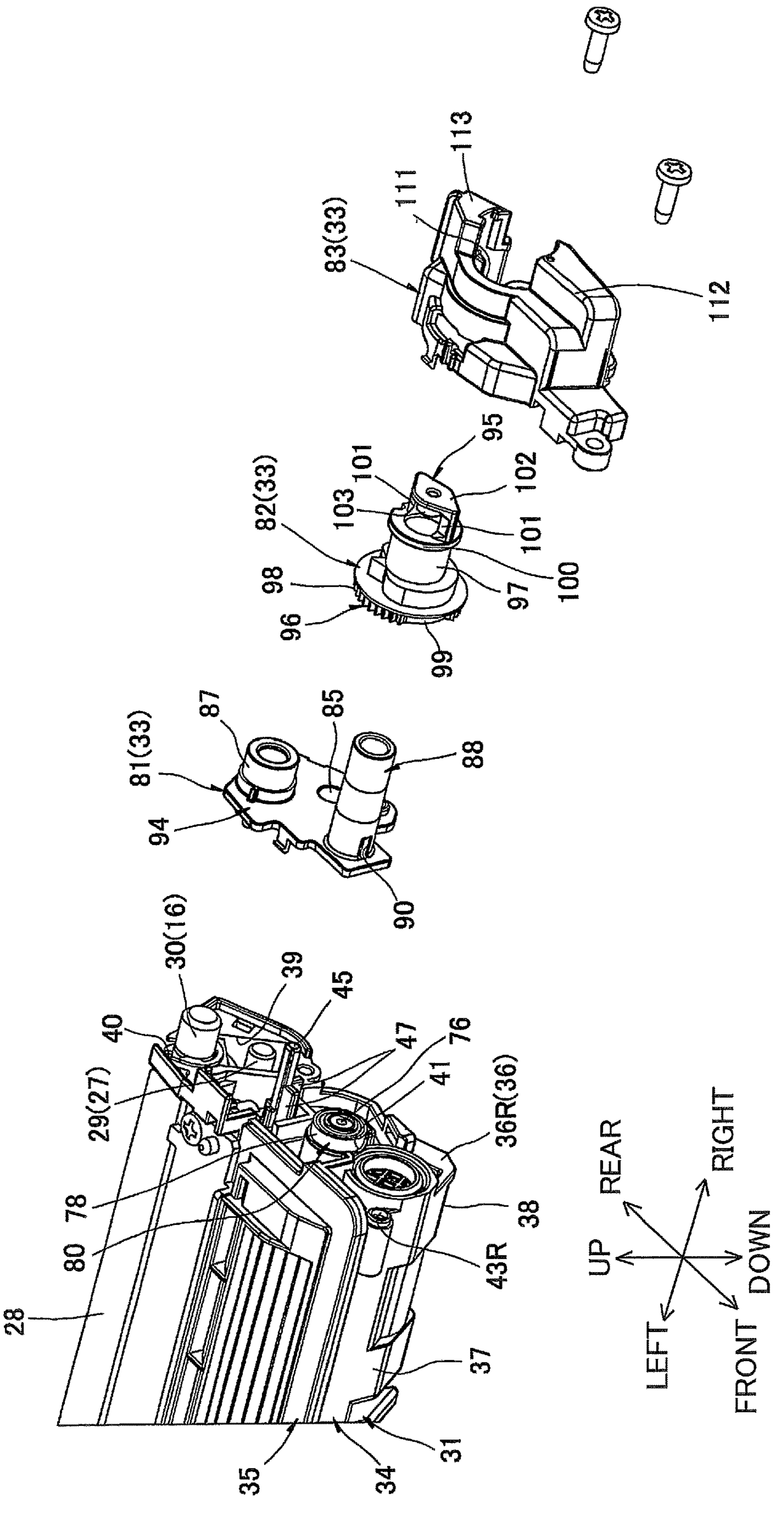
FIG. 5 is an exploded perspective view of an electric-power supplying unit shown in FIG. 3, the electric-power supplying unit being seen from its upper right side.

As shown in FIGS. 4 and 5, the first frame 34 integrally has a pair of left and right side walls 36, a front wall 37, and a lower wall 38, and is formed in a frame shape that has a bottom and is open to the upper and rear sides.

Incidentally, in the following description, the left-side side wall 36 is referred to as a left wall 36L, and the right-side side wall 36 is referred to as a right wall 36R.

The side walls 36 are both formed substantially in the shape of a rectangle extending in the up-down and front-back directions when viewed from the sides. The side walls 36 are spaced out from each other in the left-right direction and are disposed so as to face each other. Each side wall 36 is formed with a supply roller shaft exposure through-hole 39, a developing roller shaft exposure groove 40, and an agitator shaft exposure through-hole 41.

The supply roller shaft exposure through-hole 39 is located in the lower rear end portion of the side wall 36, and penetrates the side wall 36. The supply roller shaft exposure through-hole 39 is substantially in a rectangular shape when viewed from the side. Every side of the supply roller shaft exposure through-hole 39 is longer than the diameter of the left and right end portions of the supply roller shaft 29. The left and right end portions of the supply roller shaft 29 are exposed to the outside in the left-right direction from the side walls 36 via the supply roller shaft exposure through-holes 39.

The developing roller shaft exposure groove 40 is a cutout formed on the upper rear edge of the side wall 36. The developing roller shaft exposure groove 40 is substantially in a U-shape when viewed from the side, with the opening of the U shape facing upwardly and rearwardly and the bottom of the U shape facing downwardly and forwardly. The width (up-down directional length) of the developing roller shaft exposure groove 40 is larger than the diameter of the left and right end portions of the developing roller shaft 30. The left and right end portions of the developing roller shaft 30 are exposed to the outside in the left-right direction from the side walls 36 via the developing roller shaft exposure groove 40.

The agitator shaft exposure through-hole 41 is located in the front end portion of the side wall 36, and penetrates the side wall 36. The agitator shaft exposure through-hole 41 is substantially in a circular shape when viewed from the side. The diameter of the agitator shaft exposure through-hole 41 is larger than the diameter of the left and right end portions of the agitator shaft 76. The left and right end portions of the agitator shaft 76 are exposed to the outside in the left-right direction from the side walls 36 via the agitator shaft exposure through-hole 41.

As shown in FIG. 5, a fitting projection 45 is provided on the right wall 36R.

The fitting projection 45 is located on the front side of the supply roller shaft exposure through-hole 39. The fitting projection 45 is substantially in a columnar shape and projects rightwardly from the right surface of the right wall 36R. The fitting projection 45 is provided with two pieces of protrusions 47 at its left haft part. One protrusion 47 is formed on the front side of the fitting projection 45, and the other is on the lower side of the fitting projection 45. The protrusions 47 project from the fitting projection 45 radially outwardly. Each protrusion 47 extends in the left-right direction along the left half part of the fitting projection 45.

The front wall 37 extends in the left-right direction, and spans between the front edges of the side walls 36.

The lower wall 38 extends in the left-right direction, and spans between the lower edges of the side walls 36 while being in continuity with the lower edges of the front wall 37.

(1-2) Second Frame

The second frame 35 makes up the upper side of the cartridge frame 31, and is substantially in a rectangular plate shape in a plan view. The layer thickness regulating blade 28 is attached to the rear edge of the second frame 35, and contacts the developing roller 16 from above.

(2) Driving Unit

As shown in FIGS. 2 and 4, the driving unit 32 includes a bearing member 51, a gear train 52, and a driving-side gear cover 53.

(2-1) Bearing Member

The bearing member 51 is substantially in a rectangular plate shape when viewed from the side. The bearing member 51 is formed with a developing roller shaft support through-hole 54, a supply roller shaft support through-hole 55, a coupling support shaft 56, and an idle gear support shaft 57. The developing roller shaft support through-hole 54 is for supporting the developing roller shaft 30. The supply roller shaft support through-hole 55 is for supporting the supply roller shaft 29.

The developing roller shaft support through-hole 54 is located in the upper rear end portion of the bearing member 51 and penetrates the bearing member 51. The developing roller shaft support through-hole 54 is substantially in a circular shape when viewed from the side. The inner diameter of the developing roller shaft support through-hole 54 is substantially equal to or slightly larger than the outer diameter of the developing roller shaft 30.

The supply roller shaft support through-hole 55 is located on the front lower side of the developing roller shaft support through-hole 54 and penetrates the bearing member 51. The supply roller shaft support through-hole 55 is substantially in a circular shape when viewed from the side. The inner diameter of the supply roller shaft support through-hole 55 is substantially equal to or slightly larger than the outer diameter of the supply roller shaft 29.

The coupling support shaft 56 is located on the front side of the developing roller shaft support through-hole 54 and on the upper side of the supply roller shaft support through-hole 55. The coupling support shaft 56 is substantially in a columnar shape and protrudes leftwardly from the left surface of the bearing member 51.

The idle gear support shaft 57 is located on the front end portion of the bearing member 51. The idle gear support shaft 57 is substantially in a columnar shape and protrudes leftwardly from the left surface of the bearing member 51. An idle gear 64 (described later) is supported on the idle gear support shaft 57 so as to be rotatable relative to the idle gear support shaft 57.

The bearing member 51 is fitted onto the left side of the left wall 36L in such a way that the left end portion of the developing roller shaft 30 is inserted into the developing roller shaft support through-hole 54, and the left end portion of the supply roller shaft 29 is inserted into the supply roller shaft support through-hole 55. As a result, the coupling support shaft 56 is disposed on the left side of the rear end portion of the toner accommodating portion 79.

(2-2) Gear Train

The gear train 52 includes a development coupling 61, a developing gear 62, a supply gear 63, the idle gear 64, a first agitator gear 72, and a second agitator gear 78 (See FIG. 5).

The development coupling 61 is supported on the coupling support shaft 56 so as to be rotatable relative to the coupling support shaft 56. The development coupling 61 is substantially in a columnar shape extending in the left-right direction. The development coupling 61 is integrally provided with a large-diameter gear portion 65, a small-diameter gear portion 66, and a coupling portion 67.

The large-diameter gear portion 65 is provided in the right end portion of the development coupling 61. Gear teeth are formed on the entire periphery of the large-diameter gear portion 65.

The small-diameter gear portion 66 is smaller in diameter than the large-diameter gear portion 65, and is substantially in the shape of a column that shares the central axis with the large-diameter gear portion 65. Gear teeth are formed on the entire periphery of the small-diameter gear portion 66.

The coupling portion 67 is smaller in diameter than the small-diameter gear portion 66, and is formed substantially in the shape of a column that shares the central axis with the large-diameter gear portion 65. A coupling concave portion 68 is formed on the left-side surface of the coupling portion 67. When the developing cartridge 25 is mounted in the main casing 2, a tip end of a main-casing-side coupling (not shown) provided in the main casing 2 is inserted into the coupling concave portion 68 so as not to be rotatable relative to the coupling concave portion 68. A driving force is input to the coupling concave portion 68 through the main-casing-side coupling (not shown) from the main casing 2.

The developing gear 62 is attached to the left end portion of the developing roller shaft 30 so as not to be rotatable relative to the developing roller shaft 30. The developing gear 62 is engaged with the rear side of the large-diameter gear portion 65 in the development coupling 61.

The supply gear 63 is attached to the left end portion of the supply roller shaft 29 so as not to be rotatable relative to the supply roller shaft 29. The supply gear 63 is engaged with the rear lower side of the large-diameter gear portion 65 of the development coupling 61.

The idle gear 64 is substantially in the shape of a column extending in the left-right direction. The idle gear 64 is supported on the idle gear support shaft 57 so as to be rotatable relative to the idle gear support shaft 57. The idle gear 64 is integrally provided with a large-diameter portion 71 and a small-diameter portion 70. The large-diameter portion 71 makes up the left half of the idle gear 64, and the small-diameter portion 70 makes up the right half of the idle gear 64.

The large-diameter portion 71 is substantially in the shape of a column extending in the left-right direction. The large-diameter portion 71 is engaged with the front lower side of the small-diameter gear portion 66 of the development coupling 61.

The small-diameter portion 70 is substantially in the shape of a column that extends rightwardly from the right surface of the large-diameter portion 71 and that shares the central axis with the large-diameter portion 71. The small-diameter portion 70 is disposed on the front lower side of the large-diameter gear portion 65 of the development coupling 61, and is spaced apart from the large-diameter gear portion 65.

The first agitator gear 72 is attached to the left end portion of the agitator shaft 76 so as not to be rotatable relative to the agitator shaft 76. The first agitator gear 72 is engaged with the front upper side of the small-diameter portion 70 of the idle gear 64.

As shown in FIG. 5, the second agitator gear 78 is provided on the right side of the right wall 36R. The second agitator gear 78 is attached to the right end portion of the agitator shaft 76 so as not to be rotatable relative to the agitator shaft 76. The number of teeth provided on the second agitator gear 78 is less than the number of teeth on the first agitator gear 72.

(2-3) Driving-Side Gear Cover

As shown in FIG. 4, the driving-side gear cover 53 is substantially in the shape of a tube, which extends in the left-right direction and whose left end portion is closed. The driving-side gear cover 53 is formed into such a size (front-back direction length and up-down direction length) that covers the development coupling 61, the supply gear 63, the idle gear 64, and the first agitator gear 72 as a whole. The left side wall of the driving-side gear cover 53 is formed with a coupling exposure opening 73.

The coupling exposure opening 73 is located substantially at the front-back directional center of the left wall constituting the driving-side gear cover 53. The coupling exposure opening 73 penetrates the left wall of the driving-side gear cover 53, and is substantially in a circular shape when viewed from the side so that the left surface of the coupling portion 67 is exposed outside through the coupling exposure opening 73.

The driving-side gear cover 53 allows the left surface of the coupling portion 67 to be exposed via the coupling exposure opening 73. The driving-side gear cover 53 is fixed with screws to the left wall 36L so as to cover the development coupling 61 (except the left surface of the coupling portion 67), the supply gear 63, the idle gear 64, and the first agitator gear 72.

(3) Electric-Power Supply Unit

As shown in FIGS. 3 and 5, the electric-power supplying unit 33 includes an electrode member 81, a new-product detection gear 82, and an electric-power supply-side gear cover 83.

(3-1) Electrode Member

Figure 6:
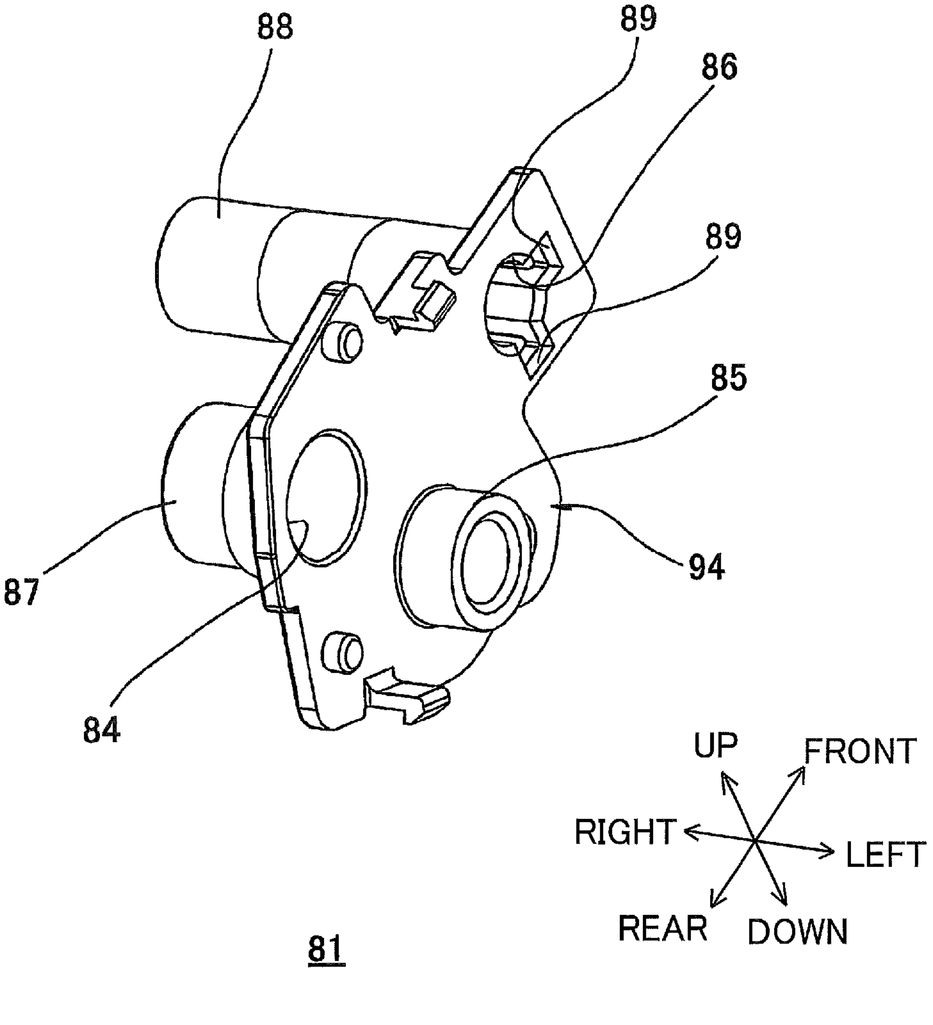
FIG. 6 is a perspective view of an electrode member shown in FIG. 5, the electrode member being seen from an upper left side.

As shown in FIGS. 5 and 6, the electrode member 81 is made of a conductive resin material (e.g., conductive polyacetal resin). The electrode member 81 has a main part 94 and an electric-power receiving portion 88.

The main part 94 is formed substantially in the shape of a rectangular plate when viewed from the side. The main part 94 is formed with a developing roller shaft support through-hole 84, a supply roller shaft support portion 85, a fitting projection insertion through-hole 86, and a developing roller shaft collar 87.

The developing roller shaft support through-hole 84 is located on the upper rear end portion of the main part 94, and penetrates the main part 94. The developing roller shaft support through-hole 84 is substantially in a circular shape when viewed from the side. The inner diameter of the developing roller shaft support through-hole 84 is substantially equal to or slightly larger than the right end portion of the developing roller shaft 30. The right end portion of the developing roller shaft 30 is supported in the developing roller shaft support through-hole 84 so as to be rotatable relative to the developing roller shaft support through-hole 84.

The supply roller shaft support portion 85 is located on the front lower side of the developing roller shaft support through-hole 84. The supply roller shaft support portion 85 is substantially in the shape of a cylinder that extends leftwardly from the left surface of the main part 94. The inner diameter of the supply roller shaft support portion 85 is substantially equal to or slightly larger than the outer diameter of the supply roller shaft 29. The right end portion of the supply roller shaft 29 is supported in the supply roller shaft support portion 85 so as to be rotatable relative to the supply roller shaft support portion 85.

The fitting projection insertion through-hole 86 is located on the front end portion of the main part 94 and penetrates the main part 94. The fitting projection insertion through-hole 86 is substantially in a circular shape when viewed from the side. As shown in FIG. 6, a pair of concave portions 89 is formed on the front and lower side edges of the fitting projection insertion through-hole 86 so as to be dented radially outwardly from the fitting projection insertion through-hole 86.

The developing roller shaft collar 87 is formed substantially in the shape of a cylinder that protrudes rightwardly from the peripheral edge of the developing roller shaft support through-hole 84.

The electric-power receiving portion 88 is formed substantially in the shape of a cylinder that projects rightwardly from the periphery of the fitting projection insertion through-hole 86 in the main part 94. The electric-power receiving portion 88 is hollow and open on both ends. The electric-power receiving portion 88 is formed with a pair of slits 90. The slits 90 are each formed through the electric-power receiving portion 88 and communicates with the corresponding concave portion 89. The slits 90 extend from the left edge of the electric-power receiving portion 88 to the right side.

The electrode member 81 is fitted onto the right side of the right wall 36R in such a way that the right end portion of the developing roller shaft 30 is inserted into the developing roller shaft support through-hole 84 and the developing roller shaft collar 87, the right end portion of the supply roller shaft 29 is inserted into the supply roller shaft support portion 85, and the fitting projection 45 is fitted into the electric-power receiving portion 88.

The right edge of the fitting projection 45 is disposed on the left side of the right edge of the electric-power receiving portion 88. The electric-power receiving portion 88 is disposed on the right side of the rear end portion of the toner accommodating portion 79.

Figure 8:
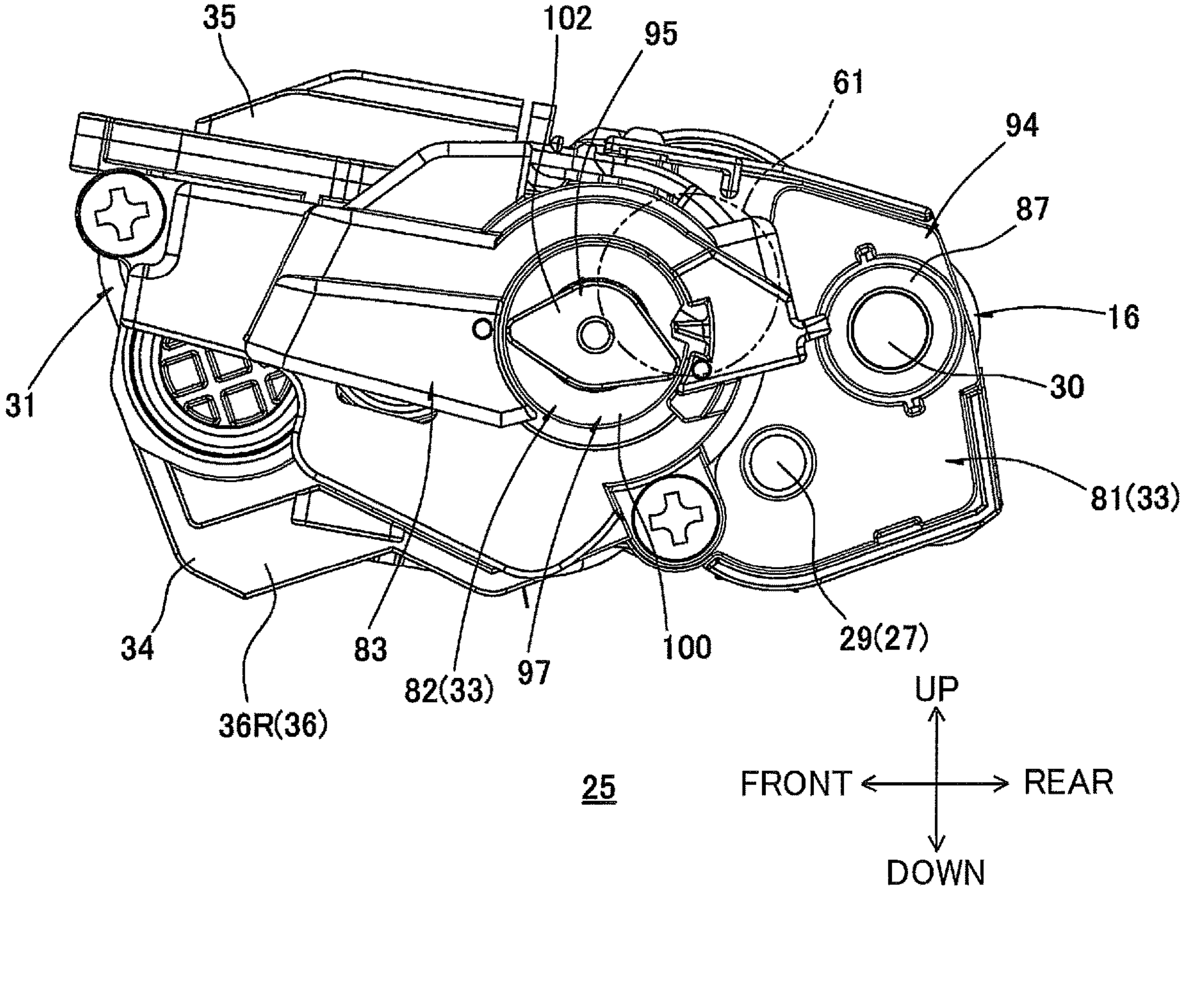
FIG. 8 is a right side view of the developing cartridge shown in FIG. 3.

As shown in FIG. 8, the electric-power receiving portion 88 and the development coupling 61 are disposed relative to each other such that when the electric-power receiving portion 88 and the development coupling 61 are projected in the left-right direction, the upper and rear end portion of the electric-power receiving portion 88 overlaps with the development coupling 61.

(3-2) New-Product Detection Gear

As shown in FIGS. 5 and 7, the new-product detection gear 82 is made of an insulating resin material (e.g., polyacetal resin), and is formed substantially in the shape of a cylinder whose central axis extends in the left-right direction. The new-product detection gear 82 is fitted onto the electric-power receiving portion 88 so as to be rotatable relative to the electric-power receiving portion 88.

For the following description of the new-product detection gear 82, the radial direction of the new-product detection gear 82 is defined as a radial direction, the circumferential direction of the new-product detection gear 82 as a circumferential direction, and the rotation direction (or clockwise direction when viewed from the right side) of the new-product detection gear 82 as a rotation direction.

Figure 7A:
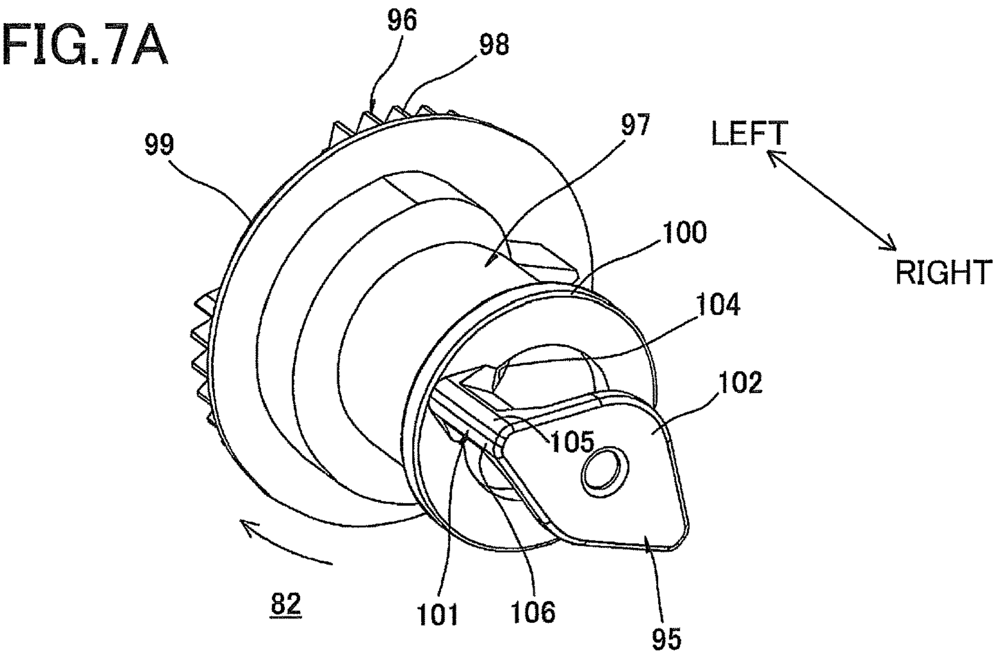

As shown in FIG. 7A, the new-product detection gear 82 is integrally provided with a tooth-missing gear 96, a cylindrical portion 97, and a detection end portion 95.

The tooth-missing gear 96 is substantially in a circular plate shape that shares the central axis with the central axis of the new-product detection gear 82, and has a thickness in the left-right direction. Gear teeth are formed on the periphery of the tooth-missing gear 96 at its portion that makes a central angle of about 205 degrees. That is, a teeth portion 98 and a tooth-missing portion 99 are formed on the peripheral surface of the tooth-missing gear 96, with gear teeth formed in the teeth portion 98 and no gear teeth in the tooth-missing portion 99. The teeth portion 98 can engage with the rear side of the second agitator gear 78. The tooth-missing portion 99 cannot engage with the second agitator gear 78.

An electric-power receiving portion insertion through-hole 104 is formed through the radial-directional center of the tooth-missing gear 96.

The electric-power receiving portion insertion through-hole 104 is substantially in a circular shape when viewed from the side and shares the central axis with the new-product detection gear 82. The diameter of the electric-power receiving portion insertion through-hole 104 is slightly larger than the outer diameter of the electric-power receiving portion 88.

The cylindrical portion 97 protrudes rightwardly from the outer periphery of the electric-power receiving portion insertion through-hole 104 of the tooth-missing gear 96. The cylindrical portion 97 is substantially in a cylindrical shape and shares the central axis with the new-product detection gear 82. A flange portion 100 projects radially outwardly from the right end portion of the cylindrical portion 97.

The detection end portion 95 is provided on the right surface of the flange portion 100. The detection end portion 95 has a pair of first covering portions 101 and a second covering portion 102.

Each first covering portion 101 is substantially in the shape of a column having a rectangular cross-section and protrudes rightwardly from the right surface of the flange portion 100. The covering portions 101 are disposed on the opposite sides of the central axis of the new-product detection gear 82 in the radial direction.

Figure 7B:
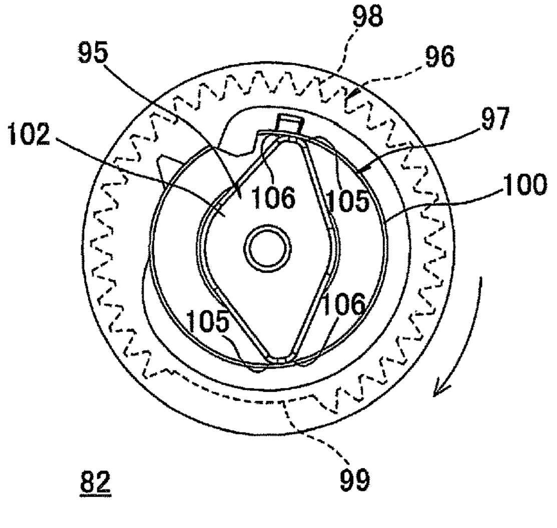

As shown in FIG. 7B, when being projected in the left-right direction, one of the first covering portions 101 is disposed radially inward of a rotation-direction downstream end of the teeth portion 98, and the other first covering portion 101 is disposed radially inward of the rotation-directional center of the teeth portion 98.

Figure 7C:
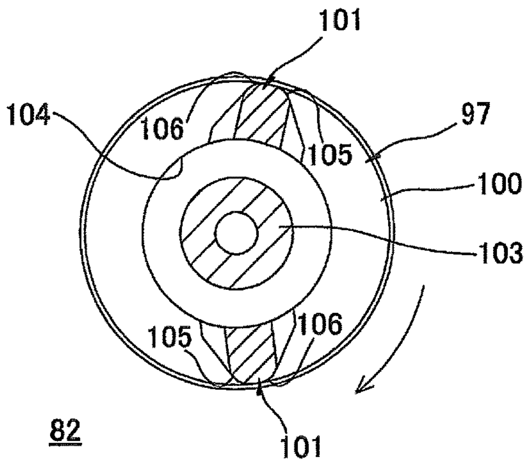

The second covering portion 102 spans between the right side edges of the pair of first covering portions 101. The second covering portion 102 is substantially in a rhombic plate shape when viewed from the side. As shown in FIGS. 5 and 7C, the second covering portion 102 is formed with a fitting portion 103. The fitting portion 103 projects leftwardly from the left surface of the second covering portion 102.

The fitting portion 103 is substantially in a cylindrical shape and shares the central axis with the new-product detection gear 82. The outer diameter of the fitting portion 103 is substantially equal to or slightly smaller than the inner diameter of the electric-power receiving portion 88.

The detection end portion 95 is opened radially outwardly at its part between the flange portion 100 and the second covering portion 102. In other words, the detection end portion 95 is formed with an opening that extends in the rotation direction surrounding the fitting portion 103, and the first covering portions 101 are provided midway in the opening in the rotation direction.

Each first covering portion 101 is chamfered at its radially outside edge on both of a pair of opposite sides in the rotating direction. More specifically, each first covering portion 101 is formed with a downstream side chamfered surface 105 and an upstream side chamfered surface 106 on its radially outside edge. The downstream side chamfered surface 105 is located on the downstream side of the first covering portion 101 in the rotating direction, while the upstream side chamfered surface 106 is located on the upstream side of the first covering portion 101 in the rotating direction. The upstream side chamfered surface 106 is continuous with the upstream side edge of the downstream side chamfered surface 105. The downstream side chamfered surface 105 is gradually inclined radially outwardly in a direction toward the upstream side in the rotating direction. The upstream side chamfered surface 106 is gradually inclined radially inwardly in a direction toward the upstream side in the rotating direction.

The new-product detection gear 82 is rotatably fitted onto the electric-power receiving portion 88 in such a manner that the electric-power receiving portion 88 is inserted into the electric-power receiving portion insertion through-hole 104 and the fitting portion 103 is inserted into the right end of the electric-power receiving portion 88.

As a result, the right end of the electric-power receiving portion 88 is covered with the first covering portions 101 from the radial-direction outside, and with the second covering portion 102 from the right side. The right end of the electric-power receiving portion 88 is exposed between the first covering portions 101.

When the developing cartridge 25 is produced by a manufacturer, the tooth-missing gear 96 is oriented so that the teeth portion 98 engages, at its rotation-direction downstream side end, with the second agitator gear 78.

The new-product detection gear 82 and the development coupling 61 are disposed relative to each other in the developing cartridge 25 so that when the new-product detection gear 82 and the development coupling 61 are projected in the left-right direction, as shown in FIG. 8, the new-product detection gear 82 overlaps, at is upper rear side end, with the development coupling 61.

(3-3) Electric-Power Supply-Side Gear Cover

As shown in FIG. 5, the electric-power supply-side gear cover 83 is substantially in the shape of a tube, which extends in the left-right direction and whose right side end is closed. The electric-power supply-side gear cover 83 is formed into such a size (front-back direction length and up-down direction length) that covers the new-product detection gear 82 and the second agitator gear 78 as a whole.

The electric-power supply-side gear cover 83 includes a new-product detection gear exposure opening 111, a front side bulging portion 112 and a rear side bulging portion 113.

The new-product detection gear exposure opening 111 is located substantially at the front-back directional center in a right wall constituting the electric-power supply-side gear cover 83. The new-product detection gear exposure opening 111 penetrates the right wall of the electric-power supply-side gear cover 83. The new-product detection gear exposure opening 111 is substantially in a circular shape when viewed from the side so that the detection end portion 95 of the new-product detection gear 82 is exposed outside through the new-product detection gear exposure opening 111.

The front side bulging portion 112 is formed substantially in the shape of a rectangle when viewed from the side, and projects from the front side peripheral edge of the new-product detection gear exposure opening 111 to the right side.

The rear side bulging portion 113 is formed substantially in the shape of a rectangle when viewed from the side, and projects from the rear side peripheral edge of the new-product detection gear exposure opening 111 to the right side.

The electric-power supply-side gear cover 83 is fixed with screws to the right wall 36R in such a way that the detection end portion 95 of the new-product detection gear 82 is exposed via the new-product detection gear exposure opening 111, and the tooth-missing gear 96 and cylindrical portion 97 of the new-product detection gear 82 and the second agitator gear 78 are covered with the electric-power supply-side gear cover 83.

Figure 9:
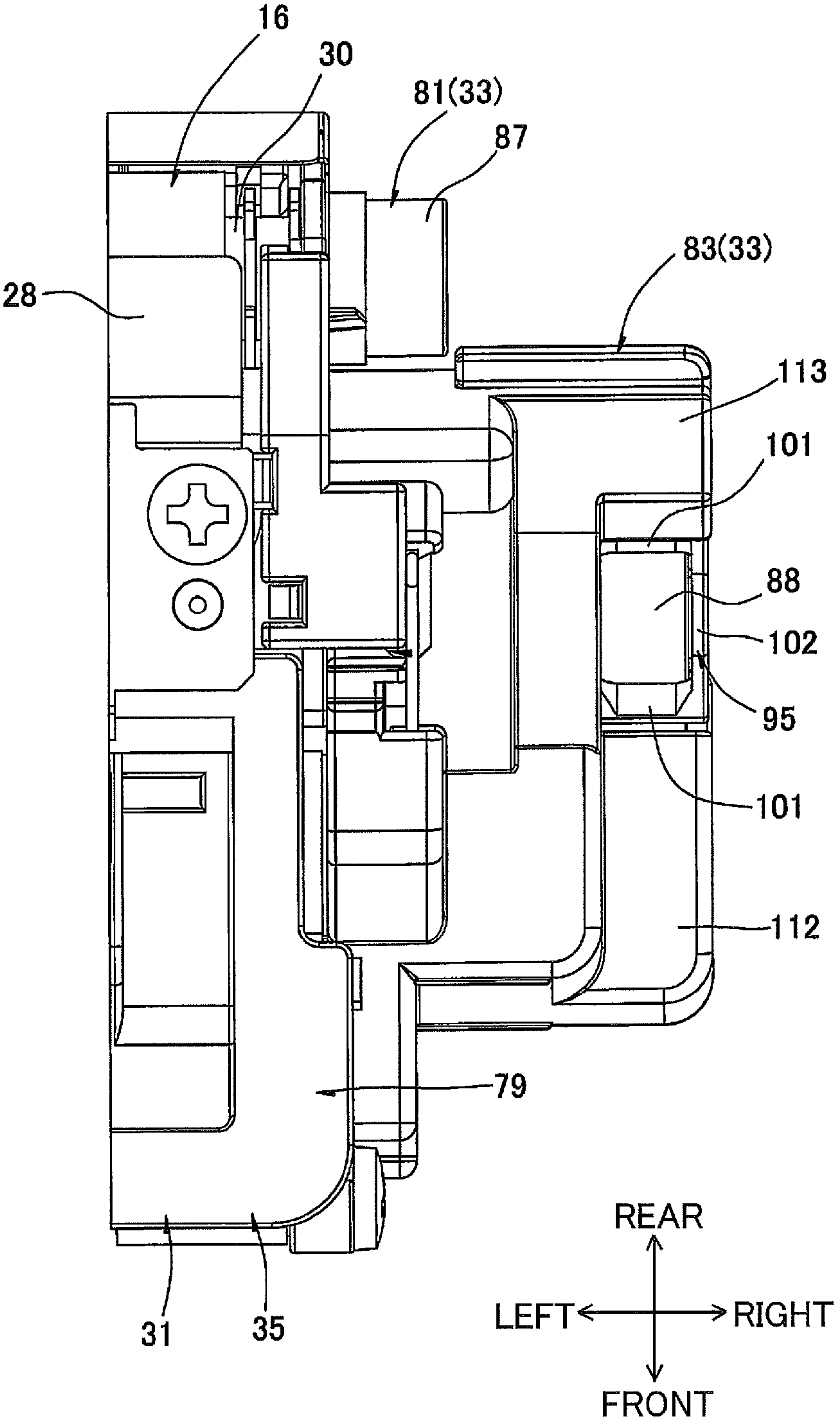
FIG. 9 is a plan view of the electric-power supplying unit shown in FIG. 3.

The new-product detection gear 82 and the electric-power supply-side gear cover 83 are disposed relative to each other so that when the new-product detection gear 82 and the electric-power supply-side gear cover 83 are projected in the up-down direction, as shown in FIG. 9, the right surface of the second covering portion 102 is arranged on the same plane with the right surfaces of the front side bulging portion 112 and the rear side bulging portion 113. That is, when being projected in the front-back direction, the right surface of the second covering portion 102 overlaps with the right surfaces of the front side bulging portion 112 and rear side bulging portion 113.

The right surfaces of the front side bulging portion 112 and rear side bulging portion 113 are disposed on the right side of the right side edge of the electric-power receiving portion 88.

3. Main Casing

Figure 10:
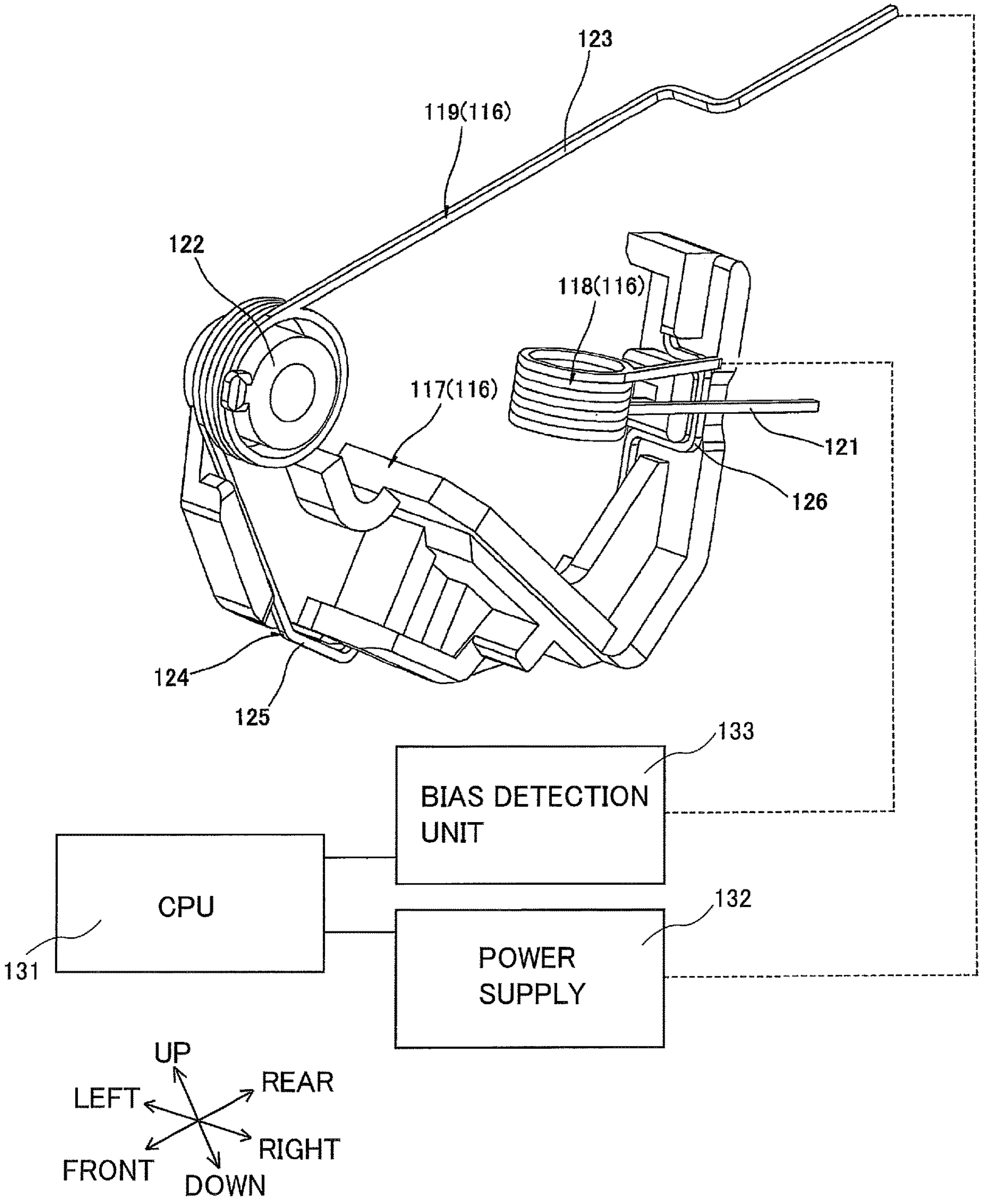
FIG. 10 is a perspective view of a main-casing-side electrode unit seen from an upper right side in the printer of FIG. 1.

As shown in FIG. 10, a main-casing-side electrode unit 116 is provided in the main casing 2 to supply developing bias to the developing cartridge 25.

The main-casing-side electrode unit 116 includes: a fixed electrode 118, a holder member 117, and a swing electrode 119. The swing electrode 119 is held by the holder member 117.

The fixed electrode 118 is a coil spring formed of metal. The fixed electrode 118 is fixed, at its one end, to the main casing 2 at a position that is near to the right side of the developing cartridge 25 when the developing cartridge 25 is mounted in the main casing 2. The other end of the fixed electrode 118 serves as a free end portion 121.

The holder member 117 is made of an insulating resin material. The holder member 117 is substantially in a U-shaped bent rod when viewed from the side so that the U-shape extends in the front-back direction, with its opening facing upwardly. A cylindrical portion 122 is provided on the front end portion of the holder member 117. The cylindrical portion 122 is substantially in a cylindrical shape that extends in the left-right direction. Although not shown, a swing shaft is provided within the main casing 2. The cylindrical portion 122 is fitted onto the swing shaft (not shown) so as to be rotatable relative to the swing shaft. In such a manner, the holder member 117 is rotatably supported by the main casing 2.

The swing electrode 119 is a coil spring wound around the cylindrical portion 122. The swing electrode 119 is made of a metal. The swing electrode 119 has a fixed portion 123 at its one end. The fixed portion 123 is fixed to the main casing 2 at a position near to the right side of the developing cartridge 25 when the developing cartridge 25 is mounted in the main casing 2. The swing electrode 119 has an electrode portion 124 at its other end. The electrode portion 124 is fixed to the holder member 117.

The electrode portion 124 has a development-side contact 125 and a main-casing-side contact 126. The development-side contact 125 can contact the electric-power receiving portion 88 of the developing cartridge 25. The main-casing-side contact 126 can contact the free end portion 121 of the fixed electrode 118.

The development-side contact 125 is supported on the front lower end portion of the holder member 117, and is exposed to the front lower side.

The main-casing-side contact 126 is supported on the rear end portion of the holder member 117, and is exposed to the right side.

Figure 11:
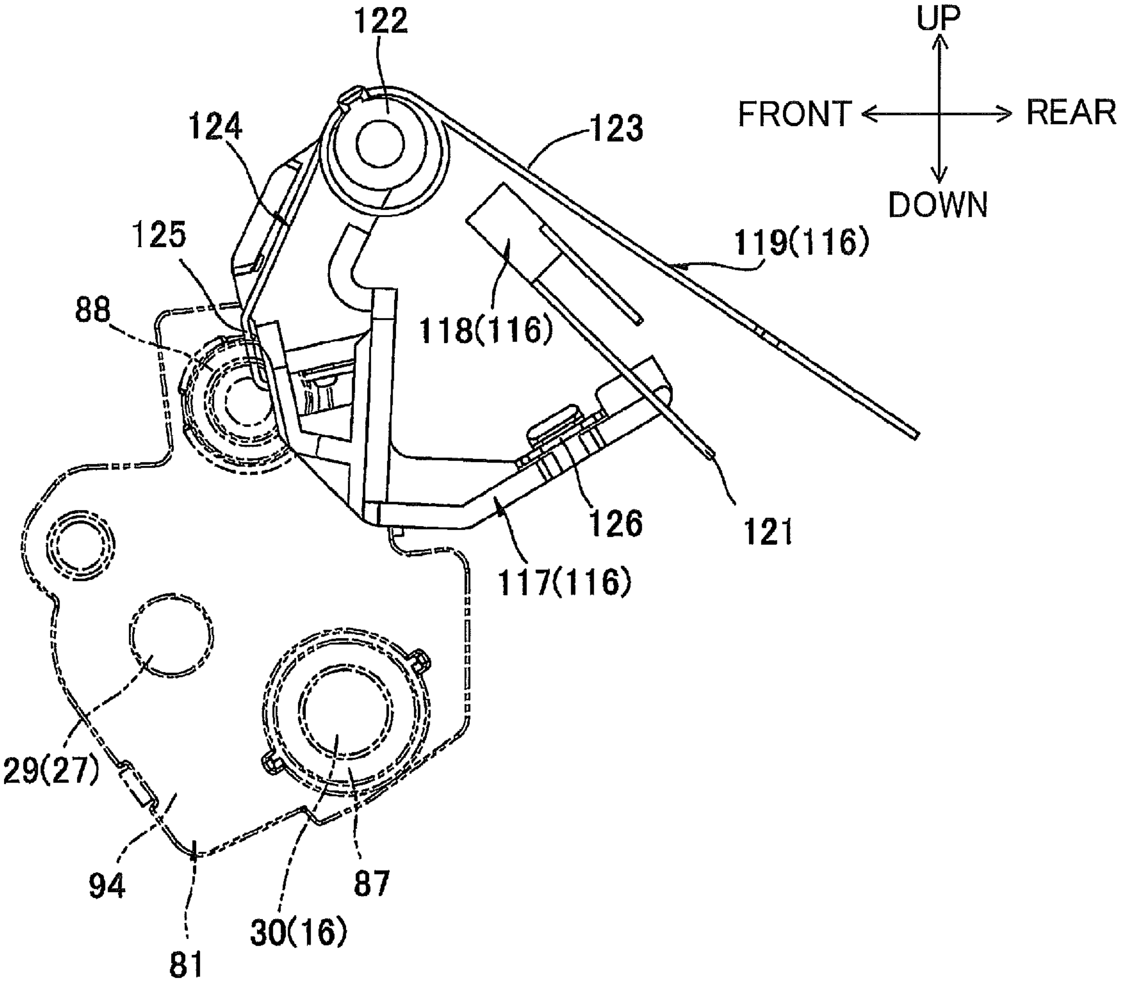

As shown in FIG. 11, due to the elasticity of the swing electrode 119, the swing electrode 119 is normally held at a lower side disconnection position where the main-casing-side contact 126 is separate away from the free end portion 121 of the fixed electrode 118 and is positioned below the free end portion 121.

Figure 12:
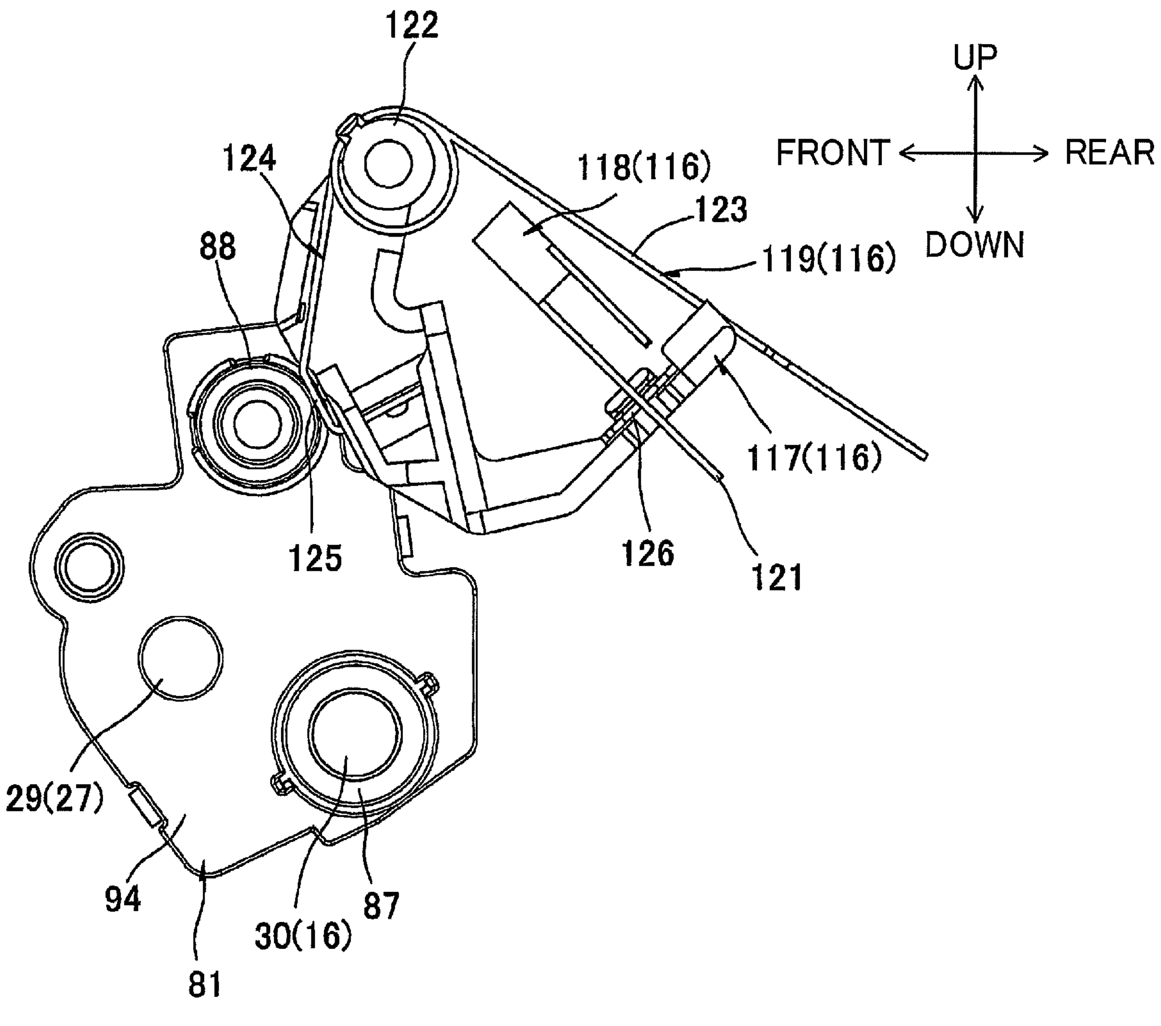
Figure 13:
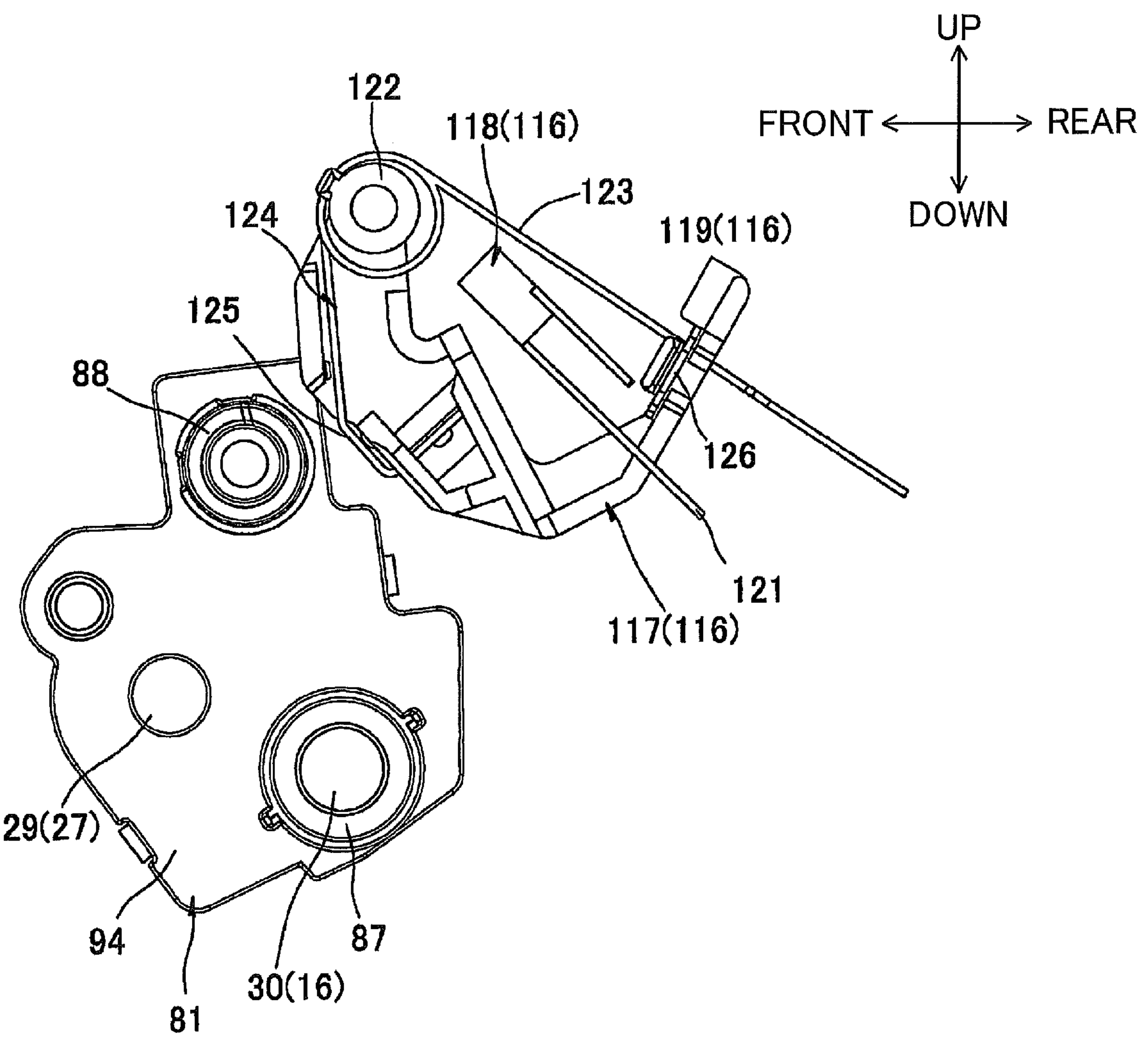

As shown in FIG. 12, as the swing electrode 119 is pushed from the front side against the elastic force of the swing electrode 119, the swing electrode 119 swings in the counterclockwise direction when viewed from the right side. As a result, the main-casing-side contact 126 is placed at a connection position where the main-casing-side contact 126 is in contact with the free end portion 121 of the fixed electrode 118.

As the swing electrode 119 is further pushed from the front side against the elastic force of the swing electrode 119, the swing electrode 119 swings further in the counterclockwise direction when viewed from the right side. As a result, the main-casing-side contact 126 is placed at an upper side disconnection position (FIG. 13) where the main-casing-side contact 126 is separate away from the free end portion 121 of the fixed electrode 118 and is positioned above the free end portion 121.

As shown in FIG. 10, a power supply 132, a bias detection unit 133, and a CPU 131 are provided in the main casing 2.

The power supply 132 is electrically connected to the fixed portion 123 of the swing electrode 119. The power supply 132 supplies developing bias to the swing electrode 119.

The bias detection unit 133 is electrically connected to the fixed electrode 118. The bias detection unit 133 is for detecting a developing bias that is supplied from the power supply 132 to the fixed electrode 118 via the swing electrode 119. In other words, the bias detection unit 133 detects whether or not a developing bias is supplied to the fixed electrode 118.

The CPU 131 is electrically connected to the power supply 132 and the bias detection unit 133. The CPU 131 determines the state of the developing cartridge 25 based on the results of detection by the bias detection unit 133. When the bias detection unit 133 detects supply of developing bias from the power supply 132 to the fixed electrode 118, the CPU 131 determines that the swing electrode 119 is placed at the connection position. When the bias detection unit 133 detects no supply of developing bias from the power supply 132 to the fixed electrode 118, the CPU 131 determines that the swing electrode 119 is placed at the lower- or upper-side disconnection position.

4. Operation of Detecting New Developing Cartridge

With reference to FIGS. 11 to 18, next will be described how to detect a new developing cartridge 25.

When the process cartridge 11 is not mounted in the main casing 2, the swing electrode 119 is at the lower side disconnection position as shown in FIG. 11.

No developing cartridge 25 is mounted in the main casing 2. Developing bias is not supplied from the power supply 132 to the developing cartridge 25 or to the fixed electrode 118. The bias detection unit 133 does not detect supply of developing bias from the power supply 132 to the fixed electrode 118. The CPU 131 determines that no developing bias is supplied to the fixed electrode 118.

If the bias detection unit 133 does not detect supply of developing bias from the power supply 132 to the fixed electrode 118 continuously for a predetermined period of time or longer, then the CPU 131 determines that the developing cartridge 25 is not mounted in the main casing 2.

After the top cover 6 of the main casing 2 is opened and a process cartridge 11, in which a new (unused) developing cartridge 25 is mounted, is inserted into the main casing 2 from the front upper side, the electric-power receiving portion 88 of the developing cartridge 25 comes in contact with the holder member 117 from the front upper side.

As the developing cartridge 25 is inserted into the main casing 2 together with the process cartridge 11, the holder member 117 is pushed by the electric-power receiving portion 88. As a result, the electrode portion 124 of the swing electrode 119 swings counterclockwise when viewed from the right side together with the holder member 117.

Figure 14:
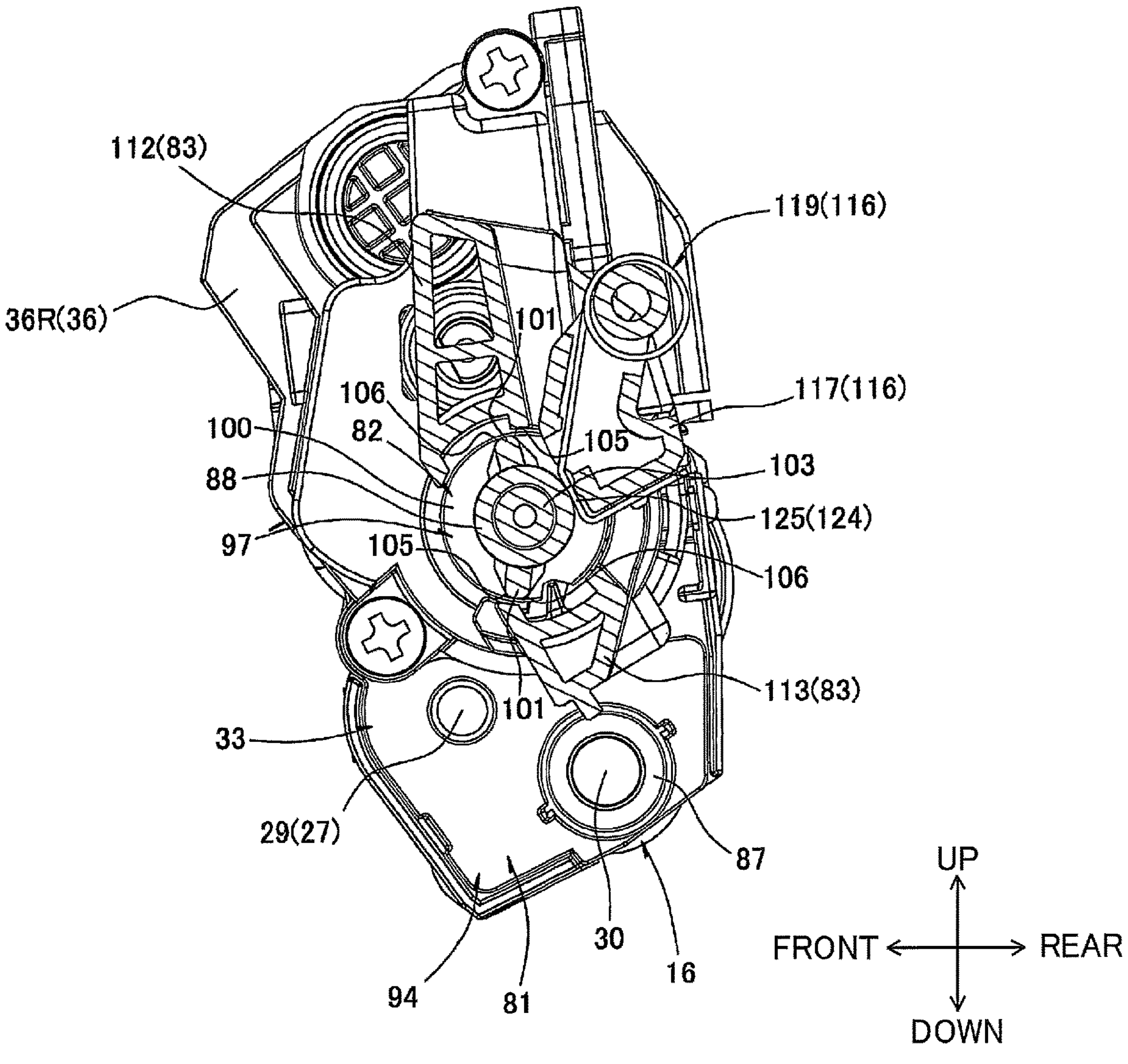

Then, when the operation of mounting the developing cartridge 25 in the main casing 2 is completed, as shown in FIGS. 12 and 14, the swing electrode 119 is placed at the connection position where the main-casing-side contact 126 is in contact with the free end portion 121 of the fixed electrode 118. Moreover, the development-side contact 125 of the swing electrode 119 comes in contact with the electric-power receiving portion 88 of the developing cartridge 25 from the rear side through the space between the first covering portions 101. At this time, one of the first covering portions 101 is positioned on the front upper side of the holder member 117 and swing electrode 119.

As a result, the developing bias that is supplied from the power supply 132 to the swing electrode 119 is supplied to the electric-power receiving portion 88 via the development-side contact 125.

The developing bias supplied to the electric-power receiving portion 88 is applied to the developing roller shaft 30 via the electrode member 81.

The developing bias is supplied also to the fixed electrode 118 from the main-casing-side contact 126 via the free end portion 121 of the fixed electrode 118, and is finally detected by the bias detection unit 133.

As a result, the CPU 131 determines that the developing bias is supplied to the fixed electrode 118.

When the developing cartridge 25 is mounted in the main casing 2, the tip of the main-casing-side coupling (not shown) in the main casing 2 is inserted into the coupling concave portion 68 of the development coupling 61 so as not to be rotatable relative to the coupling concave portion 68. Then, a driving force is input from the main casing 2 to the development coupling 61 via the main-casing-side coupling (not shown), starting a warm-up operation.

As a result, as shown in FIG. 4, the driving force is transmitted from the development coupling 61 to the agitator shaft 76 via the idle gear 64 and the first agitator gear 72, and therefore rotates the agitator 80.

As shown in FIG. 5, as the agitator 80 rotates, the driving force is transmitted to the teeth portion 98 of the tooth-missing gear 96 via the agitator shaft 76 and the second agitator gear 78, rotating the new-product detection gear 82 in the clockwise direction when viewed from the right side.

Figure 15:
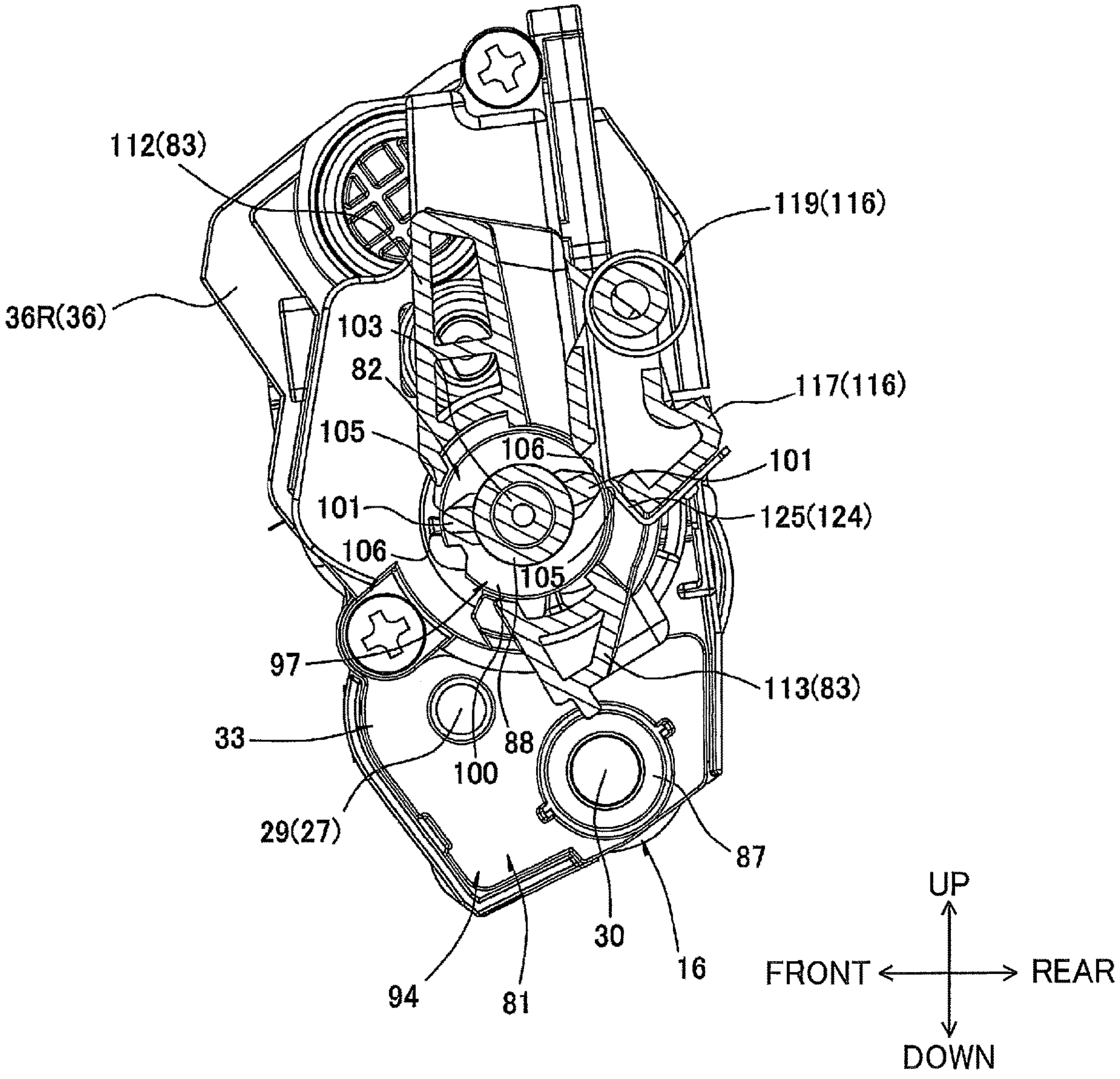

Accordingly, as shown in FIG. 15, the first covering portion 101 of the new-product detection gear 82 comes in contact with the electrode portion 124 of the swing electrode 119 from the front side, pushing the electrode portion 124 toward the rear side. As a result, against the elastic force of the swing electrode 119, the holder member 117 and the swing electrode 119 run up on the first covering portion 101 along the downstream side chamfered surface 105, retract from the electric-power receiving portion 88 to the rear side, and are positioned at the upper side disconnection position.

As a result, the development-side contact 125 of the swing electrode 119 is separated away from the electric-power receiving portion 88 toward the rear side, and the swing electrode 119 is electrically disconnected from the electric-power receiving portion 88. Moreover, the main-casing-side contact 126 of the swing electrode 119 is separated away from the free end portion 121 of the fixed electrode 118 toward the upper side, and the swing electrode 119 is electrically disconnected from the fixed electrode 118 (see FIG. 13). It is noted that if the new-product detection gear 82 is made of a conductive material, the swing electrode 119 is not electrically disconnected from the electric-power receiving portion 88. However, the swing electrode 119 is electrically disconnected from the fixed electrode 118.

At this time, the CPU 131 determines that no developing bias is supplied to the fixed electrode 118.

As the new-product detection gear 82 further rotates in the clockwise direction when viewed from the right side, the first covering portion 101 passes between the electric-power receiving portion 88 and the holder member 117 from the front upper side to the rear lower side.

Figure 16:
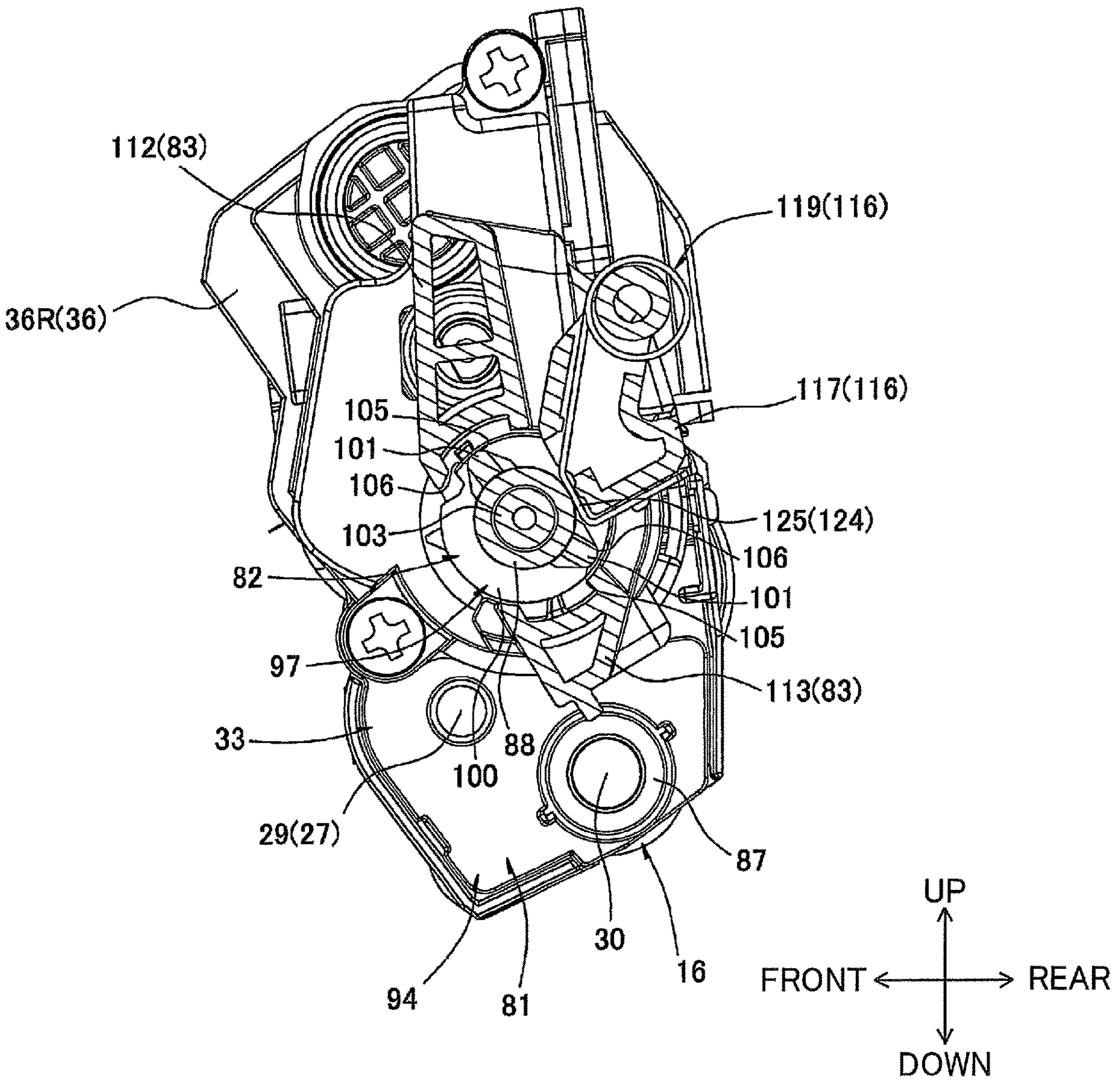

As a result, as shown in FIG. 16, the holder member 117 and the swing electrode 119 swing back toward the front side due to the elastic force of the swing electrode 119, while running down from the first covering portion 101 along the upstream side chamfered surface 106, and are again placed at the connection position.

As a result, the development-side contact 125 of the swing electrode 119 comes in contact with the electric-power receiving portion 88 from the rear side, and the swing electrode 119 is electrically connected to the electric-power receiving portion 88. Moreover, the main-casing-side contact 126 comes in contact with the free end portion 121 of the fixed electrode 118, and the swing electrode 119 is electrically connected to the fixed electrode 118 (see FIG. 12). It is noted that if the new-product detection gear 82 is made of a conductive material, the swing electrode 119 remains electrically connected to the electric-power receiving portion 88.

Thus, the CPU 131 determines that the developing bias is supplied to the fixed electrode 118. That is, after the warm-up operation has started, the CPU 131 determines that the developing bias is supplied to the fixed electrode 118, then the supply of the developing bias to the fixed electrode 118 is stopped temporarily, and then the developing bias is again supplied to the fixed electrode 118.

That is, the new-product detection gear 82 rotates to move from a first position to a second position and then to a third position. At the first position, the new-product detection gear 82 causes the swing electrode 119 to be placed at the connection position and allows electric power to be supplied to the electric-power receiving portion 88 via the space between the first covering portions 101. At the second position, the new-product detection gear 82 causes the swing electrode 119 to be placed at the upper side disconnection position and blocks off the supply of electric power to the electric-power receiving portion 88 by the first covering portion 101. At the third position, the new-product detection gear 82 causes the swing electrode 119 to be placed at the connection position again and allows electric power to be supplied to the electric-power receiving portion 88 via the space between the first covering portions 101.

Figure 17:
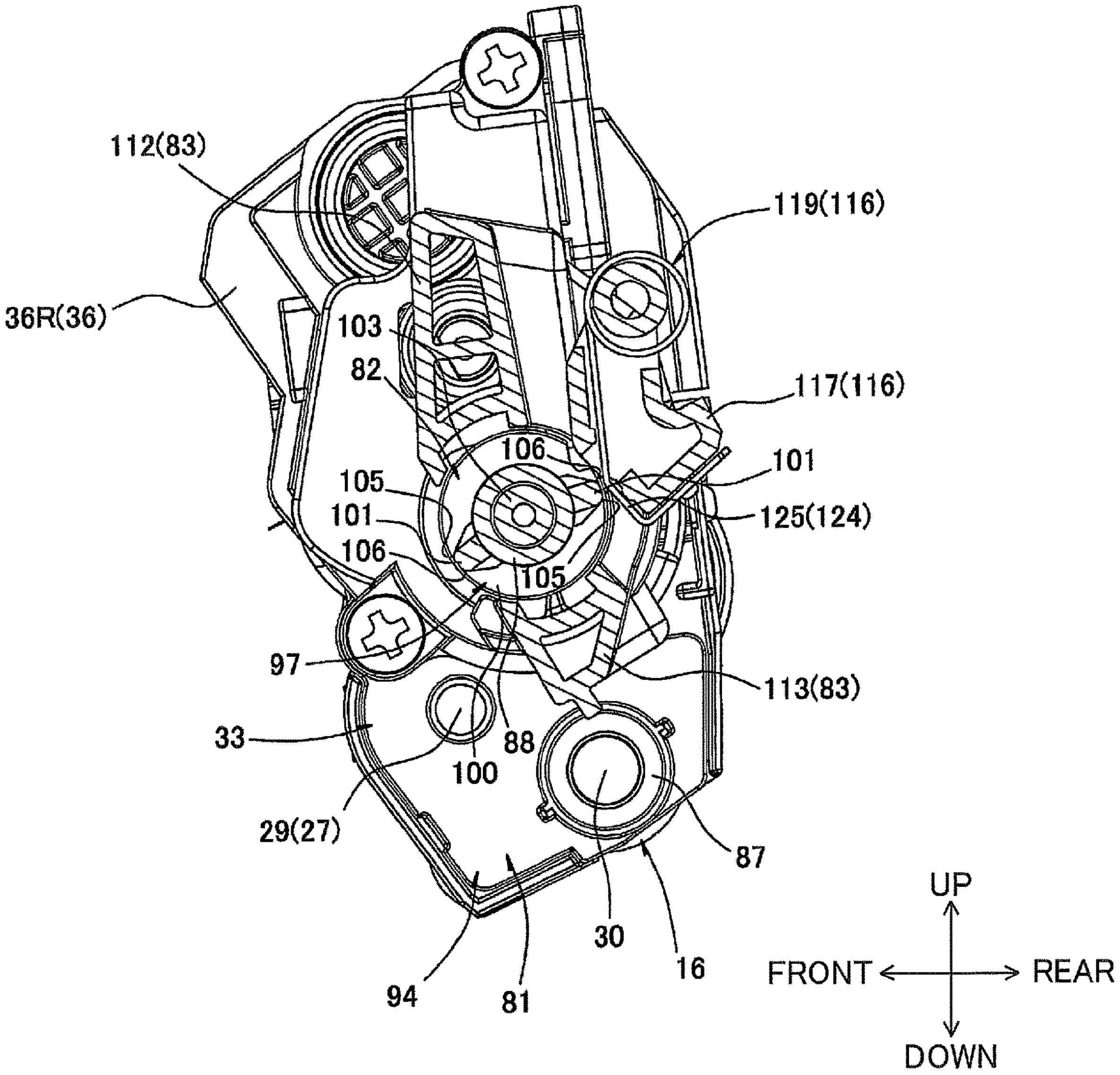
Figure 18:
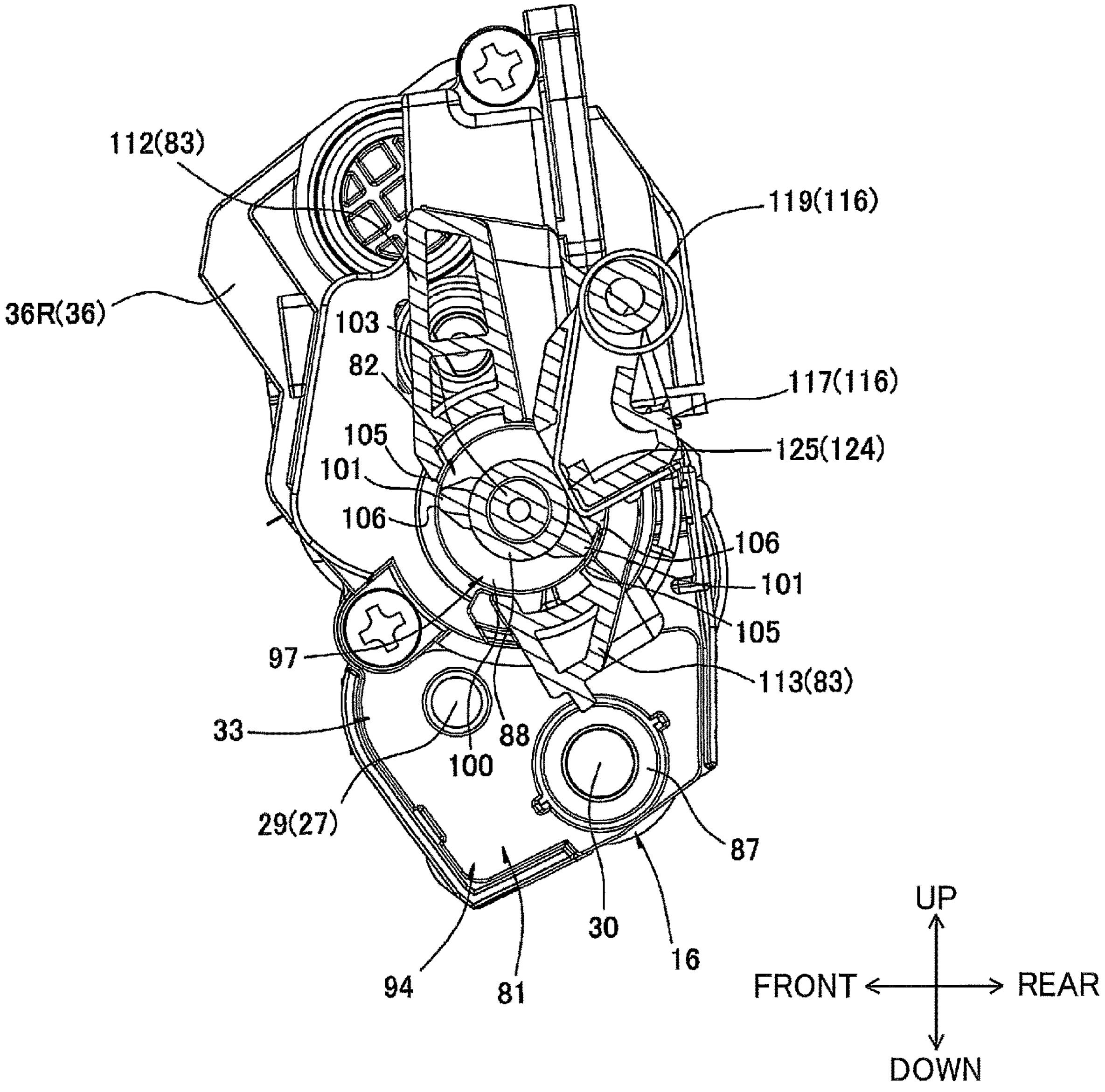

As the new-product detection gear 82 further rotates, as shown in FIGS. 17 and 18, similarly to the first covering portion 101 described above, the other first covering portion 101 moves the swing electrode 119 from the connection position to the upper side disconnection position, and then back to the connection position.

As the new-product detection gear 82 further rotates, the tooth-missing portion 99 faces the second agitator gear 78, and the new-product detection gear 82 is disengaged from the second agitator gear 78. As a result, the new-product detection gear 82 stops rotating. Then, the warm-up operation comes to an end.

So, the CPU 131 again determines that the developing bias is supplied to the fixed electrode 118, then the supply of the developing bias to the fixed electrode 118 is temporarily stopped, and then the developing bias is again supplied to the fixed electrode 118.

The CPU 131 determines that the developing cartridge 25 is a new (unused) product if the CPU 131 determines, after the warm-up operation has started, that the developing bias is supplied to the fixed electrode 118, then the supply of the developing bias to the fixed electrode 118 temporarily stops, and then the developing bias is supplied to the fixed electrode 118 again.

The CPU 131 associates the number of times that the supply of developing bias to the fixed electrode 118 stops temporarily during the warm-up process, with information on the maximum number of images that can be formed with the developing cartridge 25. More specifically, for example, the CPU 131 associates the number with the information in the following manner: If the number of times that the supply of developing bias stops temporarily is two, the maximum number of images that can be formed is 6,000. If the number of times that the supply of developing bias stops temporarily is one, the maximum number of images that can be formed is 3,000.

The CPU 131 determines that the developing cartridge 25 can form 6,000 images if the CPU 131 detects twice such a change in the supply of the developing bias from ON to OFF and then back to ON after the warm-up process has started.

So, when the new developing cartridge 25 is mounted, the CPU 131 determines that the developing cartridge 25 is new, and that the maximum number of images that can be formed with the developing cartridge 25 is 6,000. It is noted that an operation panel or the like (not shown) is provided on the main casing 2. Notification is displayed on the operation panel or the like to request a user to replace the developing cartridge 25 with a new one, immediately before the number of images that have been actually formed with the developing cartridge 25 exceeds 6,000.

If the CPU 131 determines that the developing bias is supplied to the fixed electrode 118 continuously for the predetermined period of time or more, then the CPU 131 determines that a developing cartridge 25 is being mounted in the main casing 2.

As described above, when a new developing cartridge 25 is mounted, a new-product detection process is executed to determine whether the developing cartridge 25 is being mounted in the main casing 2. Now assume that a new developing cartridge 25 is mounted in the main casing 2, is then temporarily detached from the main casing 2 to solve a paper jam, for example, and is then mounted again in the main casing 2. When the developing cartridge 25 is thus mounted again in the main casing 2, however, the new-product detection gear 82 does not rotate, but is kept at a position where the tooth-missing portion 99 of the tooth-missing gear 96 faces the second agitator gear 78. Therefore, even when the warm-up operation is executed at the time when the developing cartridge 25 is mounted again, the new-product detection gear 82 does not rotate, and therefore the new-production detection process is not executed. At this time, the holder member 117 and the swing electrode 119 are positioned at the connection position. So, the CPU 131 determines that the developing bias is constantly supplied to the fixed electrode 118.

Therefore, the CPU 131 does not erroneously determine that the developing cartridge 25 that is mounted again (or used developing cartridge 25) is a new one. The CPU 131 continues comparing, with the maximum number of images that can be formed with the developing cartridge 25, the number of images that have been actually formed with the developing cartridge 25 since the developing cartridge 25 was newly mounted in the main casing 2. Moreover, the CPU 131 determines that the developing cartridge 25 is being mounted in the main casing 2.

5. Operations (1) In the developing cartridge 25, as shown in FIGS. 3 and 4, the development coupling 61 is disposed on the left side of the left wall 36L. The new-product detection gear 82 is disposed on the right side of the right wall 36R. A driving force input to the development coupling 61 is transmitted to the new-product detection gear 82 via the agitator 80 that is disposed between the left wall 36L and the right wall 36R.

Thus, the development coupling 61 and the new-product detection gear 82 are disposed on different side walls (or on the left wall 36L and the right wall 36R). Thus, the area of the left wall 36L and the area of the right wall 36R are made small. As a result, the developing cartridge 25 is made small in size.

More specifically, if the development coupling 61 and the new-product detection gear 82 are disposed on the same side wall (the left wall 36L or right wall 36R), the side wall 36 needs to have an area large enough to be mounted with both of the development coupling 61 and the new-product detection gear 82. Contrarily, according to the present embodiment, the area of the left wall 36L and right wall 36R is made small because each side wall 36 is mounted with only one of the development coupling 61 and the new-product detection gear 82.

(2) In the developing cartridge 25, the new-product detection gear 82 and the development coupling 61 are disposed relative to each other so that as shown in FIG. 8, when the new-product detection gear 82 and the development coupling 61 are projected in the left-right direction, the rear upper side end portion of the new-product detection gear 82 overlaps with the development coupling 61.

Therefore, when projected in the left-right direction, the new-product detection gear 82 and the development coupling 61 are disposed substantially at the same location. Thus, the developing cartridge 25 can be made small in size.

(3) As shown in FIGS. 3 and 4, the use of the agitator 80 enables a driving force to be transmitted from the development coupling 61 to the new-product detection gear 82, thereby reducing the number of components.

(4) As shown in FIG. 3, the new-product detection gear 82 is supported by the electric-power receiving portion 88 so as to be rotatable relative to the electric-power receiving portion 88.

Therefore, compared with the case where the new-product detection gear 82 and the electric-power receiving portion 88 are separately disposed, an efficient arrangement of the new-product detection gear 82 is possible.

(5) In the developing cartridge 25, the electric-power receiving portion 88 and the development coupling 61 are disposed relative to each other so that as shown in FIG. 8, when the electric-power receiving portion 88 and the development coupling 61 are projected in the left-right direction, the rear upper side end portion of the electric-power receiving portion 88 overlaps with the development coupling 61.

Therefore, when projected in the front-back and up-down directions, the electric-power receiving portion 88 and the development coupling 61 are disposed substantially at the same location. Thus, the developing cartridge 25 can be made small in size.

(6) In the developing cartridge 25, as shown in FIGS. 7A-7C, the first covering portions 101 are provided on the new-product detection gear 82 at its pair of radial-direction opposite sides. The new-product detection gear 82 is formed with the opening at a location between the flange portion 100 and the second covering portion 102. The opening extends in the rotation direction (circumferential direction) of the new-product detection gear 82. The first covering portions 101 are arranged in the midway in the opening so as to be spaced apart from each other in the rotating direction. The electric-power receiving portion 88 is exposed in the space between the two adjacent first covering portions 101.

Therefore, the rotation of the new-product detection gear 82 switches the supply of electric power from the main casing 2 to the electric-power receiving portion 88 between the ON and OFF states.

(7) In the developing cartridge 25, as shown in FIG. 7A, the detected end portion 95 includes the first covering portions 101 and the second covering portion 102. The first covering portions 101 cover the electric-power receiving portion 88 from the radial-direction outer side, and the second covering portion 102 covers the electric-power receiving portion 88 from the right side.

Therefore, the electric-power receiving portion 88 is protected by the detected end portion 95 from both of the radial-direction outside and the right side.

(8) In the developing cartridge 25, as shown in FIGS. 7B and 7C, the detected end portion 95 has the pair of first covering portions 101 on the pair of radial-direction opposite sides in the new-product detection gear 82, respectively.

Therefore, the electric-power receiving portion 88 is protected from both of the radial-direction opposite sides.

(9) According to the developing cartridge 25, the number of the first covering portions 101 corresponds to the maximum number of images that can be formed with the developing cartridge 25.

Therefore, on the basis of the number of the first covering portions 101, information on the maximum number of images that can be formed with the developing cartridge 25 can be easily and reliably determined.

As a result, even though the amount of toner stored in the developing cartridge 25 differs according to the maximum number of images that can be formed with the developing cartridge 25, the duration of life of the developing cartridge 25 can be correctly determined, and the developing cartridge 25 can be properly replaced.

(10) As shown in FIG. 7C, each first covering portion 101 is formed with the downstream side chamfered surface 105 and upstream side chamfered surface 106 on its radially outside edge. The downstream side chamfered surface 105 is located on the downstream side of the first covering portion 101 in the rotating direction, while the upstream side chamfered surface 106 is located on the upstream side of the first covering portion 101 in the rotating direction. The upstream side chamfered surface 106 is continuous with the upstream side edge of the downstream side chamfered surface 105. The downstream side chamfered surface 105 is gradually inclined radially outwardly in a direction toward the upstream side in the rotating direction. The upstream side chamfered surface 106 is gradually inclined radially inwardly in a direction toward the upstream side in the rotating direction.

Thus, as the first covering portion 101 passes between the electric-power receiving portion 88 and the holder member 117, the holder member 117 and the swing electrode 119 run up on the first covering portion 101 along the downstream side chamfered surface 105, and are placed at the upper side disconnection position. Then, the holder member 117 and the swing electrode 119 go down the first covering portion 101 along the upstream side chamfered surface 106, and are placed at the connection position again.

As a result, the first covering portion 101 can smoothly pass between the electric-power receiving portion 88 and the holder member 117.

(11) In the developing cartridge 25, as shown in FIGS. 5 and 14, the second covering portion 102 includes the fitting portion 103 that is fitted into the right end portion of the electric-power receiving portion 88.

Therefore, the fitting portion 103 precisely positions the right end portion of the electric-power receiving portion 88 relative to the new-product detection gear 82.

(12) In the developing cartridge 25, as shown in FIGS. 5 and 14, the electric-power receiving portion 88 is formed in a cylindrical tubular shape, and the fitting portion 103 is fitted into the inside of the right end portion of the electric-power receiving portion 88 so that the outer peripheral surface of the fitting portion 103 faces the inner peripheral surface of the electric-power receiving portion 88.

Therefore, the fitting portion 103 reinforces the right end portion of the electric-power receiving portion 88.

(13) As shown in FIG. 5, the fitting projection 45 is provided on the right wall 36R of the cartridge frame 31. The fitting projection 45 is fitted into the inside of the tubular-shaped electric-power receiving portion 88.

The fitting projection 45 reinforces the electric-power receiving portion 88.

(14) As shown in FIGS. 14, 15 and 16, the new-product detection gear 82 moves from the first position (See FIG. 14) to the second position (See FIG. 15) and then to the third position (FIG. 16). When the new-product detection gear 82 is at the first position, electric power is supplied to the electric-power receiving portion 88 via the space between the first covering portions 101. When the new-product detection gear 82 is at the second position, the input of electric power to the electric-power receiving portion 88 is blocked off by the first covering portion 101. When the new-product detection gear 82 is at the third position, electric power is supplied to the electric-power receiving portion 88 via the space between the first covering portions 101.

Therefore, the CPU 131 detects that electric power is supplied to the electric-power receiving portion 88 before and after input of the electric power to the electric-power receiving portion 88 is blocked. This ensures that the CPU 131 recognizes that input of electric power to the electric-power receiving portion 88 is blocked by the first covering portion 101.

(15) As shown in FIGS. 7A and 7B, the new-product detection gear 82 includes the tooth-missing gear 96 having the teeth portion 98 and the tooth-missing portion 99. A driving force is transmitted to the teeth portion 98, but not to the tooth-missing portion 99.

This ensures that the new-product detection gear 82 can rotate by a predetermined amount from the start to the end of the warming-up process.

(16) As shown in FIG. 5, the electric-power supply-side gear cover 83 has the new-product detection gear exposure opening 111 that allows the detected end portion 95 of the new-product detection gear 82 to be exposed therethrough. The tooth-missing gear 96 and cylindrical portion 97 of the new-product detection gear 82 and the second agitator gear 78 are covered with the electric-power supply-side gear cover 83.

Thus, the electric-power supply-side gear cover 83 protects the tooth-missing gear 96 and the second agitator gear 78, and ensures that the tooth-missing gear 96 and the second agitator gear 78 engage with each other. Moreover, the electric-power supply-side gear cover 83 ensures that electric power is supplied to the electric-power receiving portion 88 via the new-product detection gear exposure opening 111.

(17) As apparent from FIG. 9, the electric-power supply-side gear cover 83 and the new-product detection gear 82 are disposed relative to each other such that when the electric-power supply-side gear cover 83 and the new-product detection gear 82 are projected in the front-back direction of the developing cartridge 25, the right surface of the electric-power supply-side gear cover 83 overlaps with the right surface of the second covering portion 102 of the new-product detection gear 82.

Therefore, the developing cartridge 25 can be smoothly mounted in the main casing 2.

(18) In the developing cartridge 25, the total number of teeth on the first agitator gear 72 is greater than the total number of teeth on the second agitator gear 78.

Therefore, the rotation speed of the new-product detection gear 82 can be reduced relative to the rotation speed of the agitator 80.

This provides a period of time long enough to detect changes in the supply of electric power from the main casing 2 to the electric-power receiving portion 88 between ON and OFF states, thereby ensuring that the detection is executed precisely.

6. Second Embodiment

With reference to FIGS. 19 to 22, a second embodiment of the cartridge will be described. Incidentally, according to the second embodiment, the same or similar members as those in the first embodiment are denoted by the same reference numerals, and the description thereof will be omitted.

According to the first embodiment, the detection end portion 95 has the two first covering portions 101, and the first covering portions 101 are provided on the radial-direction opposite sides of the central axis of the new-product detection gear 82. The number of the first covering portions 101 corresponds to the maximum number of images that can be formed with the developing cartridge 25.

Figure 19:
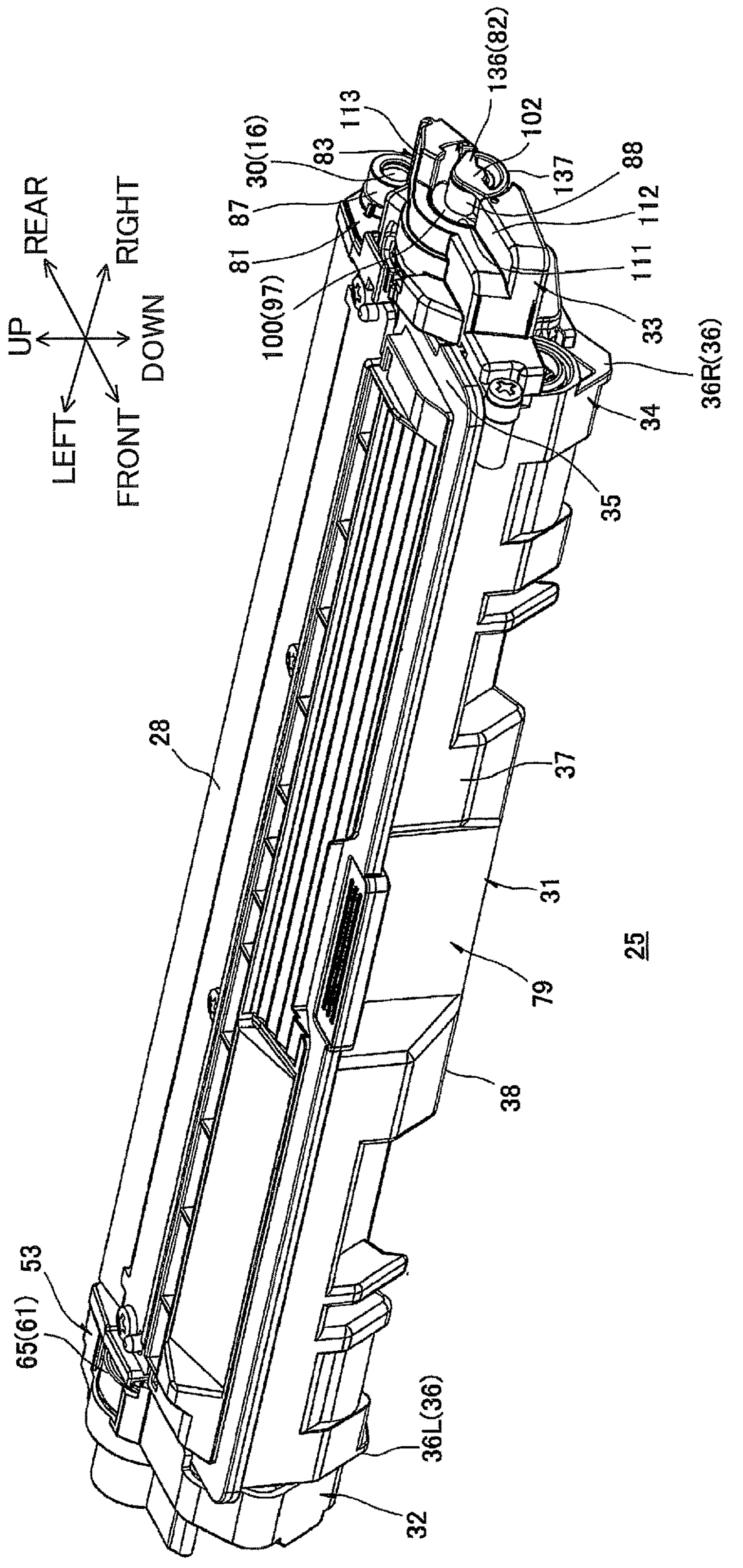
FIG. 19 is a perspective view of a developing cartridge according to a second embodiment, the developing cartridge being seen from an upper right side.

However, according to the second embodiment, as shown in FIG. 19, a detection end portion 136 is provided in place of the detection end portion 95. The detection end portion

136 has a peripheral wall 137, instead of the first covering portions 101. The peripheral wall 137 is formed in the shape of a partial cylinder whose cross-section has a fan or sector shape with its central angle being about 120 degrees. In other words, the peripheral wall 137 extends around the central axis of the new-product detection gear 82 by 120 degrees so that the peripheral wall 137 continuously covers a half or more part of the electric-power receiving portion 88 in the rotating direction. The second covering portion 102 in the detection end portion 136 is in a sector shape and is connected to the right side edge of the peripheral wall 137. In other words, similarly to the detection end portion 95, the detection end portion 136 is opened radially outwardly at its part between the flange portion 100 and the second covering portion 102. That is, the detection end portion 136 is formed with an opening that extends in the rotating direction surrounding the fitting portion 103. The peripheral wall 137 is located in the opening, and occupies the opening by a length equivalent to a half or more of the circumferential length of the new-product detection gear 82.

Figure 20:
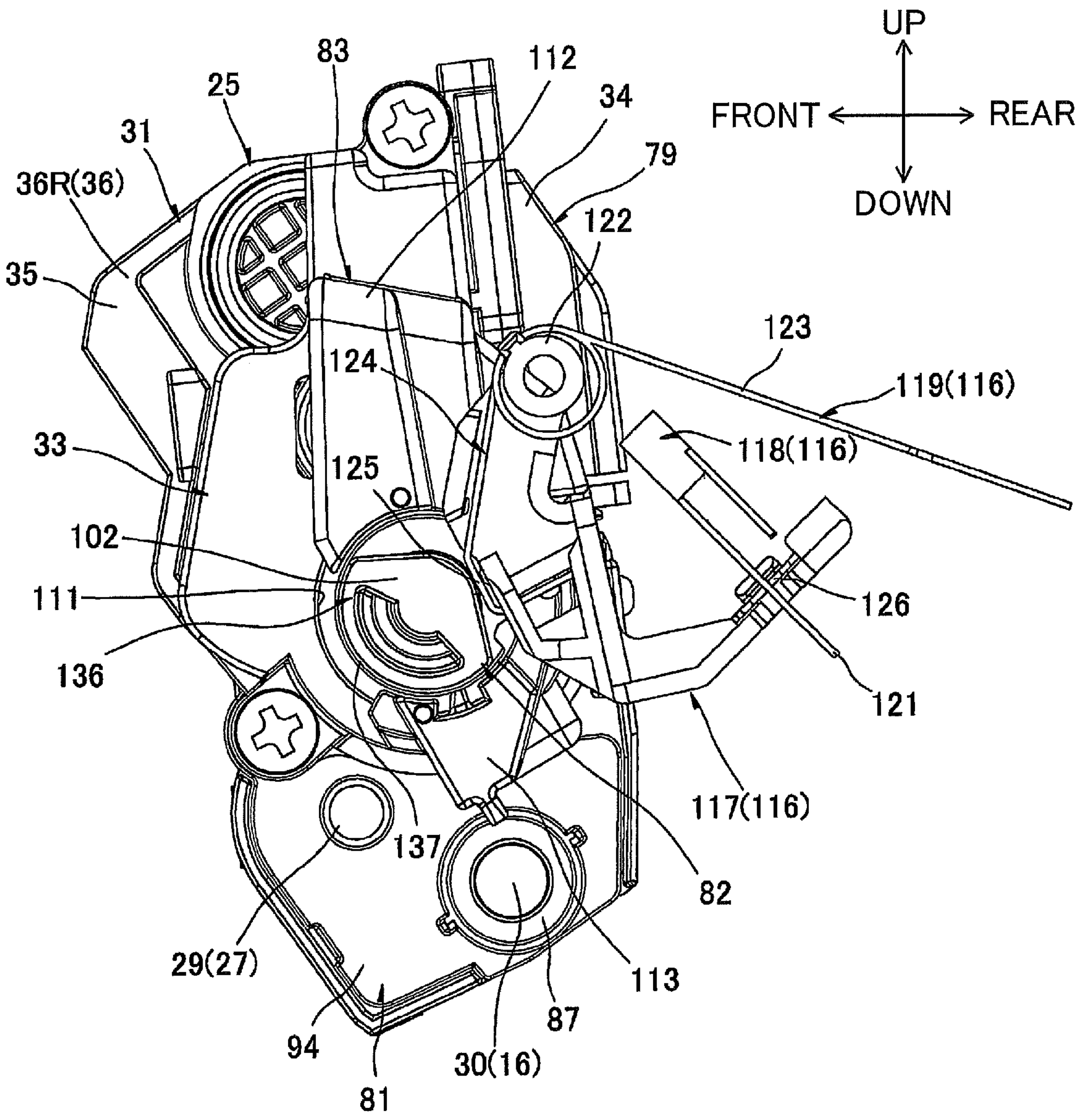

As shown in FIG. 20, when the developing cartridge 25 is completely mounted in the main casing 2, the swing electrode 119 is disposed at the connection position, and the main-casing-side contact 126 is in contact with the free end portion 121 of the fixed electrode 118. The development-side contact 125 of the swing electrode 119 is in contact with the electric-power receiving portion 88 of the developing cartridge 25 from the rear side via the portion where the peripheral wall 137 is not provided.

As a result, the developing bias from the power supply 132 is supplied to the electric-power receiving portion 88 via the swing electrode 119, and is then applied to the developing roller shaft 30.

The CPU 131 determines that the developing bias is supplied to the fixed electrode 118.

Figure 21:
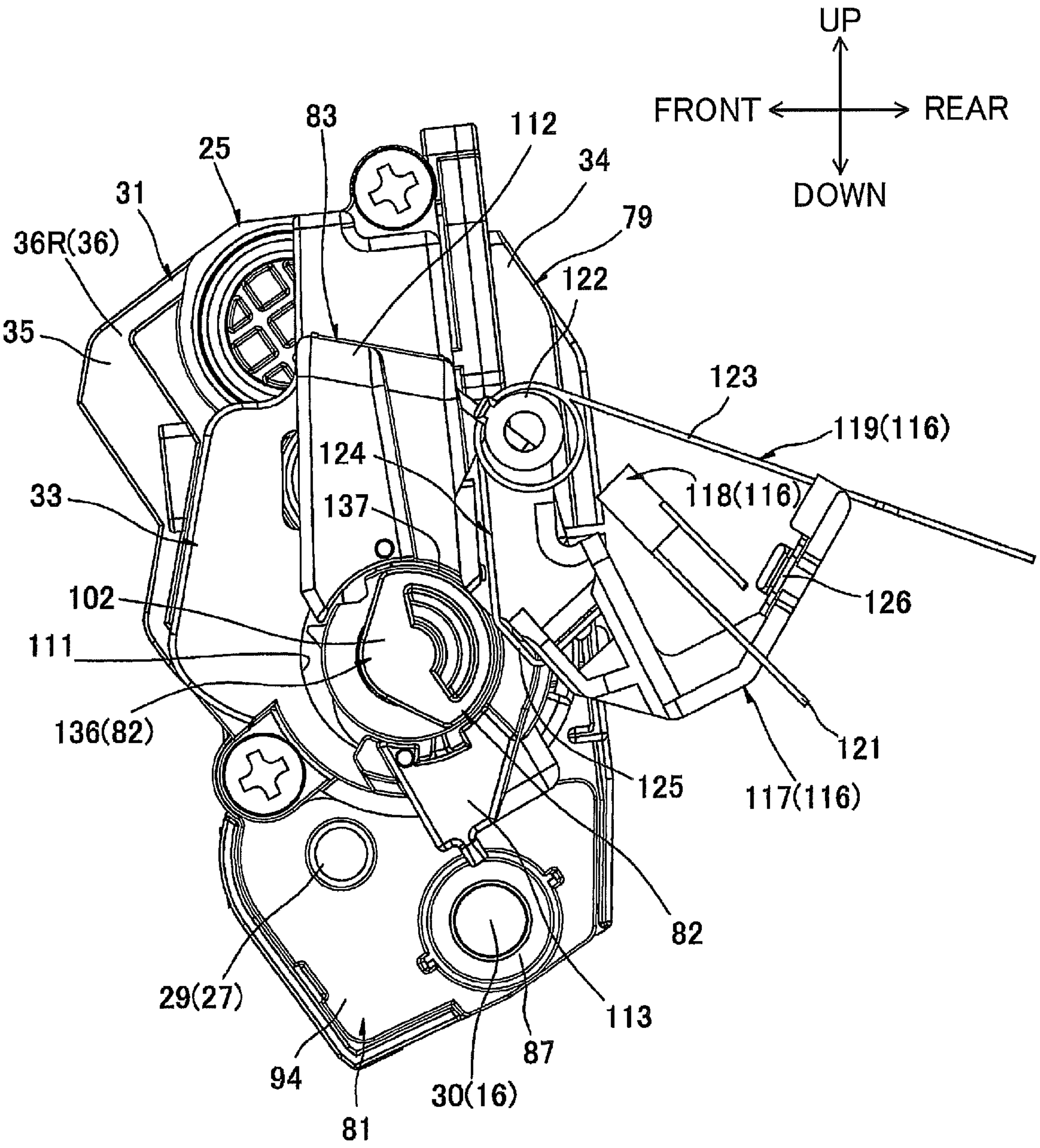

Then, the warm-up operation of the printer 1 starts. As the new-product detection gear 82 rotates in the clockwise direction when viewed from the right side, as shown in FIG. 21, a rotation-direction downstream side edge of the peripheral wall 137 comes in contact with the holder member 117 from the front side, pushing the holder member 117 toward the rear side. As a result, the holder member 117 and the swing electrode 119 run up on the peripheral wall 137 against the elastic force of the swing electrode 119, retract from the electric-power receiving portion 88 to the rear side, and are positioned at the upper side disconnection position.

Accordingly, the development-side contact 125 is separated away from the electric-power receiving portion 88 to the rear side, and the swing electrode 119 is electrically disconnected from the electric-power receiving portion 88 as a result. Moreover, the main-casing-side contact 126 is separated away from the free end portion 121 of the fixed electrode 118 to the upper side, and the swing electrode 119 is electrically disconnected from the fixed electrode 118 as a result.

The CPU 131 determines that no developing bias is supplied to the fixed electrode 118.

As the new-product detection gear 82 further rotates in the clockwise direction when viewed from the right side, the peripheral wall 137 of the detection end portion 136 passes between the electric-power receiving portion 88 and the holder member 117 from the front upper side to the rear lower side.

At this time, the CPU 131 determines that no developing bias is supplied to the fixed electrode 118 for a period of time corresponding to the circumferential-direction length of the peripheral wall 137.

Figure 22:
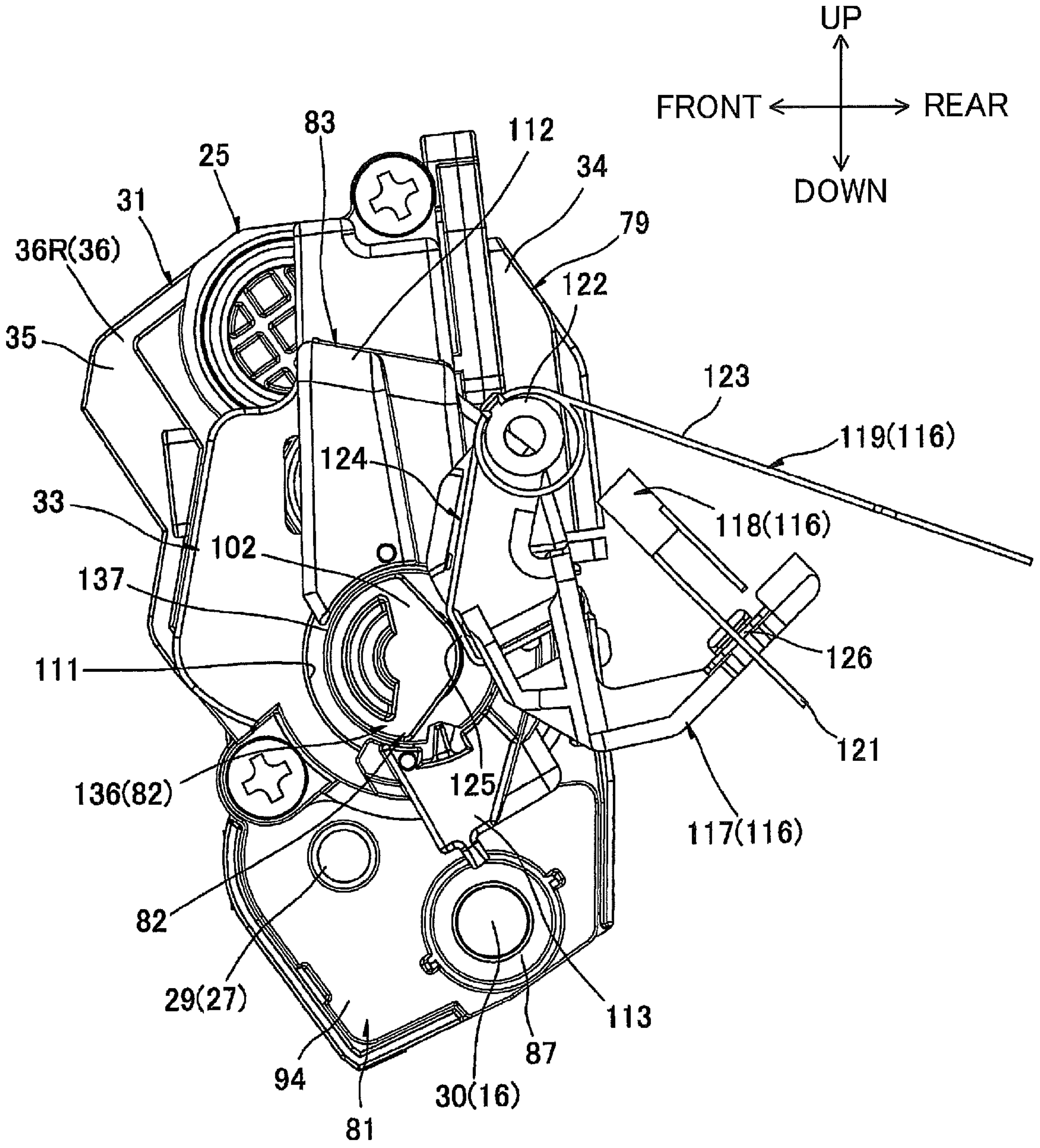

Thereafter, as shown in FIG. 22, the holder member 117 and the swing electrode 119 swing back to the front side due to the elastic force of the swing electrode 119 to come down from the peripheral wall 137, and are placed at the connection position again.

As a result, the development-side contact 125 of the swing electrode 119 comes in contact with the electric-power receiving portion 88 from the rear side, and the swing electrode 119 is electrically connected to the electric-power receiving portion 88. Moreover, the main-casing-side contact 126 comes in contact with the free end portion 121 of the fixed electrode 118, and the swing electrode 119 is electrically connected to the fixed electrode 118.

Thus, the CPU 131 determines that the developing bias is supplied to the fixed electrode 118. That is, after the warm-up operation has started, the CPU 131 determines that the developing bias is supplied to the fixed electrode 118, then the supply of the developing bias to the fixed electrode 118 is stopped temporarily, and then the developing bias is again supplied to the fixed electrode 118.

The CPU 131 determines that the developing cartridge 25 is a new (unused) product if the CPU 131 determines, after the warm-up operation has started, that the developing bias is supplied to the fixed electrode 118, then the supply of the developing bias to the fixed electrode 118 temporarily stops, and then the developing bias is supplied to the fixed electrode 118 again.

The CPU 131 associates a length of time, during which the supply of developing bias to the fixed electrode 118 stops temporarily, with information on the maximum number of images that can be formed with the developing cartridge 25. More specifically, for example, the CPU 131 associates the length of time with the information in the following manner: If the length of time that the supply of developing bias stops temporarily is longer than a predetermined threshold, the maximum number of images that can be formed is 6,000. If the length of time that the supply of developing bias stops temporarily is shorter than or equal to the predetermined threshold, the maximum number of images that can be formed is 3,000.

The CPU 131 determines that the developing cartridge 25 can form 6,000 images if the CPU 131 detects such a change in the supply of the developing bias from ON to OFF and then back to ON after the warm-up process has started and the length of time, during which the supply of the developing bias is OFF, is longer than the threshold.

If the CPU 131 determines that the developing bias is supplied to the fixed electrode 118 continuously for the predetermined period of time or more, then the CPU 131 determines that a developing cartridge 25 is being mounted in the main casing 2.

According to the second embodiment, a half or more of the electric-power receiving portion 88 in the rotation direction is continuously covered with the peripheral wall 137.

Therefore, a half or more of the electric-power receiving portion 88 in the rotation direction is continuously protected.

According to the second embodiment, the rotation-direction length of the peripheral wall 137 corresponds to the maximum number of images that can be formed with the developing cartridge 25.

Therefore, on the basis of the rotation-direction length of the peripheral wall 137, the maximum number of images that can be formed with the developing cartridge 25 can be easily and reliably determined.

As a result, even though the amount of toner stored in the developing cartridge 25 differs according to the maximum number of images that can be formed by the developing cartridge 25, the duration of life of the developing cartridge 25 can be correctly determined, and the developing cartridge 25 can be properly replaced.

According to the second embodiment, the same operations as those of the first embodiment described above can be attained.

7. Third Embodiment

Figure 23:
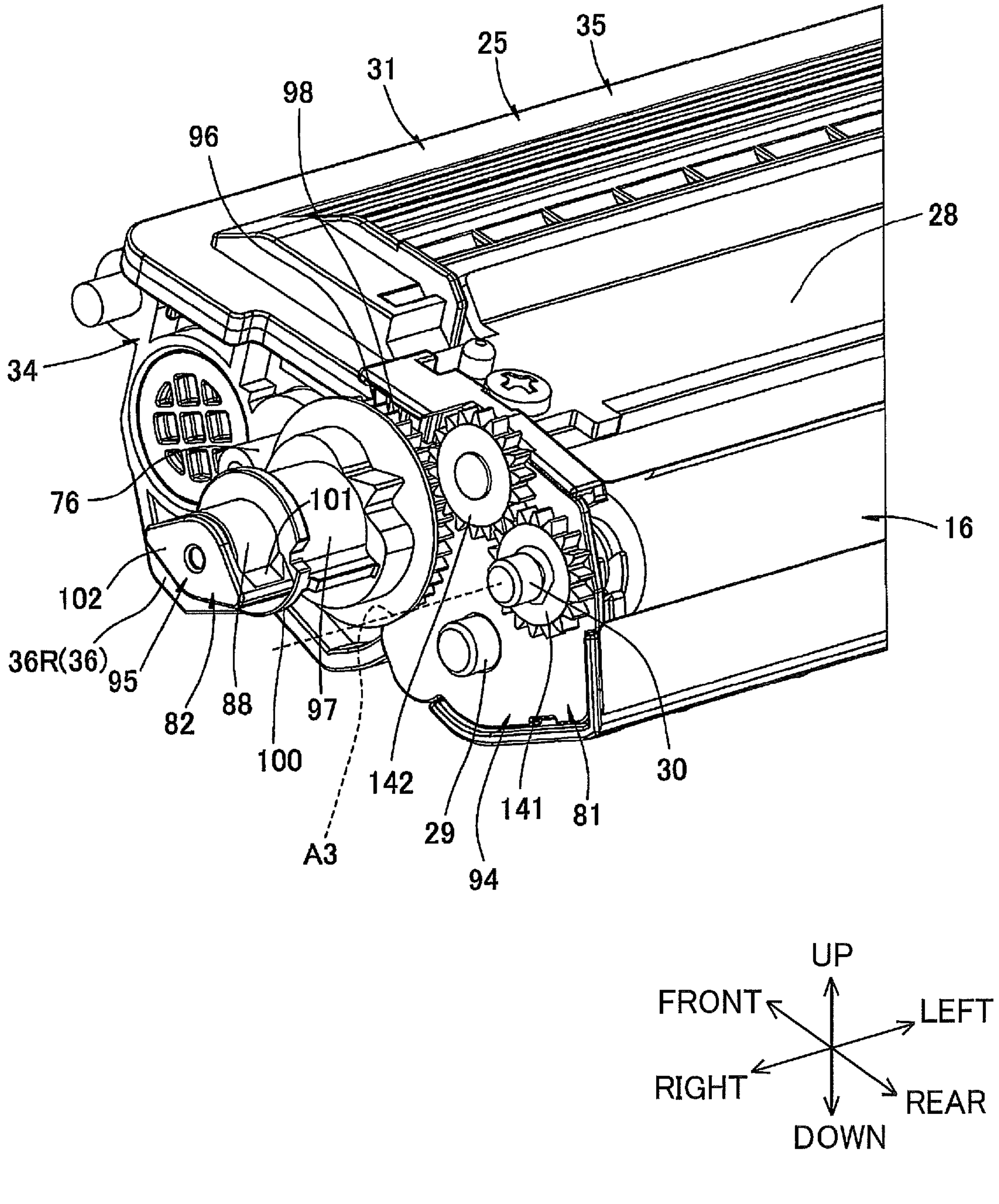
FIG. 23 is a perspective view of an electric-power supplying unit provided in a developing cartridge according to a third embodiment, the electric-power supplying unit being seen from an upper right side of the developing cartridge.
Figure 24:
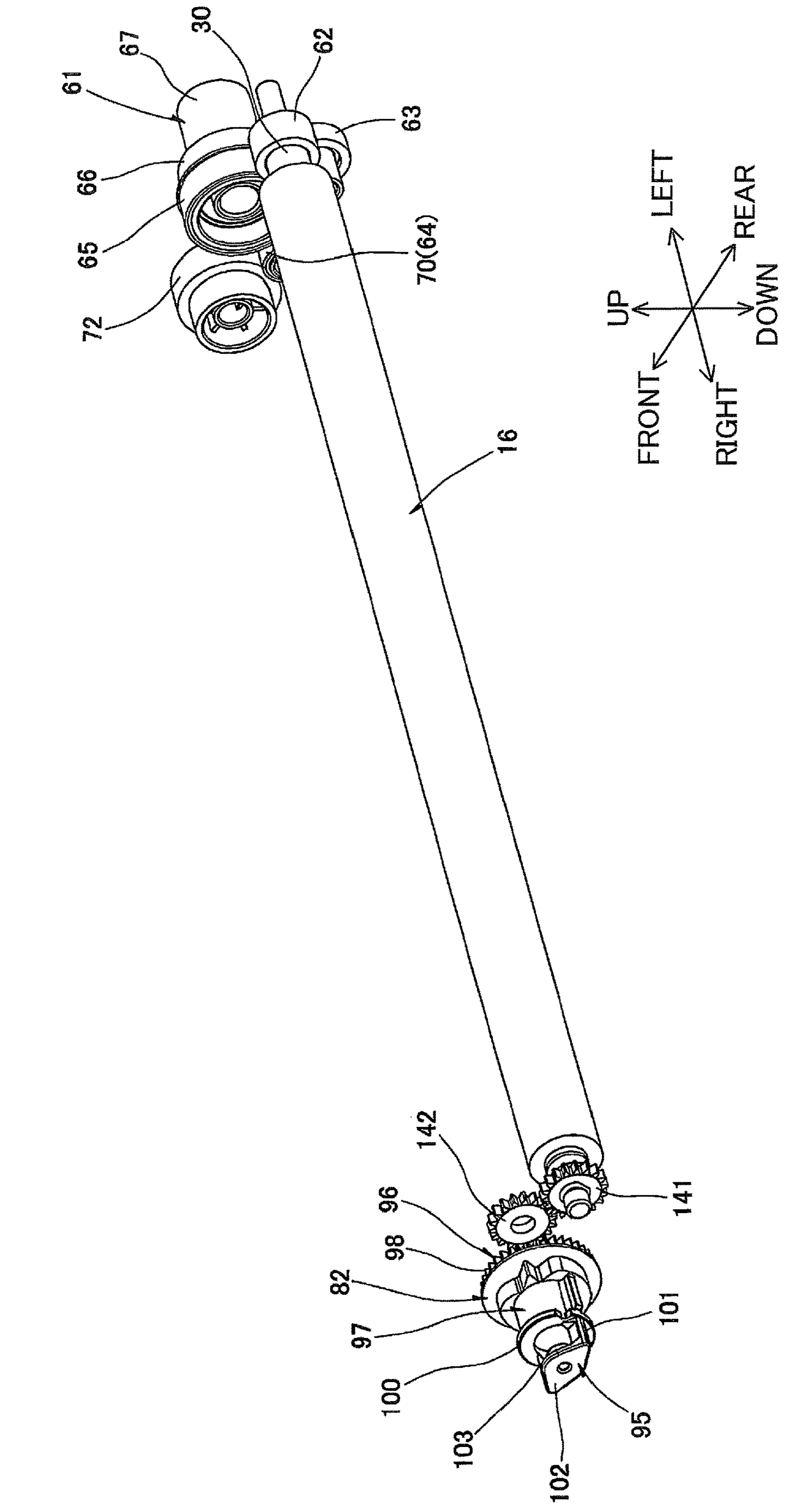
FIG. 24 illustrates the configuration for transmitting a driving force in the developing cartridge of the third embodiment.

With reference to FIGS. 23 and 24, a third embodiment of the cartridge will be described. According to the third embodiment, the same or similar components as those in the first embodiment are represented by the same reference numerals, and the description thereof will be omitted.

According to the first embodiment, a driving force input to the development coupling 61 is transmitted to the new-product detection gear 82 via the agitator shaft 76. However, according to the third embodiment, as shown in FIGS. 23 and 24, a driving force input to the development coupling 61 is transmitted to the new-product detection gear 82 via the developing roller 16. The developing roller 16 has the developing roller shaft 30. The developing roller 16 rotates about a central axis A3 of the developing roller shaft 30 (see FIG. 23).

According to the third embodiment, the second agitator gear 78 is not provided in the right end portion of the agitator shaft 76. Moreover, on the electrode member 81, the developing roller shaft collar 87 is not provided. The right end portion of the developing roller shaft 30 projects from the right surface of the electrode member 81 to the right side.

A first idle gear 141 is supported on the right end portion of the developing roller shaft 30 so as not to be rotatable relative to the developing roller shaft 30. A second idle gear 142 is supported on the right surface of the electrode member 81 so as to be rotatable relative to the electrode member 81. The second idle gear 142 engages with the front upper side of the first idle gear 141, and also with the rear upper side of the teeth portion 98 of the tooth-missing gear 96.

After the warm-up process starts, as shown in FIG. 24, a driving force is transmitted from the development coupling 61 to the developing gear 62. As a result, the developing roller 16 rotates.

As the developing roller 16 rotates, the first idle gear 141 rotates together with the developing roller shaft 30. The driving force is transmitted from the first idle gear 141 to the teeth portion 98 of the tooth-missing gear 96 via the second idle gear 142. As a result, the new-product detection gear 82 rotates in the clockwise direction when viewed from the right side.

According to the third embodiment, the use of the developing roller 16 enables the driving force to be transmitted from the development coupling 61 to the new-product detection gear 82, resulting in a decrease in the number of components.

According to the third embodiment, the same operations as those of the first embodiment described above can be attained.

8. Fourth Embodiment

Figure 25:
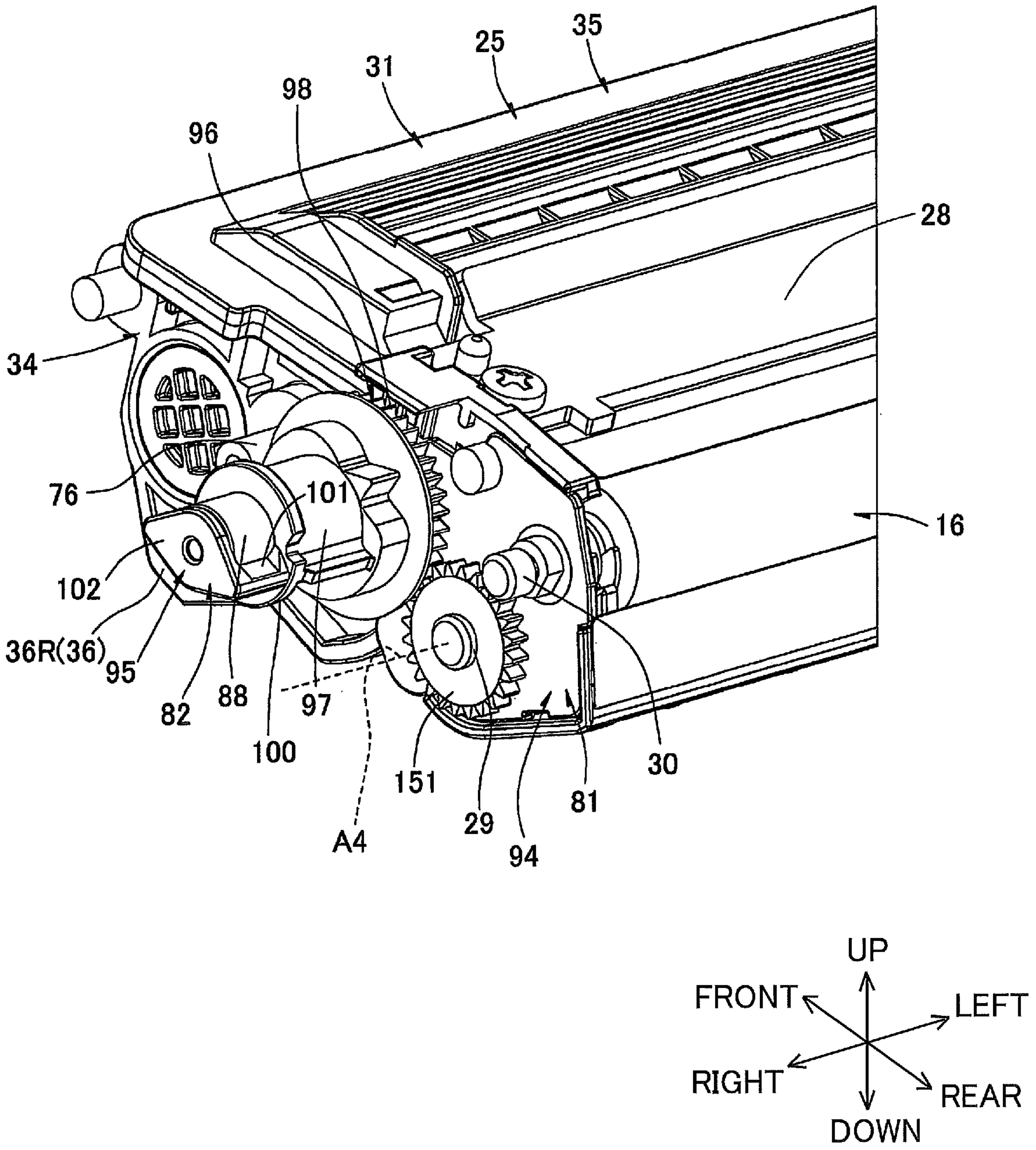
FIG. 25 is a perspective view of an electric-power supplying unit provided in a developing cartridge according to a fourth embodiment, the electric-power supplying unit being seen from an upper right side of the developing cartridge.
Figure 26:
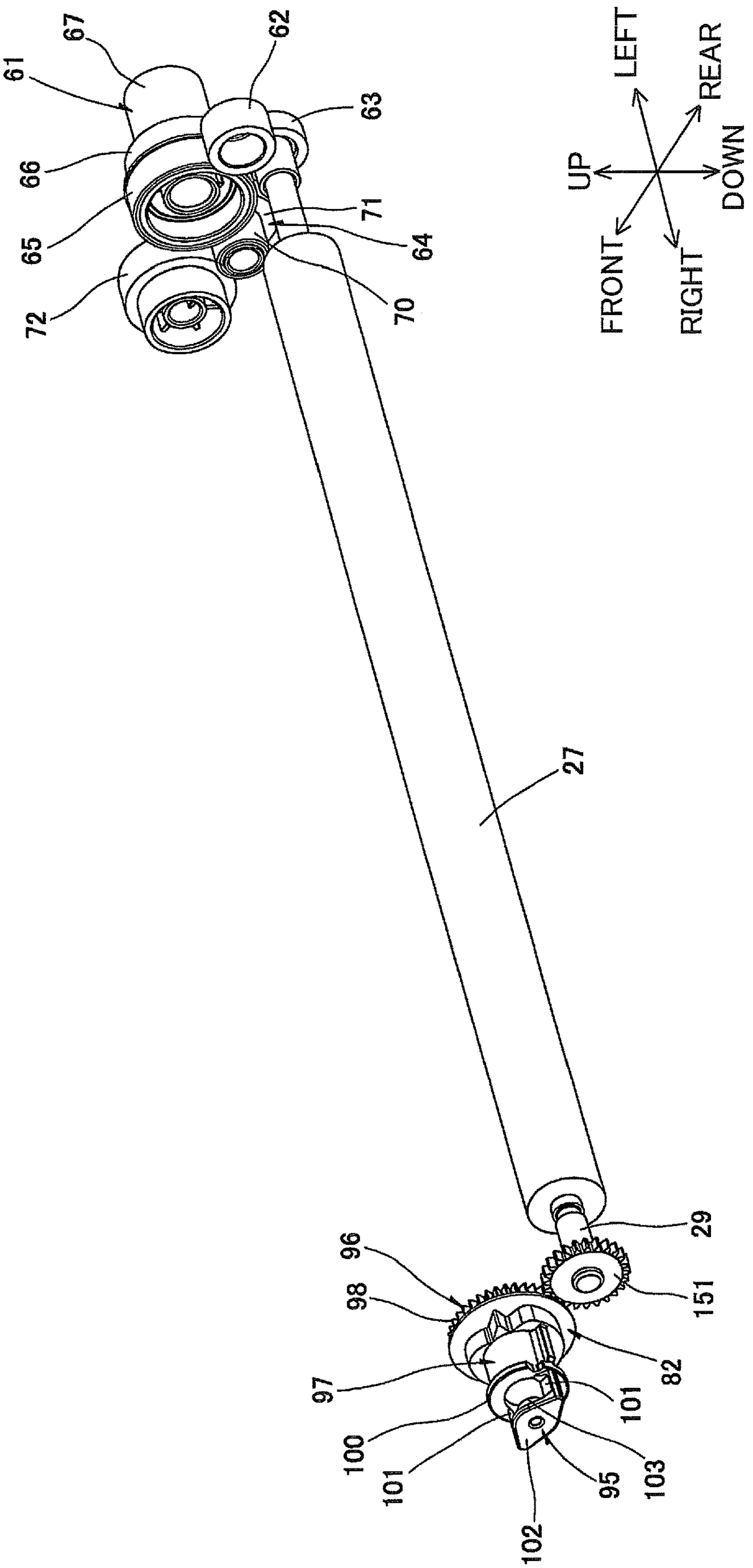
FIG. 26 illustrates the configuration for transmitting a driving force in the developing cartridge of the fourth embodiment.

With reference to FIGS. 25 and 26, a fourth embodiment of the cartridge will be described. According to the fourth embodiment, the same or similar components as those in the first embodiment are represented by the same reference numerals, and the description thereof will be omitted.

According to the first embodiment, a driving force input to development coupling 61 is transmitted to the new-product detection gear 82 via the agitator shaft 76. According to the fourth embodiment, as shown in FIGS. 25 and 26, a driving force input to development coupling 61 is transmitted to the new-product detection gear 82 via the supply roller 27. The supply roller 27 has the supply roller shaft 29. The supply roller 27 rotates around a central axis A4 (see FIG. 25) of the supply roller shaft 29.

According to the fourth embodiment, the second agitator gear 78 is not provided on the right end portion of the agitator shaft 76. The right end portion of the supply roller shaft 29 projects from the right surface of the electrode member 81 to the right side through the main part 94 of the electrode member 81.

An idle gear 151 is supported on the right end portion of the supply roller shaft 29 so as not to be rotatable relative to the supply roller shaft 29. The idle gear 151 engages with the rear lower side of the teeth portion 98 of the tooth-missing gear 96.

After the warm-up operation starts, as shown in FIG. 26, a driving force is transmitted from the development coupling 61 to the supply gear 63. As a result, the supply roller 27 rotates.

As the supply roller 27 rotates, the supply roller shaft 29 rotates together with the idle gear 151. The driving force is transmitted from the idle gear 151 to the teeth portion 98 of the tooth-missing gear 96. As a result, the new-product detection gear 82 rotates in the clockwise direction when viewed from the right side.

According to the fourth embodiment, the use of the supply roller 27 enables the driving force to be transmitted from the development coupling 61 to the new-product detection gear 82, resulting in a decrease in the number of components.

According to the fourth embodiment, the same operations as those of the first embodiment described above can be attained.

9. Fifth Embodiment

Figure 27:
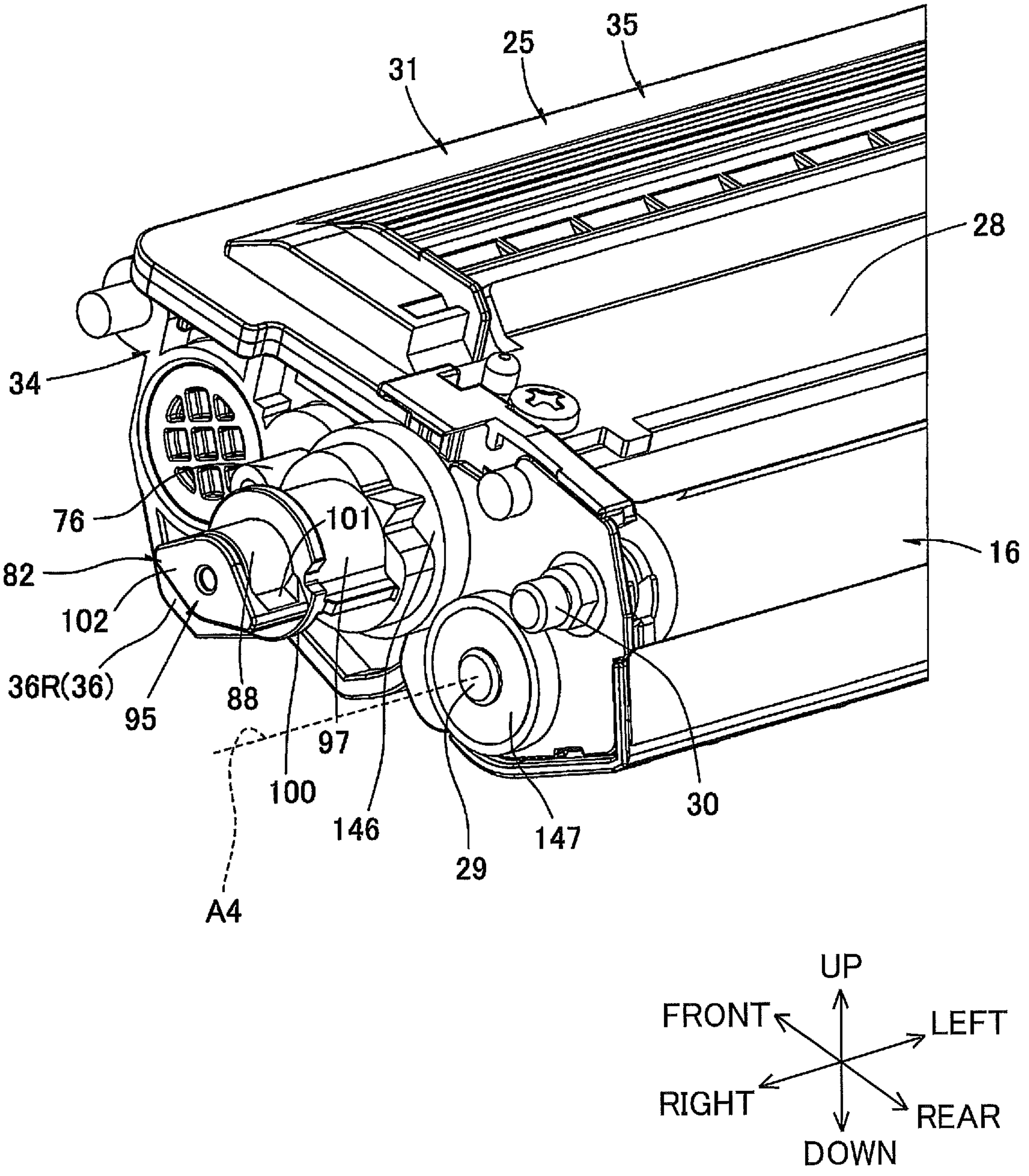
FIG. 27 is a perspective view of an electric-power supplying unit provided in a developing cartridge according to a fifth embodiment, the electric-power supplying unit being seen from an upper right side of the developing cartridge.

With reference to FIG. 27, a fifth embodiment of the cartridge will be described. According to the fifth embodiment, the same or similar components as those in the fourth embodiment described above are represented by the same reference numerals, and the description thereof will be omitted.

According to the above-described fourth embodiment, the idle gear 151 is provided on the right end portion of the supply roller shaft 29. The idle gear 151 engages with the rear lower side of the teeth portion 98 in the tooth-missing gear 96.

However, according to the fifth embodiment, instead of the tooth-missing gear 96, a first resistance providing member 146 is provided on the new-product detection gear 82 as shown in FIG. 27. The first resistance providing member 146 is substantially in the shape of a circular plate. At least an outer peripheral part of the first resistance providing member 146 is made of a material having a relatively large friction coefficient, such as rubber. Instead of the idle gear 151, a second resistance providing member 147 is provided on the right end portion of the supply roller shaft 29 so that the second resistance providing member 147 is in contact with the rear side of the first resistance providing member 146. The second resistance providing member 147 is substantially in the shape of a circular plate. At least an outer peripheral part of the second resistance providing member 147 is made of a material having a relatively large friction coefficient, such as rubber.

After the warm-up process starts, the supply roller 27 rotates in a similar way to the fourth embodiment described above.

As the supply roller 27 rotates, the second resistance providing member 147 rotates together with the supply roller shaft 29. Due to the frictional force between the second resistance providing member 147 and the first resistance providing member 146, the driving force is transmitted from the second resistance providing member 147 to the first resistance providing member 146, and the new-product detection gear 82 rotates in the clockwise direction when viewed from the right side as a result.

According to the fifth embodiment, the same operations as those of the first embodiment described above can be attained.

10. Sixth Embodiment

Figure 28:
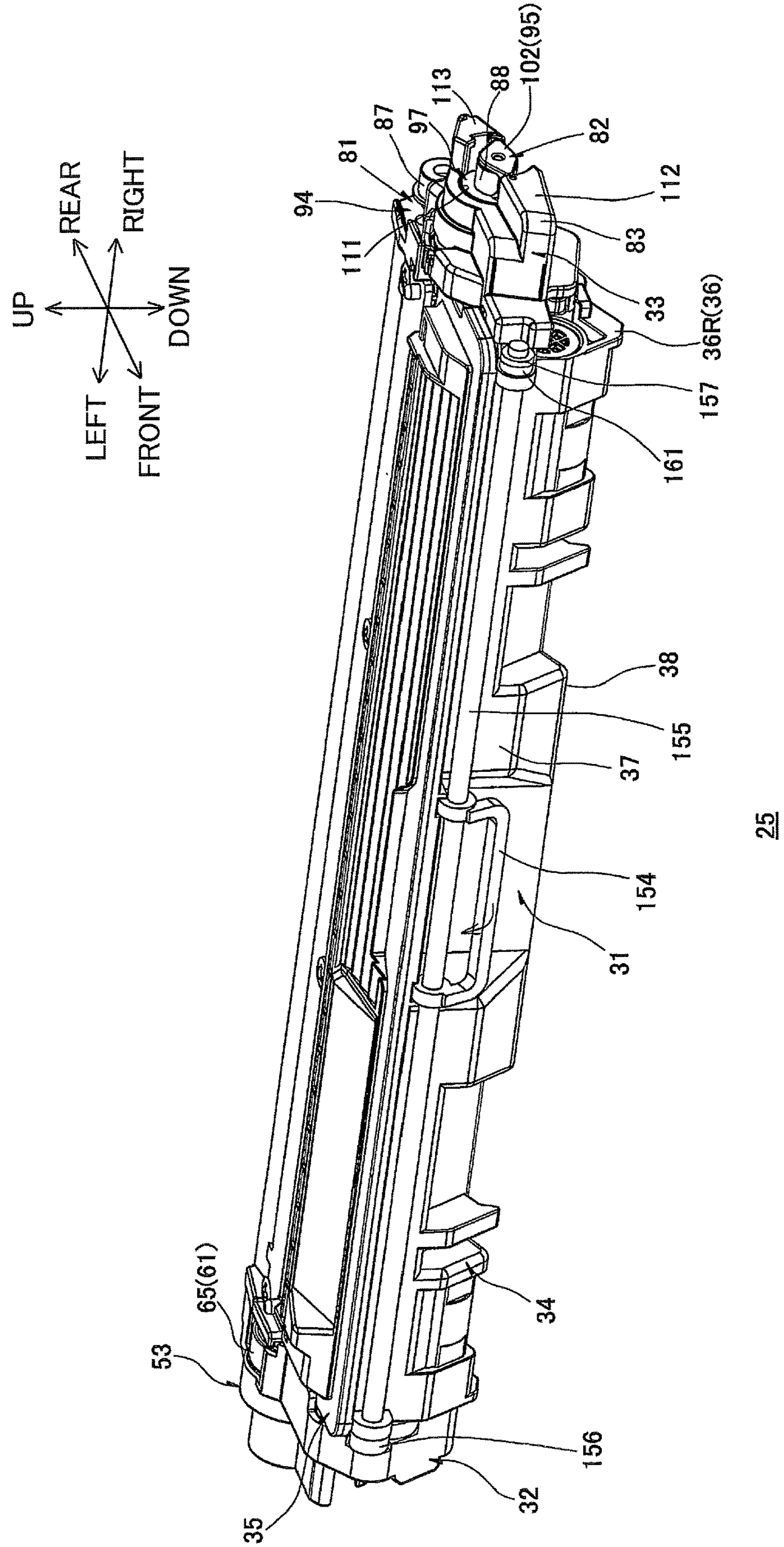
FIG. 28 is a perspective view of a developing cartridge according to a sixth embodiment seen from an upper right side.
Figure 29:
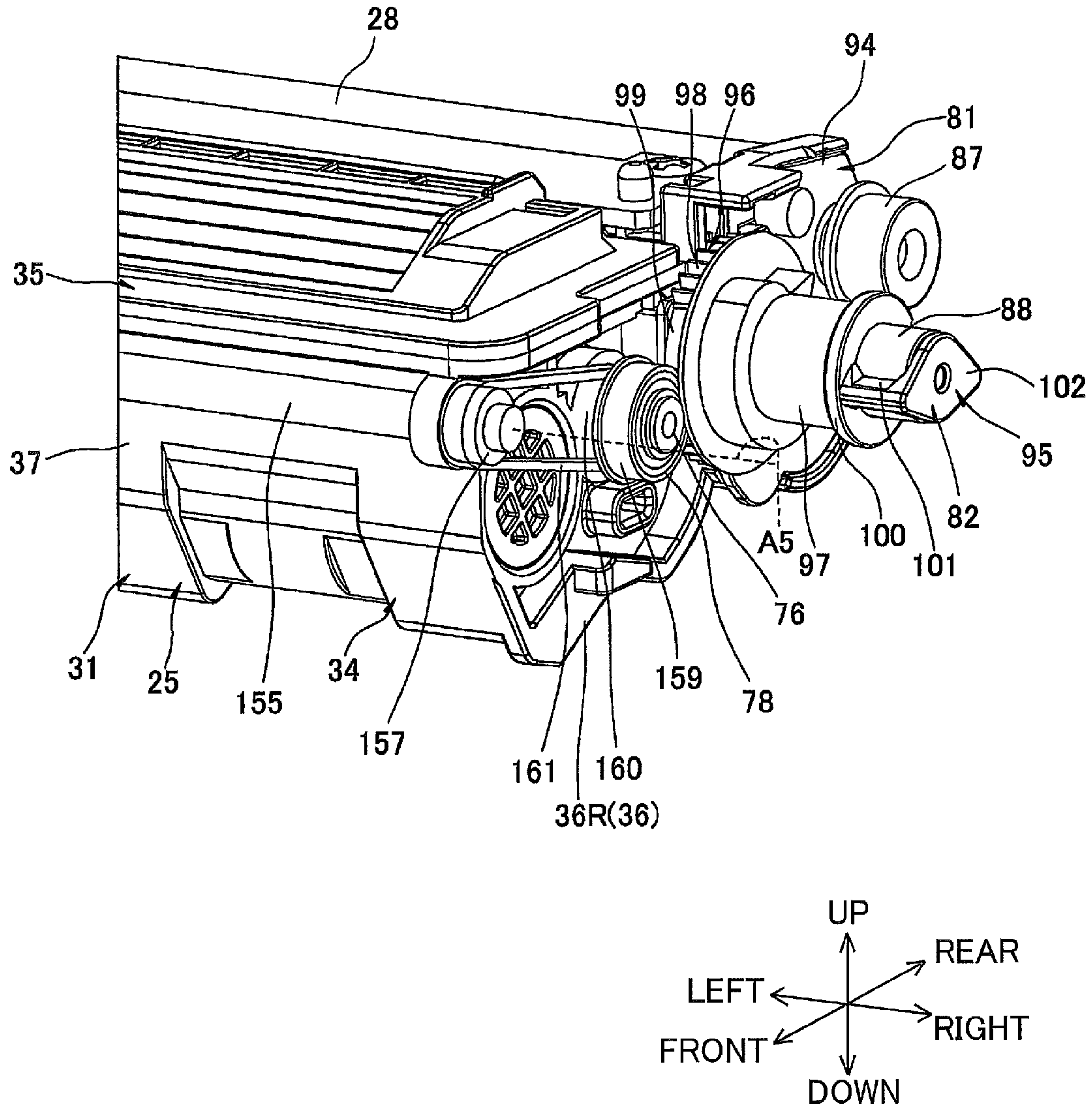
FIG. 29 is a perspective view of an electric-power supplying unit shown in FIG. 28, the electric-power supplying unit being seen from the upper right side.
Figure 30:
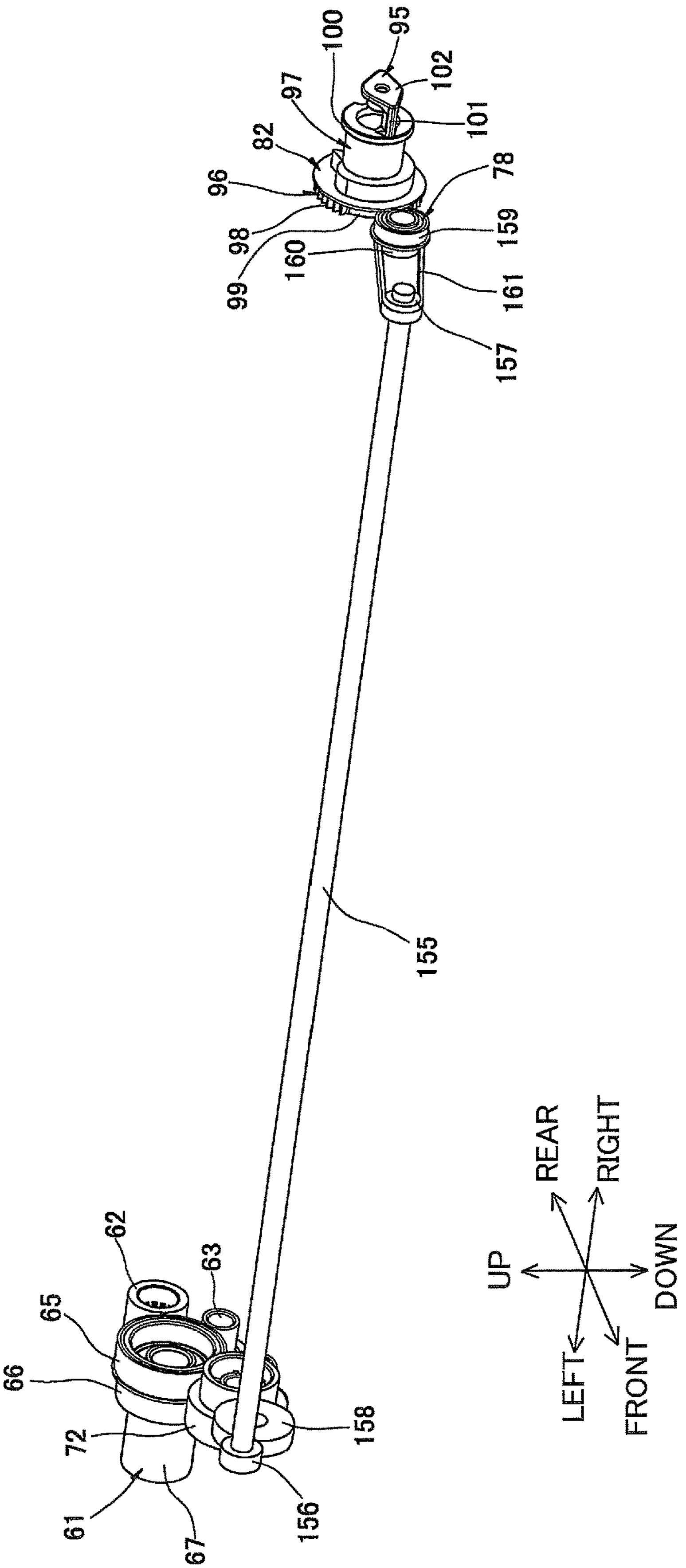
FIG. 30 illustrates the configuration for transmitting a driving force in the developing cartridge of the sixth embodiment.

With reference to FIGS. 28, 29 and 30, a sixth embodiment of the cartridge will be described. According to the sixth embodiment, the same or similar components as those in the first embodiment are represented by the same reference numerals, and the description thereof will be omitted.

According to the first embodiment, a driving force input to the development coupling 61 is transmitted to the new-product detection gear 82 via the agitator shaft 76. According to the sixth embodiment, as shown in FIGS. 28 and 29, a driving force input to development coupling 61 is transmitted to the new-product detection gear 82 via an outer side rotation shaft 155. The outer side rotation shaft 155 is supported by a front end portion of the cartridge frame 31. The outer side rotation shaft 155 rotates around its central axis A5 (see FIG. 29).

According to the sixth embodiment, the second agitator gear 78 is supported by the agitator shaft 76 so as to be rotatable relative to the agitator shaft 76, meaning that no driving force is transmitted from the agitator shaft 76 to the second agitator gear 78.

The outer side rotation shaft 155 is formed substantially in the shape of a column that extends in the left-right direction. Both left-right-direction end portions of the outer side rotation shaft 155 are supported by a front end portion of the cartridge frame 31 in such a way that the outer side rotation shaft 155 can rotate relative to the cartridge frame 31. A handle 154 is supported substantially at the left-right-direction center of the outer side rotation shaft 155 so as to be rotatable relative to the outer side rotation shaft 155. The handle 154 is for being held by a user.

An input gear 156 is supported on the left end portion of the outer side rotation shaft 155 so as not to be rotatable relative to the outer side rotation shaft 155. The input gear 156 is for inputting a driving force to the outer side rotation shaft 155. More specifically, as shown in FIG. 30, an idle gear 158 is provided between the input gear 156 and the first agitator gear 72. A pulley 157 is supported on the right end portion of the outer side rotation shaft 155 so as not to be rotatable relative to the outer side rotation shaft 155.

The second agitator gear 78 is integrally formed with a gear portion 159 and a pulley portion 160.

The gear portion 159 is provided in the right end portion of the second agitator gear 78, and engages with the front side of the teeth portion 98 of the tooth-missing gear 96.

The pulley portion 160 is provided in the left end portion of the second agitator gear 78. No gear teeth are provided on the pulley portion 160.

An endless belt 161 is wound around the pulley portion 160 and the pulley 157 of the outer side rotation shaft 155.

After the warm-up process starts, as shown in FIG. 30, a driving force is transmitted from the development coupling 61 to the first agitator gear 72 in a similar way to the above-described first embodiment. Then, the driving force is transmitted from the idle gear 158 to the input gear 156, and then to the outer side rotation shaft 155. As a result, the outer side rotation shaft 155 rotates.

As the outer side rotation shaft 155 rotates, the pulley 157 rotates together with the outer side rotation shaft 155, and the endless belt 161 therefore moves circumferentially. The driving force is transmitted to the pulley portion 160 of the second agitator gear 78 via the endless belt 161, and then to the teeth portion 98 of the tooth-missing gear 96 through the gear portion 159 of the second agitator gear 78. As a result, the new-product detection gear 82 rotates in the clockwise direction when viewed from the right side.

According to the sixth embodiment, the same operations as those of the first embodiment described above can be attained.

11. Seventh Embodiment

With reference to FIG. 31 to FIG. 36, a seventh embodiment of the printer will be described. According to the seventh embodiment, the same or similar components as those in the first embodiment are denoted by the same reference numerals, and the description thereof will be omitted.

According to the first embodiment, the electric-power supplying unit 33 includes the electrode member 81, new-product detection gear 82, and electric power supply side gear cover 83. The electric-power receiving portion 88 is provided on the electrode member 81 so as to project toward the right side. The electric-power receiving portion 88 is substantially in the shape of a cylindrical tube. The new-product detection gear 82 is rotatably supported on the electric-power receiving portion 88. During the warm-up process, as the new-product detection gear 82 rotates, the swing electrode 119 swings back and forth, thereby regularly blocking the supply of electric power to the electric-power receiving portion 88.

Figure 31:
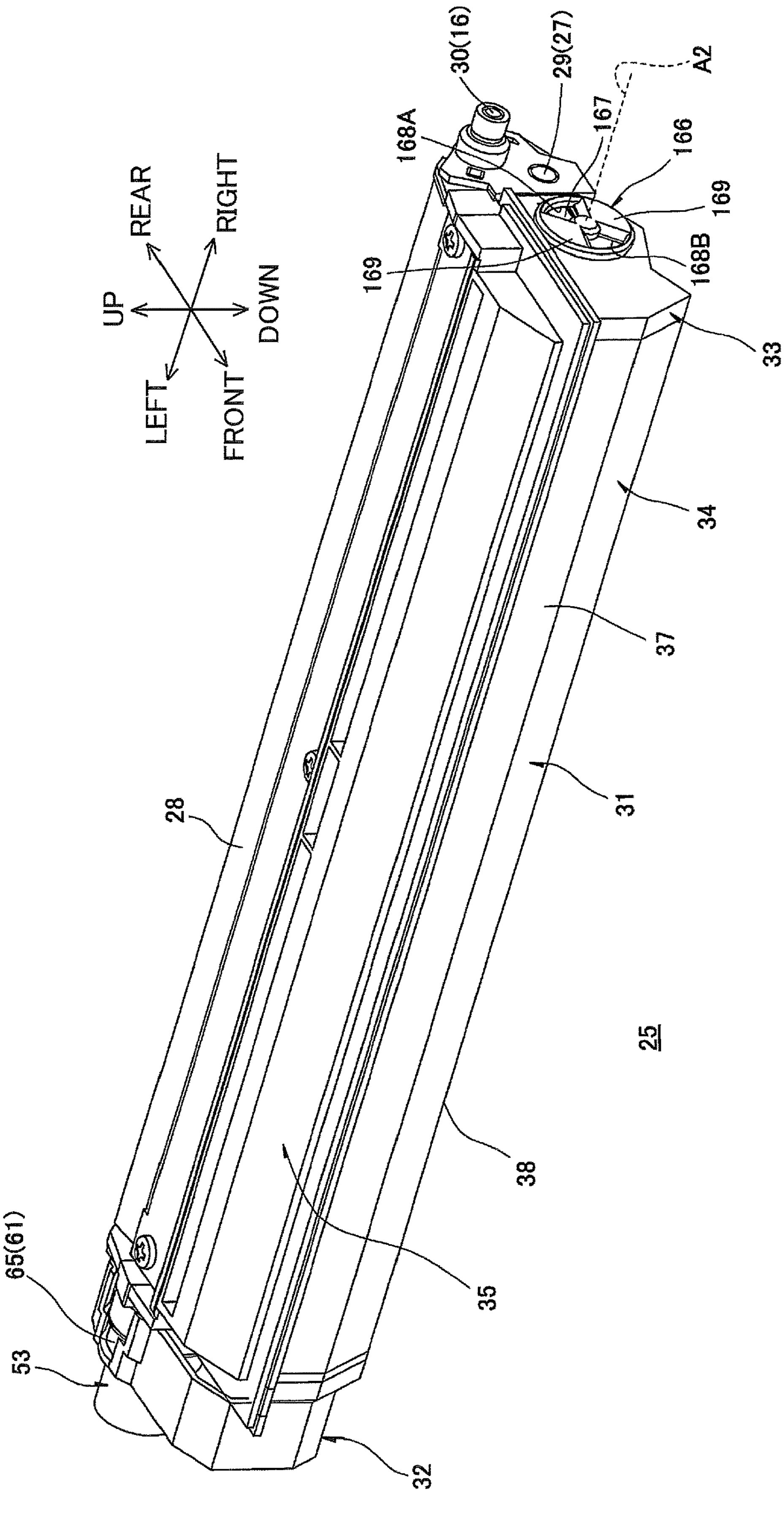
FIG. 31 is a perspective view of a developing cartridge according to a seventh embodiment, the developing cartridge being seen from its upper right side.
Figure 32:
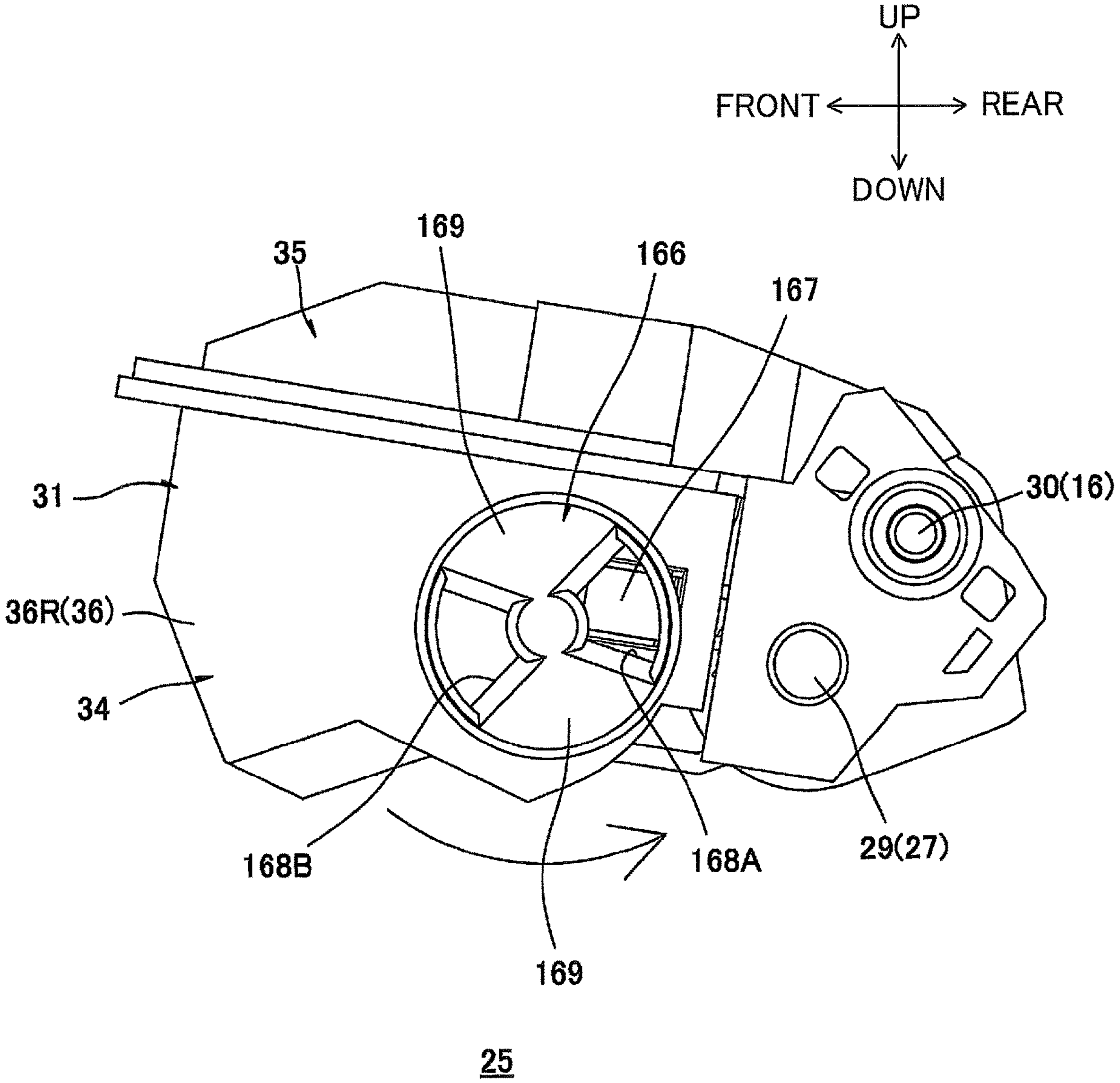
Figure 33:
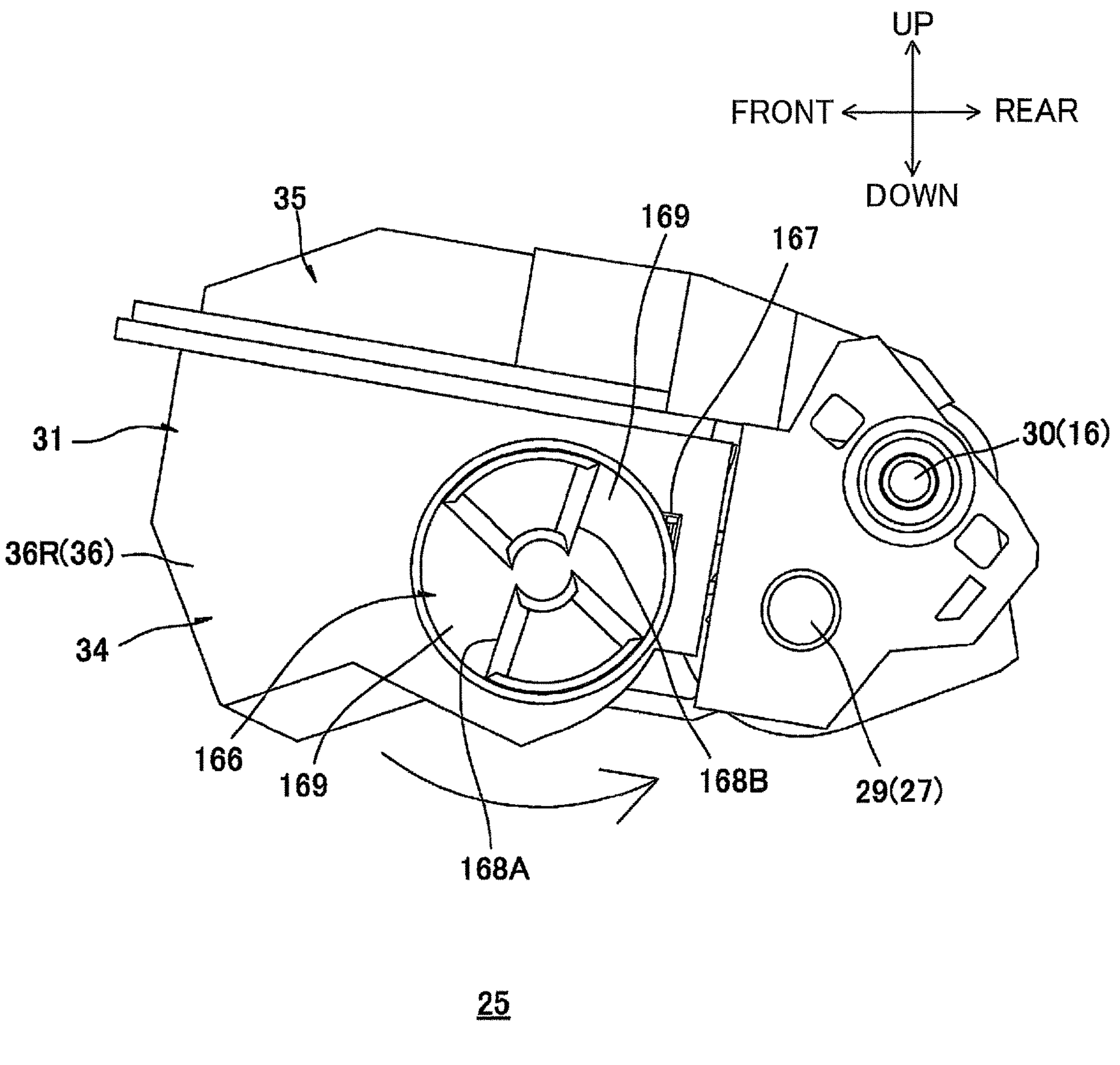

However, according to the seventh embodiment, as shown in FIG. 31, the electric-power supplying unit 33 is modified to include an electric-power receiving portion 167 that is substantially in the shape of a rectangular plate and a rotation plate 166 that is substantially in the shape of a circular plate. The electric-power receiving portion 167 is fixedly mounted on the right wall 36R. The electric-power receiving portion 167 is made of a conductive material such as metal. The rotation plate 166 is rotatably mounted on the right wall 36R. The rotation plate 166 is located on the right side of the electric-power receiving portion 167. The rotation plate 166 is made of an insulating resin material.

More specifically, the electric-power receiving portion 167 is located on the right side of the rear end portion of the toner accommodating portion 79. The electric-power receiving portion 167 is substantially in the shape of a rectangle when viewed from the side. The electric-power receiving portion 167 is electrically connected to the developing roller shaft 30 and the supply roller shaft 29 via an electrode not shown in the diagrams.

The rotation plate 166 is supported on the right wall 36R so as to be rotatable about its rotational axis. The rotational axis of the rotation plate 166 is located on the front side of the electric-power receiving portion 167. The rear-side half of the rotation plate 166 overlaps with the electric-power receiving portion 167. The rotation plate 166 is formed with two electric-power receiving portion exposure openings 168. A covering portion 169 is defined as an area of the rotation plate 166 between the electric-power receiving portion exposure openings 168.

The two electric-power receiving portion exposure openings 168 are provided in the rotation plate 166 in opposite sides in the radial direction. The electric-power receiving portion exposure openings 168 are each formed through the rotation plate 166, and are substantially in a fan shape when viewed from the side with a central angle of about 60 degrees.

Figure 34:
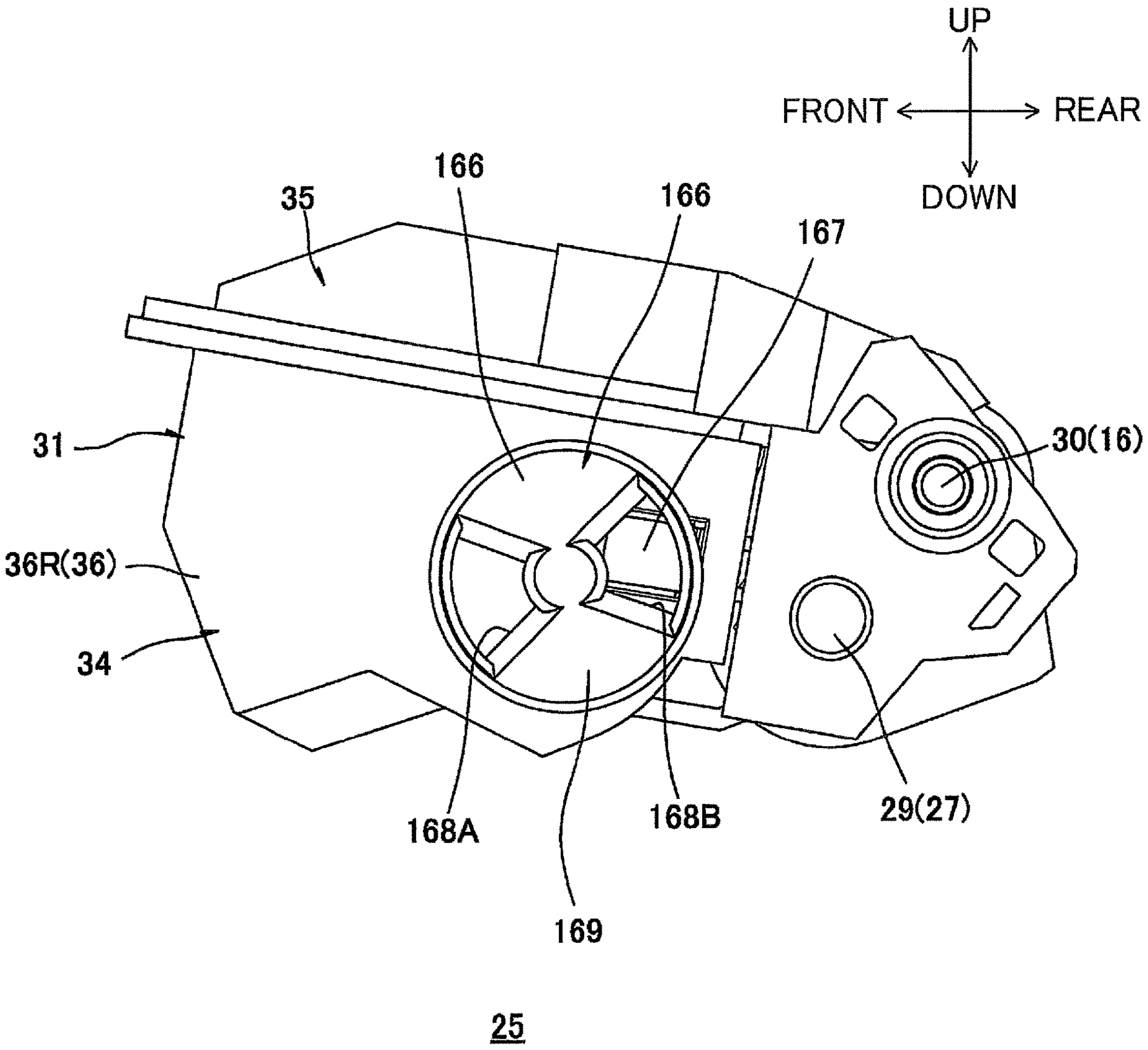

The rotation plate 166 rotates counterclockwise when viewed from the right side during the warm-up process of the printer 1, thereby moving from a first position (See FIG. 32) to a second position (See FIG. 33) and then to a third position (See FIG. 34). At the first position, the electric-power receiving portion 167 is exposed via one electric-power receiving portion exposure opening 168A. At the second position, the electric-power receiving portion 167 is covered with the covering portion 169. At the third position, the electric-power receiving portion 167 is exposed via the other electric-power receiving portion exposure opening 168B.

Figure 35:
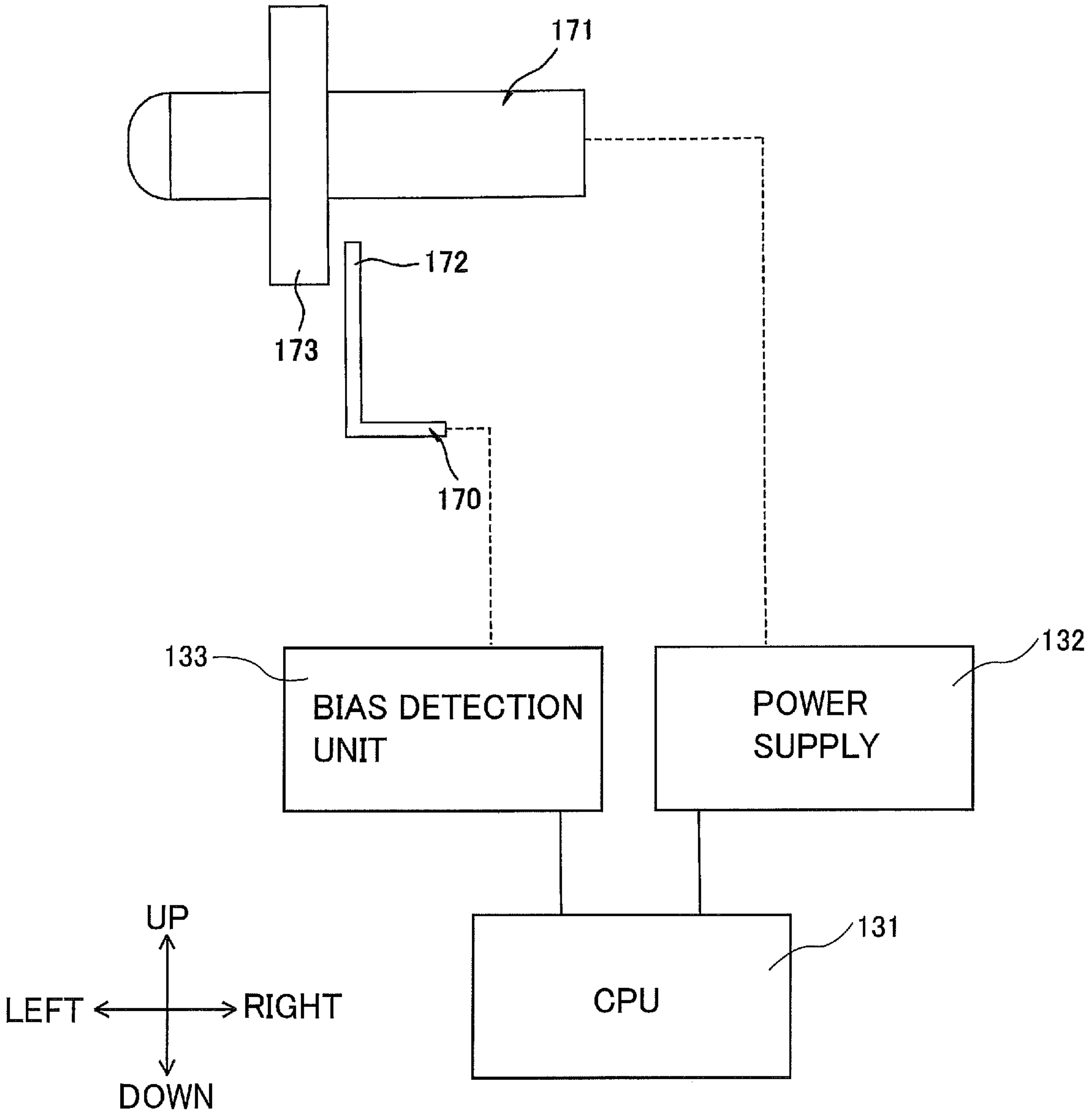
FIG. 35 is a front view of a fixed electrode and a moving electrode that are provided in the main casing of the printer of the seventh embodiment.

According to the first embodiment, the main-casing-side electrode unit 116 is provided in the main casing 2 to supply developing bias to the developing cartridge 25. However, according to the seventh embodiment, in place of the main-casing-side electrode unit 116, a fixed electrode 170 and a moving electrode 171 are provided in the main casing 2 as shown in FIG. 35.

The fixed electrode 170 is made of metal, and is formed substantially in an L-shaped bent rod. One end portion of the fixed electrode 170 is fixed to the main casing 2 at a location near to the right side of the developing cartridge 25 when the developing cartridge 25 is mounted in the main casing 2. The fixed electrode 170 is electrically connected to the bias detection unit 133. The fixed electrode 170 has a free end portion 172.

The moving electrode 171 is movably provided in the main casing 2 at a location close to the right side of the developing cartridge 25 when the developing cartridge 25 is mounted in the main casing 2. The moving electrode 171 is made of metal, and is formed substantially in the shape of a column that extends in the left-right direction. The moving electrode 171 includes a flange portion 173. The flange portion 173 is positioned midway in the left-right direction of the moving electrode 171, and protrudes radially outwardly from the moving electrode 171. The flange portion 173 can contact with the free end portion 172 of the fixed electrode 170. The moving electrode 171 is electrically connected to the power supply 132.

In the main casing 2, the moving electrode 171 is mounted so as to be slidably movable in the left-right direction, and is normally urged to the left by an urging member (not shown). So, the flange portion 173 is normally kept at a left-side disconnection position where the flange portion 173 is separate from the free end portion 172 of the fixed electrode 170 to the left side.

When the developing cartridge 25 is not mounted in the main casing 2, the moving electrode 171 is placed at the left-side disconnection position (See FIG. 35). Therefore, no developing bias is supplied from the power supply 132 to the developing cartridge 25 and the fixed electrode 170, and the bias detection unit 133 does not detect supply of developing bias from the power supply 132 to the fixed electrode 170. Thus, the CPU 131 determines that no developing bias is supplied to the fixed electrode 170.

If the bias detection unit 133 does not detect supply of developing bias from the power supply 132 to the fixed electrode 170 continuously for the predetermined period of time or longer, then the CPU 131 determines that the developing cartridge 25 is not mounted in the main casing 2.

Figure 36A:
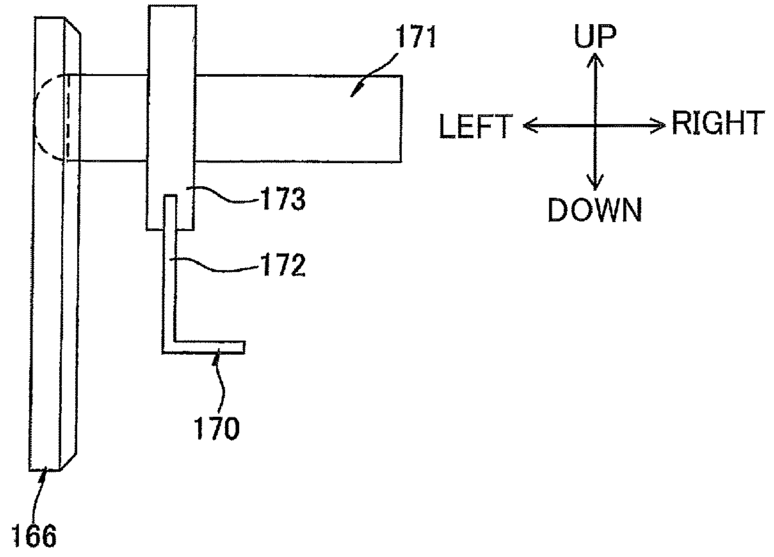

After the developing cartridge 25 is completely mounted in the main casing 2 with the rotation plate 166 placed at the first position, as shown in FIG. 36A, the electric-power receiving portion 167 of the developing cartridge 25 comes in contact with the left end portion of the moving electrode 171 from the left side via one electric-power receiving portion exposure opening 168 of the rotation plate 166. Then, the moving electrode 171 is pushed from the left side by the developing cartridge 25, and slides to the right side against the urging force of the urging member (not shown). As a result, the flange portion 173 of the moving electrode 171 comes in contact with the free end portion 172 of the fixed electrode 170. In other words, the moving electrode 171 is placed at the connection position.

So, the developing bias supplied from the power supply 132 to the moving electrode 171 is supplied to the electric-power receiving portion 167 of the developing cartridge 25 via the left end portion of the moving electrode 171. The developing bias supplied to the electric-power receiving portion 167 is applied to the developing roller shaft 30.

The developing bias is also supplied from the flange portion 173 to the fixed electrode 170 via the free end portion 172, and is detected by the bias detection unit 133.

The CPU 131 determines that the developing bias is supplied to the fixed electrode 170.

After a warm-up operation starts, the rotation plate 166 rotates in the counterclockwise direction when viewed from the right side, and the rotation plate 166 is placed at the second position.

Figure 36B:
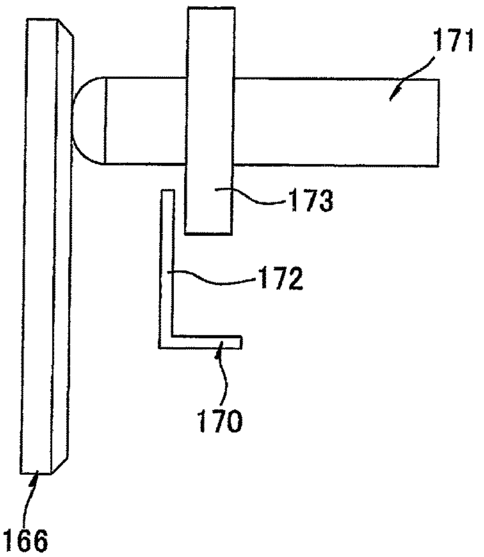

As a result, as shown in FIG. 36B, the covering portion 169 of the rotation plate 166 is inserted into between the electric-power receiving portion 167 and the moving electrode 171. The moving electrode 171 retracts from the electric-power receiving portion 167 to the right side against the urging force of the urging member (not shown), and is placed at the right side disconnection position.

Accordingly, the moving electrode 171 moves away from the electric-power receiving portion 167 to the right side, and the moving electrode 171 is electrically disconnected from the electric-power receiving portion 167 as a result. Moreover, the moving electrode 171 is moved away from the free end portion 172 of the fixed electrode 170 to the right side, and the moving electrode 171 is electrically disconnected from the fixed electrode 170 as a result.

At this time, the CPU 131 determines that no developing bias is supplied to the fixed electrode 170.

Figure 36C:
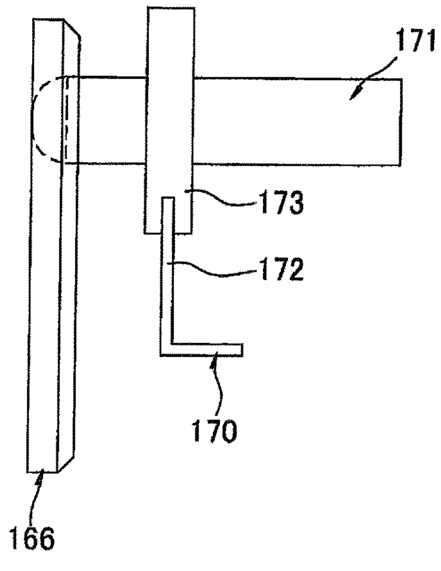

Then, as shown in FIG. 36C, the rotation plate 166 further rotates in the counterclockwise direction when viewed from the right side, and is placed at the third position. The moving electrode 171 is moved to the left side due to the urging force of the urging member (not shown), and is placed at the connection position where the moving electrode 171 is in contact with the electric-power receiving portion 167 via the other electric-power receiving portion exposure opening 168 of the rotation plate 166.

At this time, the CPU 131 determines that the developing bias is supplied to the fixed electrode 170.

The CPU 131 determines that the developing cartridge 25 is a new (unused) product if the CPU 131 determines, after the warm-up operation has started, that the developing bias is supplied to the fixed electrode 170, then the supply of the developing bias to the fixed electrode 170 temporarily stops, and then the developing bias is supplied to the fixed electrode 170 again.

If the CPU 131 determines that the developing bias is supplied to the fixed electrode 170 continuously for the predetermined period of time or more, then the CPU 131 determines that a developing cartridge 25 is being mounted in the main casing 2.

According to the seventh embodiment, the rotation plate 166 having the two electric-power receiving portion exposure openings 168 is provided between the electric-power receiving portion 167 and the moving electrode 171, and rotates from the first position to the second position and then to the third position. At the first position, the rotation plate 166 allows electric power to be supplied to the electric-power receiving portion 167 via one electric-power receiving portion exposure opening 168. At the second position, the rotation plate 166 blocks supply of electric power to the electric-power receiving portion 167 by the covering portion 169. At the third position, the rotation plate 166 allows electric power to be supplied to the electric-power receiving portion 167 via the other electric-power receiving portion exposure opening 168.

Such a simple configuration ensures that the moving electrode 171 slides in the main casing 2 and switches supply of electric power to the electric-power receiving portion 167 between the ON and OFF states.

According to the seventh embodiment, the same operations as those of the first embodiment described above can be attained.

12. Eighth Embodiment

With reference to FIG. 37 to FIG. 41, an eighth embodiment of the printer 1 will be described. According to the eighth embodiment, the same or similar components as those in the seventh embodiment are denoted by the same reference numerals, and the description thereof will be omitted.

According to the seventh embodiment, the rotation plate 166 is provided on the right side of the electric-power receiving portion 167. As the rotation plate 166 rotates, supply of electric power to the electric-power receiving portion 167 is switched between the ON and OFF states.

According to the eighth embodiment, in place of the rotation plate 166, a slide plate 181 is slidably mounted on the right side of the electric-power receiving portion 167. The slide plate 181 has a covering portion 180. The slide plate 181 slides in the front-back direction in such a way that the covering portion 180 moves along the right side of the electric-power receiving portion 167 from the rear side to the front side.

Figure 37:
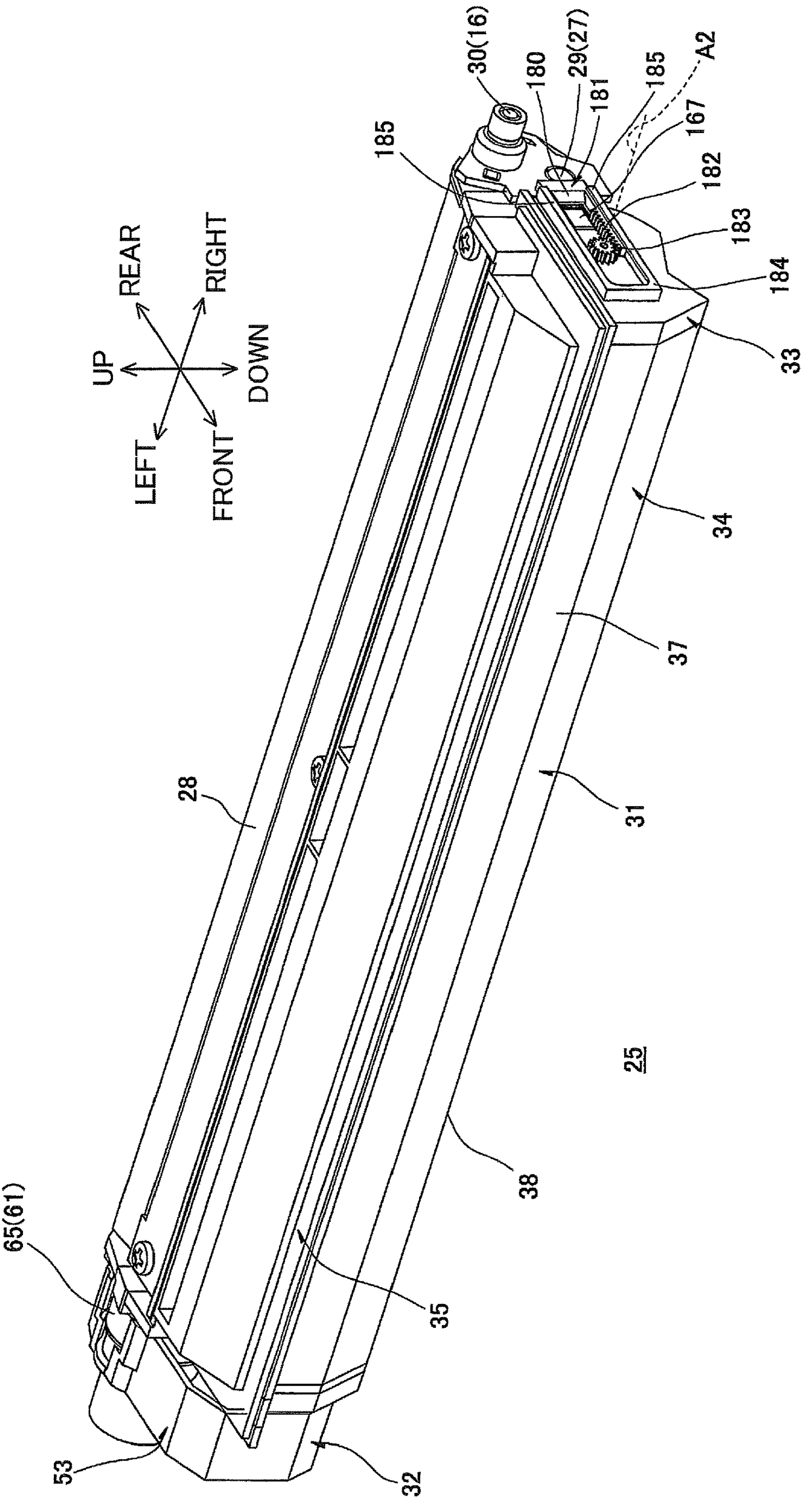
FIG. 37 is a perspective view of a developing cartridge according to an eighth embodiment, the developing cartridge being seen from its upper right side.
Figure 38:
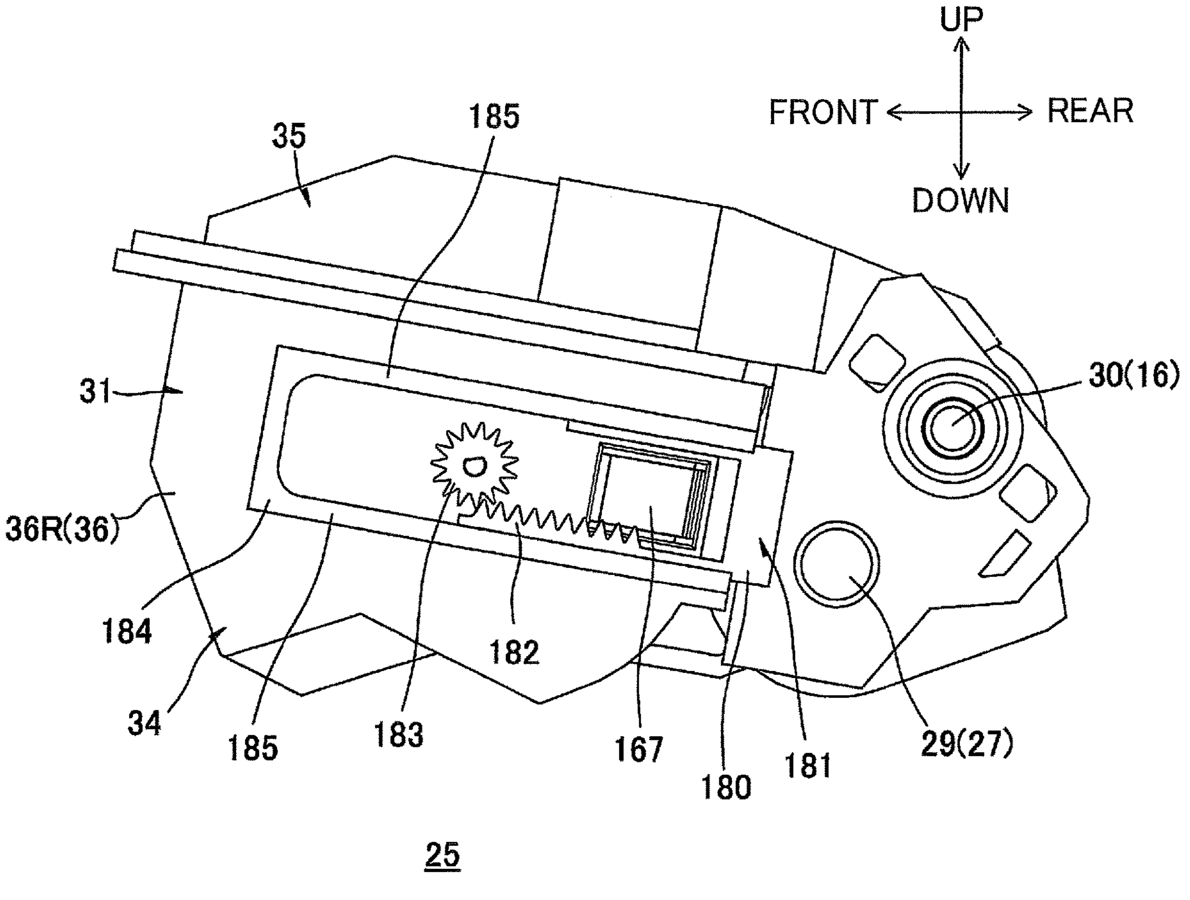
Figure 39:
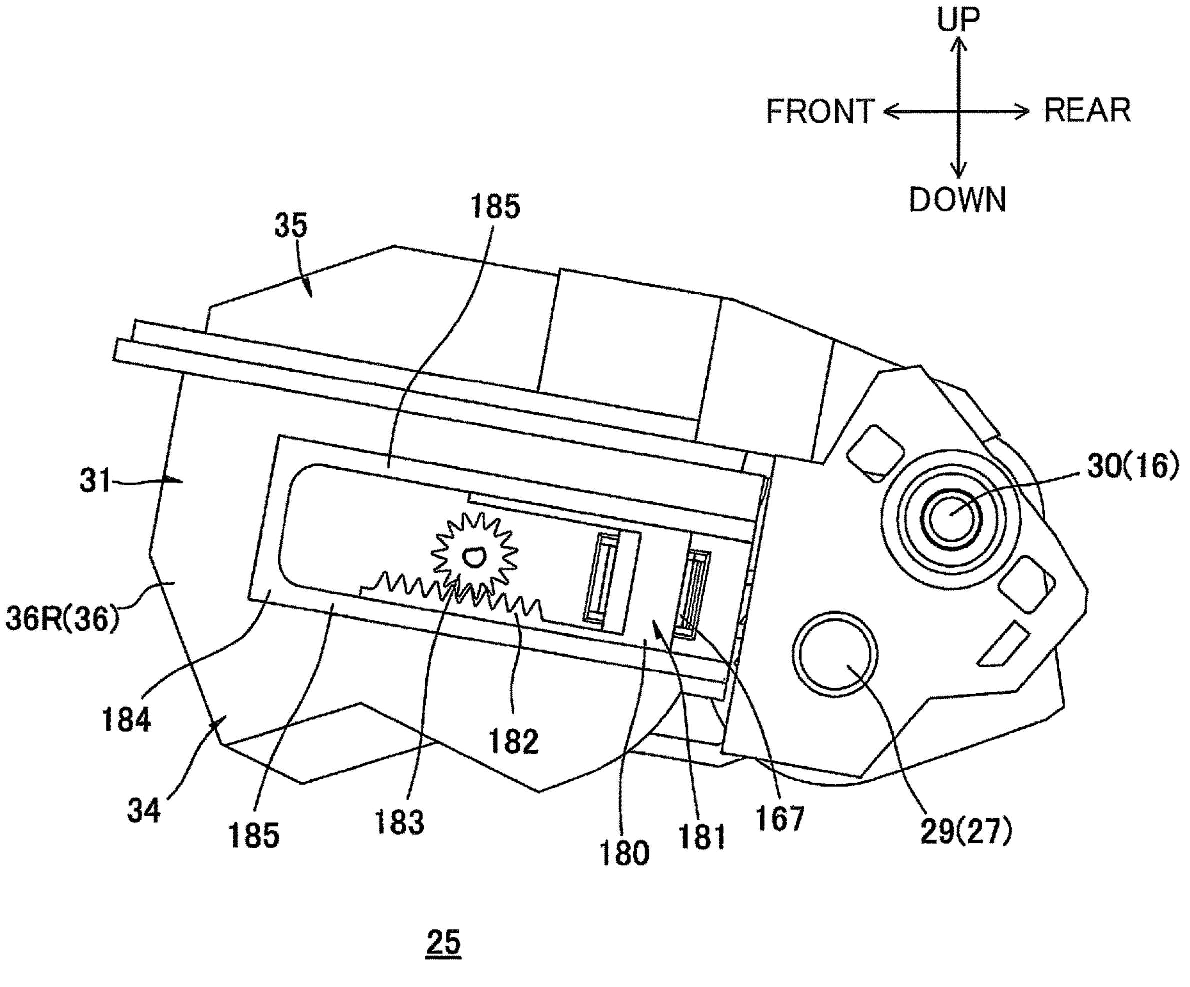

More specifically, as shown in FIG. 37, a support rail 184 and a pinion gear 183 are further provided on the right wall 36R. The slide plate 181 is supported by the support rail 184 so that the slide plate 181 can slide in the front-back direction along the support rail 184. The pinion gear 183 is for inputting a driving force to the slide plate 181.

The slide plate 181 is formed substantially in a U-shape when viewed from the side, with the opening of the U shape facing rearwardly. The slide plate 181 has the covering portion 180 and a rack portion 182.

The covering portion 180 is substantially in a rectangular plate shape when viewed from the side. A front end portion of the covering portion 180 is gradually inclined to the right side in a direction toward the rear side.

The rack portion 182 is substantially in a rod shape that extends from the lower end portion of the covering portion 180 to the front side. Gear teeth are formed on the upper surface of the rack portion 182.

The support rail 184 includes a pair of upper and lower rail portions 185. The two rail portions 185 are spaced apart from each other in the up-down direction, and face each other. The rail portions 185 support the upper and lower end portions of the slide plate 181 from the up-down direction outside so that the slide plate 181 can slide relative to the rail portions 185.

The pinion gear 183 is supported on the right wall 36R so as to be rotatable relative to the right wall 36R. More specifically, the pinion gear 183 is supported on the agitator shaft 76 so as not to be rotatable relative to the agitator shaft 76. The pinion gear 183 is located on the right wall 36R at a position between the two rail portions 185, and is engaged with the upper side of the rack portion 182.

Figure 40:
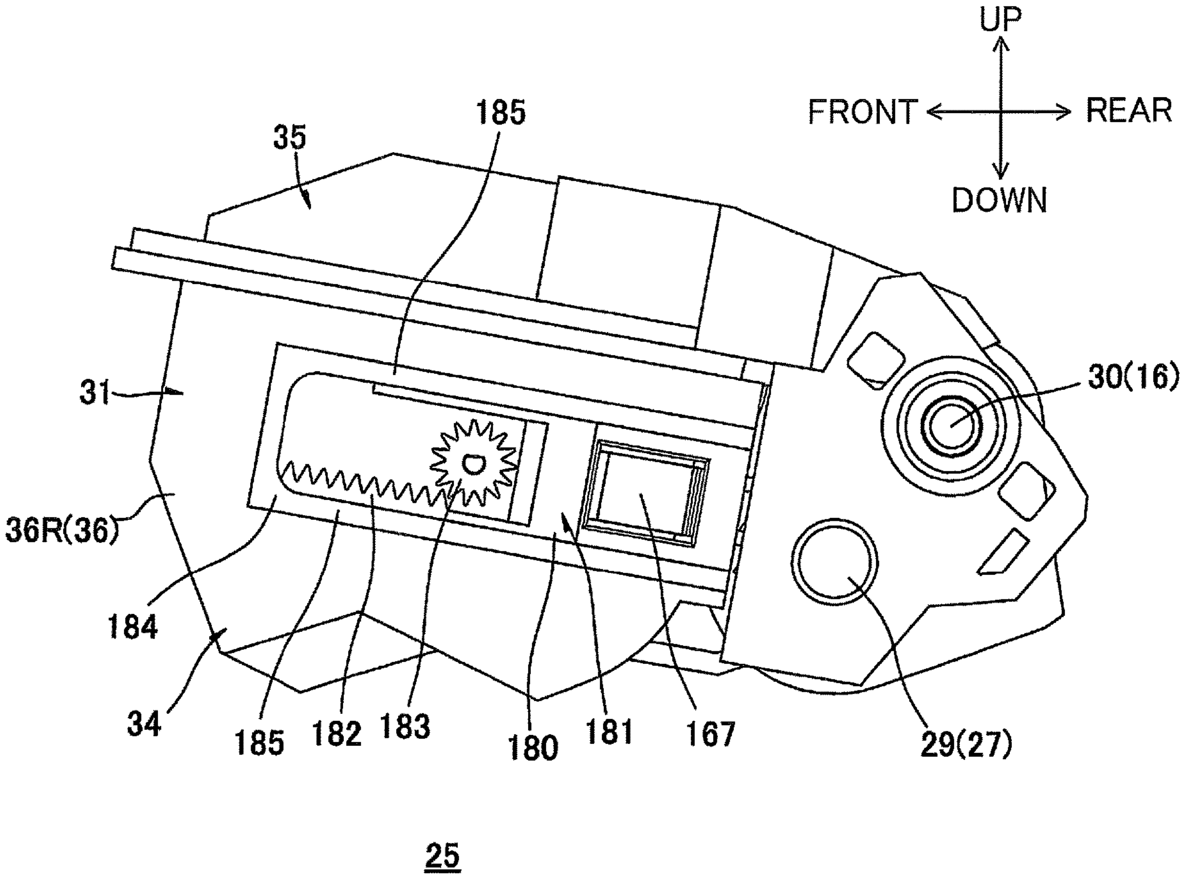

During a warm-up operation of the printer 1, the slide plate 181 slides from the rear side to the front side, thereby moving from a first position (See FIG. 38) to a second position (See FIG. 39) and then to a third position (See FIG. 40). At the first position, the covering portion 180 is positioned on the rear side of the electric-power receiving portion 167, thereby exposing the electric-power receiving portion 167. At the second position, the electric-power receiving portion 167 is covered with the covering portion 180. At the third position, the covering portion 180 is positioned on the front side of the electric-power receiving portion 167, thereby exposing the electric-power receiving portion 167.

When the developing cartridge 25 is not mounted in the main casing 2, the moving electrode 171 is kept at the left side disconnection position (See FIG. 35), similarly to the seventh embodiment.

At this time, no developing bias is supplied from the power supply 132 to the developing cartridge 25 and the fixed electrode 170, and the bias detection unit 133 does not detect supply of developing bias from the power supply 132 to the fixed electrode 170. Thus, the CPU 131 determines that no developing bias is supplied to the fixed electrode 170.

If the bias detection unit 133 does not detect supply of developing bias from the power supply 132 to the fixed electrode 170 continuously for the predetermined period of time or longer, then the CPU 131 determines that the developing cartridge 25 is not mounted in the main casing 2.

Figures 41A, 41B, 41C:
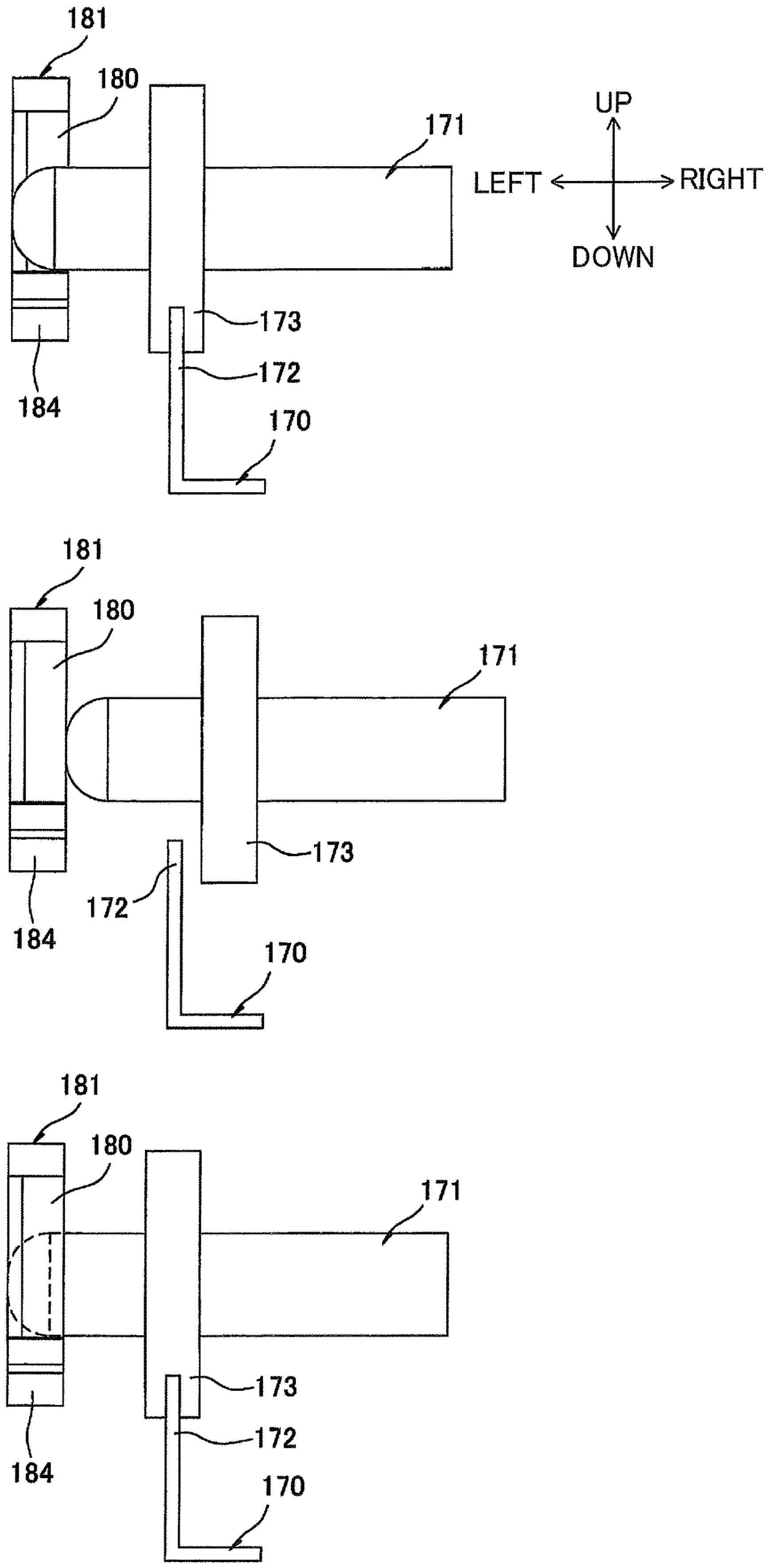

After the developing cartridge 25 is completely mounted in the main casing 2 with the slide plate 181 placed at the first position, as shown in FIG. 41A, the electric-power receiving portion 167 of the developing cartridge 25 comes in contact with the left end portion of the moving electrode 171 from the left side. Then, the moving electrode 171 is pushed from the left side by the developing cartridge 25, and slides to the right side against the urging force of the urging member (not shown). As a result, the flange portion 173 of the moving electrode 171 comes in contact with the free end portion 172 of the fixed electrode 170. In other words, the moving electrode 171 is placed at the connection position.

So, the developing bias supplied from the power supply 132 to the moving electrode 171 is supplied to the electric-power receiving portion 167 of the developing cartridge 25 via the left end portion of the moving electrode 171. The developing bias supplied to the electric-power receiving portion 167 is applied to the developing roller shaft 30.

The developing bias is also supplied from the flange portion 173 to the fixed electrode 170 via the free end portion 172, and is detected by the bias detection unit 133.

The CPU 131 determines that the developing bias is supplied to the fixed electrode 170.

After a warm-up operation starts, the slide plate 181 slides in the forward direction of the developing cartridge 25, and the slide plate 181 is placed at the second position.

As a result, as shown in FIG. 41B, the covering portion 180 of the slide plate 181 is inserted into between the electric-power receiving portion 167 and the moving electrode 171. The moving electrode 171 retracts from the electric-power receiving portion 167 to the right side against the urging force of the urging member (not shown), and is placed at the right side disconnection position.

Accordingly, the moving electrode 171 moves away from the electric-power receiving portion 167 to the right side, and the moving electrode 171 is electrically disconnected from the electric-power receiving portion 167 as a result. Moreover, the moving electrode 171 is moved away from the free end portion 172 of the fixed electrode 170 to the right side, and the moving electrode 171 is electrically disconnected from the fixed electrode 170 as a result.

At this time, the CPU 131 determines that no developing bias is supplied to the fixed electrode 170.

Then, as shown in FIG. 41C, the slide plate 181 further slides in the forward direction, and is placed at the third position. The moving electrode 171 is moved to the left side due to the urging force of the urging member (not shown), and is placed at the connection position where the moving electrode 171 is in contact with the electric-power receiving portion 167.

At this time, the CPU 131 determines that the developing bias is supplied to the fixed electrode 170.

The CPU 131 determines that the developing cartridge 25 is a new (unused) product if the CPU 131 determines, after the warm-up operation has started, that the developing bias is supplied to the fixed electrode 170, then the supply of the developing bias to the fixed electrode 170 temporarily stops, and then the developing bias is supplied to the fixed electrode 170 again.

If the CPU 131 determines that the developing bias is supplied to the fixed electrode 170 continuously for the predetermined period of time or more, then the CPU 131 determines that a developing cartridge 25 is being mounted in the main casing 2.

According to the eighth embodiment, the slide plate 181 having the covering portion 180 is provided between the electric-power receiving portion 167 and the moving electrode 171, and slides or linearly moves from the first position to the second position and then to the third position. At the first position, the slide plate 181 allows electric power to be supplied to the electric-power receiving portion 167. At the second position, the slide plate 181 blocks supply of electric power to the electric-power receiving portion 167 by the covering portion 180. At the third position, the slide plate 181 allows electric power to be supplied to the electric-power receiving portion 167.

Such a simple configuration ensures that the moving electrode 171 slides in the main casing 2 and switches supply of electric power to the electric-power receiving portion 167 between the ON and OFF states.

According to the eighth embodiment, the same operations as those of the seventh embodiment described above can be attained.

While the invention has been described in detail with reference to the embodiments thereof, it would be apparent to those skilled in the art that various changes and modifications may be made therein without departing from the spirit of the invention.

What is claimed is:

1. A cartridge comprising:

a developing roller rotatable about a developing axis extending in a first direction;

a frame configured to accommodate developing material therein, the frame having a first end portion and a second end portion separated from the first end portion in the first direction, the frame having a third end portion and a fourth end portion separated from the third end portion in a second direction, the developing roller being positioned at the third end portion;

a coupling rotatable about a coupling axis extending in the first direction, the coupling being positioned at the first end portion, the coupling including a coupling gear;

an electrode electrically connected to the developing roller, the electrode being positioned at the second end portion;

an idle gear rotatable about an idle gear axis extending in the first direction, the idle gear meshing with the coupling gear, the idle gear being positioned at the first end portion;

an agitator rotatable about an agitator axis extending in the first direction;

an agitator gear rotatable with the agitator, the agitator gear meshing with the idle gear, the agitator gear being positioned at the first end portion, and a slide plate linearly movable relative to the frame in association with rotation of the agitator gear, the slide plate linearly movable between a first position and a second position in the second direction, wherein a first distance between the developing roller and the slide plate in the second direction in a state where the slide plate is positioned at the first position is greater than a second distance between the developing roller and the slide plate in the second direction in a state where the slide plate is positioned at the second position.

2. The cartridge according to claim 1, wherein the slide plate linearly moves from the second position to the first position.

3. The cartridge according to claim 1, wherein the slide plate linearly moves in a direction defined from the third end portion to the fourth end portion in the second direction.

4. The cartridge according to claim 1, wherein the slide plate linearly moves away from the developing roller in the second direction.

5. The cartridge according to claim 1, wherein the slide plate is positioned at the second end portion.

6. The cartridge according to claim 1, further comprising:

a rail configured to support a portion of the slide plate, the rail extending in the second direction.

7. The cartridge according to claim 1, wherein the agitator has an agitator shaft extending in the first direction, and wherein the agitator gear is mounted to one end portion of the agitator shaft in the first direction.

8. The cartridge according to claim 1, wherein the electrode is positioned between the developing roller and the agitator gear in the second direction.

9. The cartridge according to claim 1, wherein the coupling is positioned between the developing roller and the agitator gear in the second direction.

10. The cartridge according to claim 1, wherein the second direction is crossing the first direction.

11. The cartridge according to claim 1, wherein the electrode is made of metal.

12. The cartridge according to claim 1, wherein the electrode has a rectangular plate.

13. The cartridge according to claim 1, wherein the developing roller has a developing roller shaft extending in the first direction, and wherein the electrode is electrically connected to the developing roller shaft.

14. The cartridge according to claim 13, further comprising:

a developing gear rotatable with the developing roller, the developing gear being mounted to the developing roller shaft, the developing gear being positioned at the first end portion, the developing gear meshing with the coupling gear.

15. The cartridge according to claim 1, wherein the developing roller is rotatable in association with rotation of the coupling.

16. The cartridge according to claim 1, further comprising:

a supply roller rotatable about a supply axis extending in the first direction, and wherein the electrode is electrically connected to the supply roller.

17. The cartridge according to claim 16, wherein the supply roller has a supply roller shaft extending in the first direction, and wherein the electrode is electrically connected to the supply roller shaft.

18. The cartridge according to claim 17, further comprising:

a supply gear rotatable with the supply roller, the supply gear being mounted to the supply roller shaft, the supply gear being positioned at the first end portion, the supply gear meshing with the coupling gear.

19. The cartridge according to claim 16, wherein the supply roller is rotatable in association with rotation of the coupling.

20. The cartridge according to claim 1, wherein the idle gear includes:

a large-diameter gear; and a small-diameter gear positioned between the first end portion of the frame and the large-diameter gear in the first direction.

21. The cartridge according to claim 20, wherein the large-diameter gear of the idle gear meshes with the coupling gear, and wherein the small-diameter gear of the idle gear meshes with the agitator gear.

22. The cartridge according to claim 20, wherein the large-diameter gear of the idle gear is integral with the small-diameter gear of the idle gear.

23. The cartridge according to claim 1, wherein the agitator gear includes:

a large-diameter gear; and a small-diameter gear.

24. The cartridge according to claim 23, wherein the small-diameter gear of the agitator gear is positioned between the first end portion of the frame and the large-diameter gear of the agitator gear in the first direction.

25. The cartridge according to claim 23, wherein the large-diameter gear of the agitator gear is integral with the small-diameter gear of the agitator gear.

26. The cartridge according to claim 1, wherein the slide plate is linearly movable relative to the electrode in association with rotation of the agitator gear.

27. The cartridge according to claim 1, wherein the slide plate linearly moves relative to the coupling in association with rotation of the agitator gear.

28. The cartridge according to claim 27, wherein the slide plate linearly moves relative to the idle gear in association with rotation of the agitator gear.

29. The cartridge according to claim 28, wherein the slide plate linearly moves relative to the agitator in association with rotation of the agitator gear.

30. The cartridge according to claim 29, wherein the slide plate linearly moves relative to the agitator gear in association with rotation of the agitator gear.

* * * * *